United States Patent [19]

Shiomi et al.

[11] Patent Number: 6,009,439
[45] Date of Patent: Dec. 28, 1999

[54] DATA RETRIEVAL SUPPORT APPARATUS, DATA RETRIEVAL SUPPORT METHOD AND MEDIUM STORING DATA RETRIEVAL SUPPORT PROGRAM

[75] Inventors: Takakazu Shiomi, Hirakata; Katsumi Tokuda, Mino, both of Japan

[73] Assignee: Matsushita Electric Industrial Co., Ltd., Osaka, Japan

[21] Appl. No.: 08/897,241

[22] Filed: Jul. 18, 1997

[30] Foreign Application Priority Data

Jul. 18, 1996 [JP] Japan ................................. 8-189050

[51] Int. Cl.⁶ .................................................. G06F 17/30
[52] U.S. Cl. ........................ 707/104; 706/45; 379/93.23
[58] Field of Search .................... 707/1, 2, 3, 6, 707/7, 100, 104; 704/3; 341/51; 706/45; 379/93.23

[56] References Cited

U.S. PATENT DOCUMENTS

| | | | |
|---|---|---|---|
| 5,517,407 | 5/1996 | Weiner | 704/1 |
| 5,519,865 | 5/1996 | Kondo et al. | 707/1 |
| 5,535,120 | 7/1996 | Chong et al. | 704/3 |
| 5,551,049 | 8/1996 | Kaplan et al. | 707/532 |
| 5,555,403 | 9/1996 | Cambot et al. | 707/4 |
| 5,604,892 | 2/1997 | Nuttall | 395/500 |
| 5,614,899 | 3/1997 | Tokuda et al. | 341/51 |
| 5,630,125 | 5/1997 | Zellweger | 707/103 |
| 5,694,523 | 12/1997 | Wical | 706/45 |
| 5,708,806 | 1/1998 | DeRose et al. | 707/104 |
| 5,771,280 | 6/1998 | Johnson | 379/93.23 |

FOREIGN PATENT DOCUMENTS

| | | |
|---|---|---|
| 601759 | 6/1994 | European Pat. Off. . |
| 0704810 A1 | 9/1994 | European Pat. Off. . |
| 0631245 A2 | 12/1994 | European Pat. Off. . |
| 0704810 | 9/1995 | European Pat. Off. . |
| 676004 | 4/1992 | Japan . |
| 778186 | 5/1993 | Japan . |

OTHER PUBLICATIONS

An Interface For Navigation Clustered Document Sets Returned By Queries, by R.B. Allen, et al. Proc. Conf. On Organizational Computing Systems, Nov. 1–4, 1993, Milpitas, CA, USA.

Comparison Of Hierarchic Agglomerative Clustering Methods For Document Retrieval Computer Journal, vol. 32, No. 3, Jun. 1, 1989, by Hamdouchi A., et al.

Recent Trends In Hierarchic Document Clustering: A Critical Review Information Processing & Management, vol. 24, No. 5, Jan. 1, 1988.

Primary Examiner—Thomas G. Black
Assistant Examiner—Charles L. Rones

[57] ABSTRACT

A data retrieval support apparatus is provided. The classifying unit classifies the plurality pieces of retrieval result data stored in the data storing unit into groups. The group title generating unit generates a group title for each group classified by the classifying unit. The displaying unit displays the group title of each group.

10 Claims, 55 Drawing Sheets

FIG. 1A

```
INPUT KEYWORD(S)
   REGION
   [                          ]
   LOCATION/ENVIRONMENTS
   [                          ]
   FACILITIES/HOT SPRING
   [                          ]
   BUDGET PER PERSON
   [                          ]
[REF] [DEL] [    ] [TITLE][ENTER]
```

FIG. 1B

```
INPUT KEYWORD(S)
   REGION
   [SAPPORO CITY             ]
   LOCATION/ENVIRONMENTS
   [                          ]
   FACILITIES/HOTSPRING
   [                          ]
   BUDGET PER PERSON
   [                          ]
[REF] [DEL] [    ] [TITLE][ENTER]
```

FIG. 1C

```
LIST OF HIT ITEMS    NUMBER OF ITEMS 102
   NEW SAPPORO PARK CITY HOTEL
   WHITE LAND IN SAPPORO
   MAKOMANAI HEIGHTS
   SAPPRO SUN PLAZA
   YOUTHMOUNTAIN HOUSE
   NAKAMURAYA INN
   HOTEL DAITOUKAN
   HOTEL SAPPORO KAIKAN
[REF] [DEL] [    ] [TITLE][ENTER]
```

FIG. 7

| | |
|---|---|
| PORK FAT BACK | SAUTEED PORK WITH GARLIC |
| CARROT | SAUTEED PORK WITH GARLIC |
| CELERY | SAUTEED PORK WITH GARLIC |
| PIMIENTO | SAUTEED PORK WITH GARLIC |
| PORT FAT BACK | SAUTEED PORK WITH APPLE SAUCE |
| APPLE | SAUTEED PORK WITH APPLE SAUCE |
| PORK FAT BACK | SAUTEED PORK IN VEGETABLE ROLL |
| CELERY | SAUTEED PORK IN VEGETABLE ROLL |
| CARROT | SAUTEED PORK IN VEGETABLE ROLL |
| SPRING ONION | SAUTEED PORK IN VEGETABLE ROLL |
| PORK SLICE | SAUTEED PORK AND BROAD BEANS WITH HOT SPICE |
| BROAD BEAN | SAUTEED PORK AND BROAD BEANS WITH HOT SPICE |
| PORK SLICE | BOILED PORK WITH SPICY SAUCE AND CUCUMBER |
| CUCUMBER | BOILED PORK WITH SPICY SAUCE AND CUCUMBER |
| PORK FAT BACK | SWEET-AND-SOUR PORK |
| PIMIENTO | SWEET-AND-SOUR PORK |
| CARROT | SWEET-AND-SOUR PORK |
| ONION | SWEET-AND-SOUR PORK |
| PORK FAT BACK | FRIED PORK |
| CABBAGE | FRIED PORK |
| PORK FAT BACK | PORK FAT BACK STEW WITH TOMATO |
| ONION | PORK FAT BACK STEW WITH TOMATO |
| TOMATO | PORK FAT BACK STEW WITH TOMATO |
| PORK FAT BACK | BAKED PORK FAT BACK AND POTATO |
| POTATO | BAKED PORK FAT BACK AND POTATO |

FIG. 8

| | |
|---|---|
| PORK FAT BACK | SAUTEED PORK WITH GARLIC |
| | SAUTEED PORK WITH APPLE SAUCE |
| | SAUTEED PORK IN VEGETABLE ROLL |
| | SWEET-AND-SOUR PORK |
| | FRIED PORK |
| | PORK FAT BACK STEW WITH TOMATO |
| | BAKED PORK FAT BACK AND POTATO |
| PORK SLICE | SAUTEED PORK AND BROAD BEANS WITH HOT SPICE |
| | BOILED PORK WITH SPICY SAUCE AND CUCUMBER |
| CARROT | SAUTEED PORK WITH GARLIC |
| | SAUTEED PORK IN VEGETABLE ROLL |
| | SWEET-AND-SOUR PORK |
| CELERY | SAUTEED PORK WITH GARLIC |
| | SAUTEED PORK IN VEGETABLE ROLL |
| PIMIENTO | SAUTEED PORK WITH GARLIC |
| | SWEET-AND-SOUR PORK |
| APPLE | SAUTEED PORK WITH APPLE SAUCE |
| SPRING ONION | SAUTEED PORK IN VEGETABLE ROLL |
| BROAD BEAN | SAUTEED PORK AND BROAD BEANS WITH HOT SPICE |
| CUCUMBER | BOILED PORK WITH SPICY SAUCE AND CUCUMBER |
| ONION | SWEET-AND-SOUR PORK |
| | PORK FAT BACK STEW WITH TOMATO |
| CABBAGE | FRIED PORK |
| TOMATO | PORK FAT BACK STEW WITH TOMATO |
| POTATO | BAKED PORK FAT BACK AND POTATO |
| ⋮ | ⋮ |

FIG. 9

| | |
|---|---|
| PORK FAT BACK | 7 ITEMS |
| PORK FAT BACK | SAUTEED PORK WITH GARLIC<br>SAUTEED PORK WITH APPLE SAUCE<br>SAUTEED PORK IN VEGETABLE ROLL<br>SWEET-AND-SOUR PORK<br>FRIED PORK<br>PORK FAT BACK STEW WITH TOMATO<br>BAKED PORK FAT BACK AND POTATO |
| PORK SLICE | 2 ITEMS |
| PORK SLICE | SAUTEED PORK AND BROAD BEANS WITH HOT SPICE<br>BOILED PORK WITH SPICY SAUCE AND CUCUMBER |
| CARROT | 3 ITEMS |
| CARROT | SAUTEED PORK WITH GARLIC<br>SAUTEED PORK IN VEGETABLE ROLL<br>SWEET-AND-SOUR PORK |
| CELERY | 2 ITEMS |
| CELERY | SAUTEED PORK WITH GARLIC<br>SAUTEED PORK IN VEGETABLE ROLL |
| PIMIENTO | 2 ITEMS |
| PIMIENTO | SAUTEED PORK WITH GARLIC<br>SWEET-AND-SOUR PORK |
| APPLE | 1 ITEM |
| APPLE | SAUTEED PORK WITH APPLE SAUCE |

| | |
|---|---|
| PORK FAT BACK    7 ITEMS | |
| PORK  PORK FAT BACK | SAUTEED PORK WITH GARLIC |
| | SAUTEED PORK WITH APPLE SAUCE |
| | SAUTEED PORK IN VEGETABLE ROLL |
| | SWEET-AND-SOUR PORK |
| | FRIED PORK |
| | PORK FAT BACK STEW WITH TOMATO |
| | BAKED PORK FAT BACK AND POTATO |
| PORK SLICE       2 ITEMS | |
| PORK  PORK SLICE | SAUTEED PORK AND BROAD BEANS WITH HOT SPICE |
| | BOILED PORK WITH SPICY SAUCE AND CUCUMBER |
| CARROT           3 ITEMS | |
| ROOT VEGETABLE  CARROT | SAUTEED PORK WITH GARLIC |
| | SAUTEED PORK IN VEGETABLE ROLL |
| | SWEET-AND-SOUR PORK |
| CELERY           2 ITEMS | |
| FRUIT VEGETABLE  CELERY | SAUTEED PORK WITH GARLIC |
| | SAUTEED PORK IN VEGETABLE ROLL |
| PIMIENTO         2 ITEMS | |
| FRUIT VEGETABLE PIMIENTO | SAUTEED PORK WITH GARLIC |
| | SWEET-AND-SOUR PORK |
| APPLE            1 ITEM | |
| FRUIT VEGETABLE APPLE | SAUTEED PORK WITH APPLE SAUCE |

| | | |
|---|---|---|
| PORK | PORK FAT BACK | SAUTEED PORK WITH GARLIC |
| | | SAUTEED PORK WITH APPLE SAUCE |
| | | SAUTEED PORK IN VEGETABLE ROLL |
| | | SWEET-AND-SOUR PORK |
| | | FRIED PORK |
| | | PORK FAT BACK STEW WITH TOMATO |
| | | BAKED PORK FAT BACK AND POTATO |
| | PORK SLICE | SAUTEED PORK AND BROAD BEANS WITH HOT SPICE |
| | | BOILED PORK WITH SPICY SAUCE AND CUCUMBER |
| ROOT VEGETABLE | CARROT | SAUTEED PORK WITH GARLIC |
| | | SAUTEED PORK IN VEGETABLE ROLL |
| | | SWEET-AND-SOUR PORK |
| FRUIT VEGETABLE | CELERY | SAUTEED PORK WITH GARLIC |
| | | SAUTEED PORK IN VEGETABLE ROLL |
| | PIMIENTO | SAUTEED PORK WITH GARLIC |
| | | SWEET-AND-SOUR PORK |
| | APPLE | SAUTEED PORK WITH APPLE SAUCE |

| | |
|---|---|
| ASPARAGUS | SAUTEED CHICKEN WHITE MEAT AND ASPARAGUS |
| BROAD BEAN | SAUTEED PORK AND BROAD BEANS WITH HOT SPICE |
| CABBAGE | FRIED PORK |
| CELERY | SAUTEED PORK WITH GARLIC |
| | SAUTEED PORK IN VEGETABLE ROLL |
| CUCUMBER | BOILED PORK WITH SPICY SAUCE AND CUCUMBER |
| ONION | SWEET-AND-SOUR PORK |
| | PORK FAT BACK STEW WITH TOMATO |
| PORK FAT BACK | SAUTEED PORK WITH GARLIC |
| | SAUTEED PORK WITH APPLE SAUCE |
| | SAUTEED PORK IN VEGETABLE ROLL |
| | SWEET-AND-SOUR PORK |
| | FRIED PORK |
| | PORK FAT BACK STEW WITH TOMATO |
| | BAKED PORK FAT BACK AND POTATO |
| | ⋮ |
| PORK SLICE | BOILED PORK WITH SPICY SAUCE AND CUCUMBER |
| | BOILED PORK WITH SPICY SAUCE AND CUCUMBER |
| POTATO | BAKED PORK FAT BACK AND POTATO |
| SHRIMP | FRIED SHRIMP AND EGG |
| | PIMIENTO STUFFED WITH SHRIMP DRESSED WITH LIQUID STARCH |
| TOMATO | PORK FAT BACK STEW WITH TOMATO |
| | ⋮ |

FIG. 13

| | |
|---|---|
| ASPARAGUS | SAUTEED CHICKEN WHITE MEAT AND ASPARAGUS |
| BROAD BEAN | SAUTEED PORK AND BROAD BEANS WITH HOT SPICE |
| CABBAGE | FRIED PORK |
| CELERY | SAUTEED PORK WITH GARLIC |
| | SAUTEED PORK IN VEGETABLE ROLL |
| CUCUMBER | BOILED PORK WITH SPICY SAUCE AND CUCUMBER |
| ONION | SWEET-AND-SOUR PORK |
| | PORK FAT BACK STEW WITH TOMATO |
| PORK FAT BACK | SAUTEED PORK WITH GARLIC |
| | SAUTEED PORK WITH APPLE SAUCE |
| | SAUTEED PORK IN VEGETABLE ROLL |
| | SWEET-AND-SOUR PORK |
| | FRIED PORK |
| | PORK FAT BACK STEW WITH TOMATO |
| | BAKED PORK FAT BACK AND POTATO |
| PORK SLICE | BOILED PORK WITH SPICY SAUCE AND CUCUMBER |
| | BOILED PORK WITH SPICY SAUCE AND CUCUMBER |
| POTATO | BAKED PORK FAT BACK AND POTATO |
| | ⋮ |

FIG. 14

| | |
|---|---|
| 1.7g | SAUTEED PORK WITH GARLIC |
| 1.0g | SAUTEED PORK WITH APPLE SAUCE |
| 2.6g | SAUTEED PORK IN VEGETABLE ROLL |
| 3.0g | SAUTEED PORK AND BROAD BEANS WITH HOT SPICE |
| 2.3g | BOILED PORK WITH SPICY SAUCE AND CUCUMBER |
| 2.9g | SWEET-AND-SOUR PORK |
| 2.3g | FRIED PORK |
| 1.7g | PORK FAT BACK STEW WITH TOMATO |
| 1.6g | BAKED PORK FAT BACK AND POTATO |
| 2.5g | CURRY STEW OF PORK AND PUMPKIN |
| 1.9g | PORK FAT BACK STEW |
| | ⋮ |

FIG. 15

| | |
|---|---|
| 1.7g | SAUTEED PORK WITH GARLIC |
| | PORK FAT BACK STEW WITH TOMATO |
| | SAUTEED CHICKEN WHITE MEAT AND ASPARAGUS |
| | SHAO-MAI OF PORK MINCE AND SCRAMBLED EGGS |
| | SAUTEED CHICKEN WHITE MEAT AND ASPARAGUS |
| | OMELETTE WITH MANY FILLINGS |
| | STEW OF BEAN CURD AND SHRIMP |
| 1.0g | SAUTEED PORK WITH APPLE SAUCE |
| 2.6g | SAUTEED PORK IN VEGETABLE ROLL |
| | BEEF STEW |
| | BAMBOO SHOOT RICE WITH TWO-COLORED POWDER |
| | ⋮ |

FIG. 16

| | |
|---|---|
| 0.6g | FLAVORED FRIED CUTTLEFISH |
| 0.7g | SAUTEED VEGETABLES AND BEAN-JELLY THREADS |
| 0.8g | STRANGELY FRIED MEATBALLS |
| 0.9g | SAUTEED GREEN ASPARAGUS AND SHRIMP |
| 1.0g | SAUTEED PORK WITH APPLE SAUCE |
| 1.1g | JAPANESE CABBAGE ROLL |
| | CHINESE OMELETTE FILLED WITH PORK MINCE AND LEEK |
| | ⋮ |

FIG. 17

| | |
|---|---|
| 0.6g | FLAVORED FRIED CUTTLEFISH |
| 0.7g | SAUTEED VEGETABLES AND BEAN-JELLY THREADS |
| 0.8g | STRANGELY FRIED MEATBALLS |
| 0.9g | SAUTEED GREEN ASPARAGUS AND SHRIMP |
| --- | --- |
| 1.0g | SAUTEED PORK WITH APPLE SAUCE |
| 1.1g | JAPANESE CABBAGE ROLL |
| | CHINESE OMELETTE FILLED WITH PORK MINCE AND LEEK |
| | ⋮ |

FIG. 18

| ASPARAGUS - CUCUMBER | 6 ITEMS |
|---|---|
| ASPARAGUS | SAUTEED CHICKEN WHITE MEAT AND ASPARAGUS |
| BROAD BEAN | SAUTEED PORK AND BROAD BEANS WITH HOT SPICE |
| CABBAGE | FRIED PORK |
| CELERY | SAUTEED PORK WITH GARLIC |
|  | SAUTEED PORK IN VEGETABLE ROLL |
| CUCUMBER | BOILED PORK WITH SPICY SAUCE AND CUCUMBER |

| ONION - POTATO | 12 ITEMS |
|---|---|
| ONION | SWEET-AND-SOUR PORK |
|  | PORK FAT BACK STEW WITH TOMATO |
| PORK FAT BACK | SAUTEED PORK WITH GARLIC |
|  | SAUTEED PORK WITH APPLE SAUCE |
|  | SAUTEED PORK IN VEGETABLE ROLL |
|  | SWEET-AND-SOUR PORK |
|  | FRIED PORK |
|  | PORK FAT BACK STEW WITH TOMATO |
|  | BAKED PORK FAT BACK AND POTATO |
| PORK SLICE | BOILED PORK WITH SPICY SAUCE AND CUCUMBER |
|  | BOILED PORK WITH SPICY SAUCE AND CUCUMBER |
| POTATO | BAKED PORK FAT BACK AND POTATO |

FIG. 19

| | |
|---|---|
| 0.6g - 0.9g | 4 ITEMS |
| 0.6g | FLAVORED FRIED CUTTLEFISH |
| 0.7g | SAUTEED VEGETABLES AND BEAN-JELLY THREADS |
| 0.8g | STRANGELY FRIED MEATBALLS |
| 0.9g | SAUTEED GREEN ASPARAGUS AND SHRIMP |

| | |
|---|---|
| 1.0g - 1.4g | 10 ITEMS |
| 1.0g | SAUTEED PORK WITH APPLE SAUCE |
| 1.1g | JAPANESE CABBAGE ROLL |
| | CHINESE OMELETTE FILLED WITH PORK MINCE AND LEEK |
| | ⋮ |

FIG. 20

501 — 91 ITEMS

502 — SAUTEED PORK WITH GARLIC
SAUTEED PORK WITH APPLE SAUCE
SAUTEED PORK IN VEGETABLE ROLL
SAUTEED PORK AND BROAD BEANS WITH HOT SPICE
BOILED PORK WITH SPICY SAUCE AND CUCUMBER
SWEET-AND-SOUR PORK
FRIED PORK
PORK FAT BACK STEW WITH TOMATO
BAKED PORK FAT BACK AND POTATO
CURRY STEW OF PORK AND PUMPKIN

| PREVIOUS PAGE | NEXT PAGE | DETER-MINE | ⇑ | ⇓ | INGRED-IENTS | ALPHABETICAL ORDER | SALT | CALORIES | COOKING TIME |
|---|---|---|---|---|---|---|---|---|---|
| 503 | 504 | 505 | 506 | 507 | 21 | 22 | 23 | 24 | 25 |

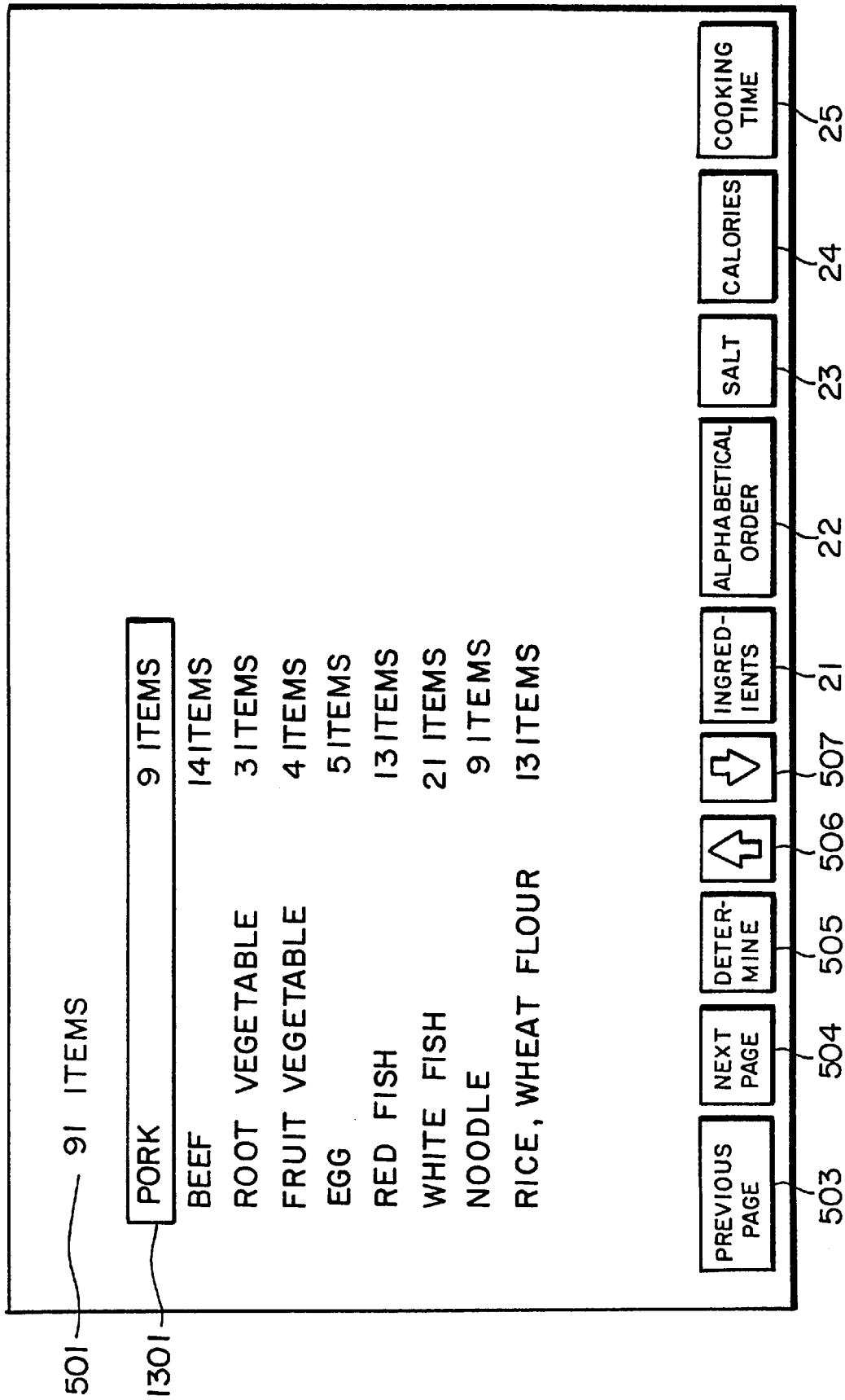

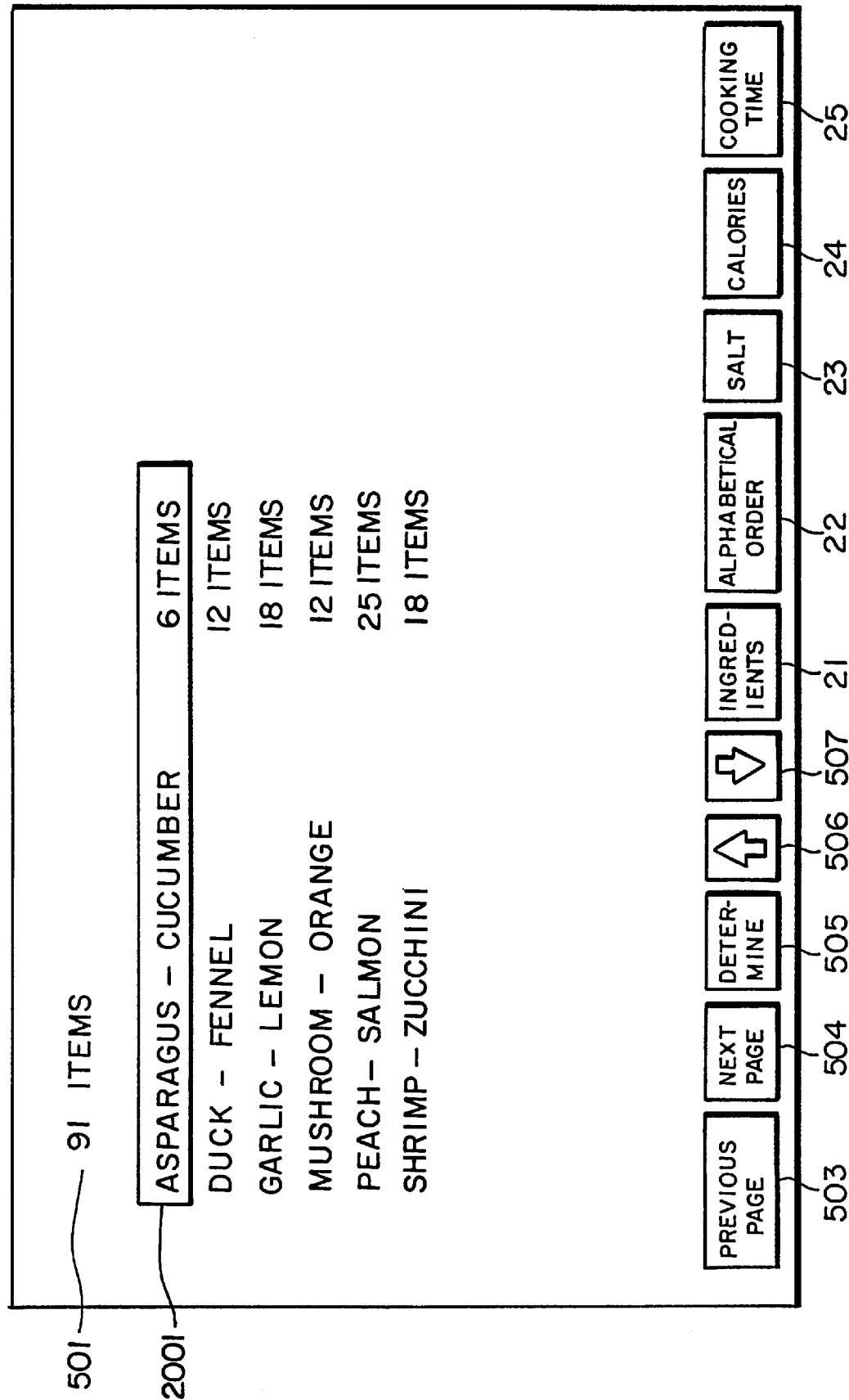

FIG. 24

501 — 91 ITEMS

1401 — SAUTEED PORK WITH GARLIC
SAUTEED PORK WITH APPLE SAUCE
SAUTEED PORK IN VEGETABLE ROLL
SWEET- AND SOUR PORK
FRIED PORK
PORK FAT BACK STEW WITH TOMATO
BAKED PORK FAT BACK AND POTATO
SAUTEED PORK AND BROAD BEANS WITH HOT SPICE
BOILED PORK WITH SPICY SAUCE AND CUCUMBER

- 503 PREVIOUS PAGE
- 504 NEXT PAGE
- 505 DETERMINE
- 506 ⇧
- 507 ⇨
- 21 INGREDIENTS
- 22 ALPHABETICAL ORDER
- 23 SALT
- 24 CALORIES
- 25 COOKING TIME

FIG. 25

| NUMBER OF LINES | 10 |
|---|---|
| NUMBER OF COLUMNS | 20 |

FIG. 27

```
PORK    9 ITEMS
PORK    PORK FAT BACK      SAUTEED PORK WITH GARLIC
                           SAUTEED PORK WITH APPLE SAUCE
                           SAUTEED PORK IN VEGETABLE ROLL
                           SWEET-AND-SOUR PORK
                           FRIED PORK
                           PORK FAT BACK STEW WITH TOMATO
                           BAKED PORK FAT BACK AND POTATO
        PORK SLICE         SAUTEED PORK AND BROAD BEANS WITH HOT SPICE
                           BOILED PORK WITH SPICY SAUCE AND CUCUMBER
ROOT VEGETABLE             3 ITEMS
ROOT VEGETABLE    CARROT   SAUTEED PORK WITH GARLIC
                           SAUTEED PORK IN VEGETABLE ROLL
                           SWEET-AND-SOUR PORK
FRUIT VEGETABLE            4 ITEMS
FRUIT VEGETABLE   CELERY   SAUTEED PORK WITH GARLIC
                           SAUTEED PORK IN VEGETABLE ROLL
                  PIMIENTO SAUTEED PORK WITH GARLIC
                  APPLE    SAUTEED PORK WITH APPLE SAUCE
```

FIG. 29

| | |
|---|---|
| ASPARAGUS | 1 ITEM |
| ASPARAGUS | SAUTEED CHICKEN WHITE MEAT AND ASPARAGUS |
| BROAD BEAN | 1 ITEM |
| BROAD BEAN | SAUTEED PORK AND BROAD BEANS WITH HOT SPICE |
| CABBAGE | 1 ITEM |
| CABBAGE | FRIED PORK |
| CELERY | 2 ITEMS |
| CELERY | SAUTEED PORK WITH GARLIC<br>SAUTEED PORK IN VEGETABLE ROLL |
| CUCUMBER | 1 ITEM |
| CUCUMBER | BOILED PORK WITH SPICY SAUCE AND CUCUMBER<br>⋮ |
| ONION | 2 ITEMS |
| ONION | SWEET-AND-SOUR PORK<br>PORK FAT BACK STEW WITH TOMATO |
| PORK FAT BACK | 7 ITEMS |
| PORK FAT BACK | SAUTEED PORK WITH GARLIC<br>SAUTEED PORK WITH APPLE SAUCE<br>⋮ |

FIG. 31

| | |
|---|---|
| 0.6g | 1 ITEM |
| 0.6g | FLAVORED FRIED CUTTLEFISH |
| 0.7g | 1 ITEM |
| 0.7g | SAUTEED VEGETABLES AND BEAN-JELLY THREADS |
| 0.8.g | 1 ITEM |
| 0.8g | STRANGELY FRIED MEATBALLS |
| 0.9g | 1 ITEM |
| 0.9g | SAUTEED GREEN ASPARAGUS AND SHRIMP |
| 1.0g | 1 ITEM |
| 1.0g | SAUTEED PORK WITH APPLE SAUCE |
| 1.1g | 2 ITEMS |
| 1.1g | JAPANESE CABBAGE ROLL<br>CHINESE OMELETTE FILLED WITH PORK MINCE AND LEEK |

FIG. 33

| | |
|---|---|
| 0.6g | FLAVORED FRIED CUTTLEFISH |
| 0.7g | SAUTEED VEGETABLES AND BEAN-JELLY THREADS |
| 0.8g | STRANGELY FRIED MEATBALLS |
| 0.9g | SAUTEED GREEN ASPARAGUS AND SHRIMP |
| 1.0g | SAUTEED PORK WITH APPLE SAUCE |
| --- | --- |
| 1.0g | SAUTEED PORK WITH APPLE SAUCE |
| 1.1g | JAPANESE CABBAGE ROLL<br>CHINESE OMELETTE FILLED WITH PORK MINCE AND LEEK |

FIG. 34

| | |
|---|---|
| ASPARAGUS - | 6 ITEMS |
| | |
| ASPARAGUS | SAUTEED CHICKEN WHITE MEAT AND ASPARAGUS |
| BROAD BEAN | SAUTEED PORK AND BROAD BEANS WITH HOT SPICE |
| CABBAGE | FRIED PORK |
| CELERY | SAUTEED PORK WITH GARLIC |
| | SAUTEED PORK IN VEGETABLE ROLL |
| CUCUMBER | BOILED PORK WITH SPICY SAUCE AND CUCUMBER |

---

| | |
|---|---|
| DUCK - | 12 ITEMS |
| | |
| DUCK | GRILLED DUCK . |
| | : |
| | : |

FIG. 35

| | |
|---|---|
| ~0.9g | 4 ITEMS |
| | |
| 0.6g | FLAVORED FRIED CUTTLEFISH |
| 0.7g | SAUTEED VEGETABLES AND BEAN-JELLY THREADS |
| 0.8g | STRANGELY FRIED MEATBALLS |
| 0.9g | SAUTEED GREEN ASPARAGUS AND SHRIMP |

---

| | |
|---|---|
| ~1.4g | 10 ITEMS |
| | |
| 1.0g | SAUTEED PORK WITH APPLE SAUCE |
| 1.1g | JAPANESE CABBAGE ROLL |
| | CHINESE OMELETTE FILLED WITH PORK MINCE AND LEEK |
| | : |
| | : |

FIG. 37

| | 3401 | 3402 | 3403 | 3404 | 3405 |
|---|---|---|---|---|---|
| | ⋯⋯ | ⋯⋯ | ⋯⋯ | ⋯⋯ | ⋯⋯ |
| KYOTO-FU | KYOTO-SHI | FUSHIMI-KU | FUKAKUSAOKAMEDANIMANJOIKI-CHO | | 612 |
| KYOTO-FU | KYOTO-SHI | FUSHIMI-KU | FUKAKUSAOKAMEDANIOYAMA-CHO | | 612 |
| OSAKA-FU | KADOMA-SHI | | KADOMA | NAZUKURI 1CHOME | 571 |
| OSAKA-FU | HIRAKATA-SHI | | | | 573 |

FIG. 39

| HOKKAIDO | SAPPORO-SHI | CHUO-KU | ASAHIGAOKA | 064 |
| HOKKAIDO | CHITOSE-SHI | | ASAHIGAOKA | 066 |
| HOKKAIDO | ASAHIKAWA-SHI | | ASAHIGAOKA | 070 |
| ⋮ | ⋮ | ⋮ | ⋮ | ⋮ |
| HYOGO-KEN | KOBE-SHI | TARUMI-KU | ASAHIGAOKA | 655 |
| HYOGO-KEN | AKASHI-SHI | | ASAHIGAOKA | 673 |
| HYOGO-KEN | ASHIYA-SHI | | ASAHIGAOKA-MACHI | 659 |
| ⋮ | ⋮ | ⋮ | ⋮ | ⋮ |

FIG. 40

| | | | | |
|---|---|---|---|---|
| HOKKAIDO | 3 ITEMS | | | |
| HOKKAIDO | SAPPORO-SHI | CHUO-KU | ASAHIGAOKA | 064 |
| HOKKAIDO | CHITOSE-SHI | | ASAHIGAOKA | 066 |
| HOKKAIDO | ASAHIKAWA-SHI | | ASAHIGAOKA | 070 |
| HYOGO-KEN | 3 ITEMS | | | |
| HYOYO-KEN | KOBE-SHI | TARUMI-KU | ASAHIGAOKA | 655 |
| HYOGO-KEN | AKASHI-SHI | | ASAHIGAOKA | 673 |
| HYOGO-KEN | ASHIYA-SHI | | ASAHIGAOKA-MACHI | 659 |

FIG. 41

```
1. HOKKAIDO      3 ITEMS
2. AOMORI-KEN    2 ITEMS
       ⋮
11. HYOGO-KEN    3 ITEMS
       ⋮
```

FIG. 42

```
HYOGO-KEN  KOBE-SHI    TARUMI-KU  ASAHIGAOKA        655
HYOGO-KEN  AKASHI-SHI             ASAMIGAOKA        673
HYOGO-KEN  ASHIYA-SHI             ASAMIGAOKA-MACHI  659
```

| | | | |
|---|---|---|---|
| APR/1 (MON) | 10:00 | | ATTEND NEWCOMER WELCOMING CEREMONY |
| APR/1 (MON) | 13:00 | | MONTHLY MEETING |
| APR/2 (TUE) | | | TRIP TO TOKYO |
| APR/3 (WED) | 10:00 | | MEETING |
| APR/3 (WED) | 12:00 | | LUNCH PARTY |
| APR/3 (WED) | 13:00 | | MEET CLIENT |
| APR/4 (THU) | 8:00 | | GENERAL MORNING MEETING |
| APR/4 (THU) | 17:00 | | GO TO DENTIST |
| APR/6 (SAT) | | | GOLF |
| APR/6 (SAT) | 18:00 | | DINNER PARTY |
| APR/8 (MON) | 13:00 | | HAVE VISITORS |
| APR/9 (TUE) | | | PAID HOLIDAY |
| APR/15 (MON) | | | TRIP TO FUKUOKA |
| APR/22 (MON) | | | BIRTHDAY |

| | | |
|---|---|---|
| APR/1 (MON) | 10:00 | ATTEND NEWCOMER WELCOMING CEREMONY |
| APR/1 (MON) | 13:00 | MONTHLY MEETING |
| APR/2 (TUE) | | TRIP TO TOKYO |
| APR/3 (WED) | 10:00 | MEETING |
| APR/3 (WED) | 12:00 | LUNCH PARTY |
| APR/3 (WED) | 13:00 | MEET CLIENT |
| APR/4 (THU) | 8:00 | GENERAL MORNING MEETING |
| APR/4 (THU) | 17:00 | GO TO DENTIST |
| APR/6 (SAT) | | GOLF |
| APR/6 (SAT) | 18:00 | DINNER PARTY |
| APR/8 (MON) | 13:00 | HAVE VISITORS |
| APR/9 (TUE) | | PAID HOLIDAY |
| APR/15 (MON) | | TRIP TO FUKUOKA |
| APR/22 (MON) | | BIRTHDAY |

FIG. 49

| | |
|---|---|
| APR/1 (MON) 10:00 | ATTEND NEWCOMER WELCOMING CEREMONY |
| APR/1 (MON) 13:00 | MONTHLY MEETING |
| APR/2 (TUE) | TRIP TO TOKYO |
| APR/3 (WED) 10:00 | MEETING |
| APR/3 (WED) 12:00 | LUNCH PARTY |
| APR/3 (WED) 13:00 | MEET CLIENT |
| APR/4 (THU) 8:00 | GENERAL MORNING MEETING |
| APR/4 (THU) 17:00 | GO TO DENTIST |
| APR/6 (SAT) | GOLF |
| APR/6 (SAT) 18:00 | DINNER PARTY |
| APR/8 (MON) 13:00 | HAVE VISITORS |
| APR/9 (TUE) | PAID HOLIDAY |
| APR/15 (MON) | TRIP TO FUKUOKA |
| APR/22 (MON) | BIRTHDAY |

FIG. 50

| | |
|---|---|
| FIRST WEEK OF APRIL | 10 |
| SECOND WEEK OF APRIL | 2 |
| THIRD WEEK OF APRIL | 1 |
| FOURTH WEEK OF APRIL | 1 |

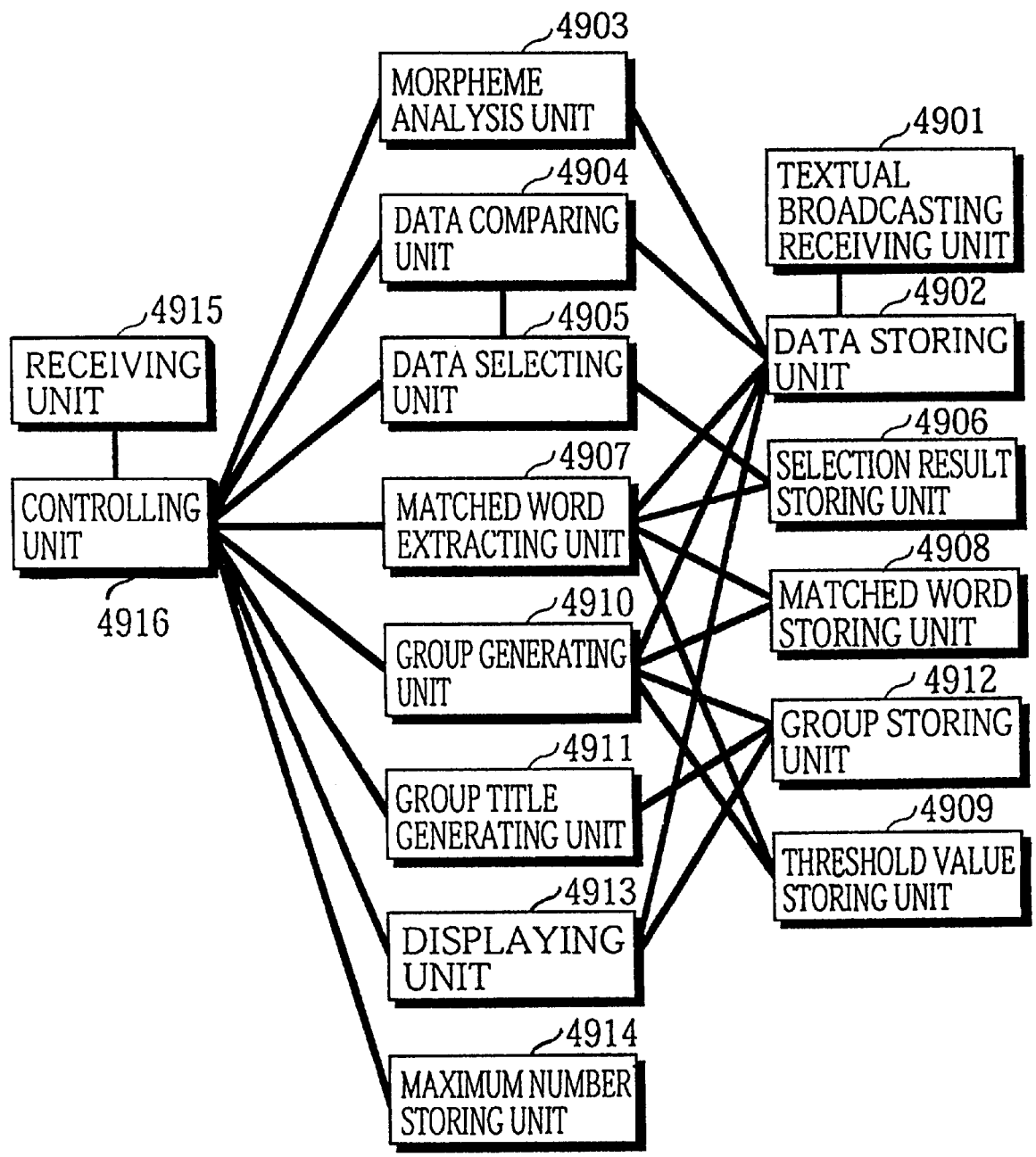

| | |
|---|---|
| 100 | ASAHI SHIMBUN/NEWS/<br>MATSUSHITA ELECTRIC INDUSTRIAL CO., LTD/ LAUNCHES/ NEW/ TV/ WITH/ HALF/ POWER/ CONSUMPTION/ |
| 101 | YOMIURI SHIMBUN/ NEWS/<br>PT&T/ ANNOUNCES/ SURVEY/ RESULT/ : / 20%/ USE/ INTERNET/ |
| 102 | NIKKEI/SHIMBUN/ NEWS/<br>HALF/ POWER/ CONSUMPTION/ . / MATSUSHITA ELECTRIC INDUSTRIAL CO., LTD/ LAUNCHES/ TV/<br>MAINICHI SHIMBUN/ NEWS/<br>20%/ USE/ INTERNET/ . / PT&T/ /S/ SURVEY/ IN/ FEBRUARY/ |
| 104 | SANKEI SHIMBUN/ NEWS/<br>MATSUSHITA ELECTRIC INDUSTRIAL CO., LTD/ LAUNCHES/ NEW/ TV/ : / HALF/ POWER/ CONSUMPTION/ |
| 105 | NIKKAN KOGYO SHIMBUN/ NEWS/<br>750 MILLION/ PERSONAL COMPUTERS/ EXPECTED/ TO/ BE/ SHIPPED/ THIS YEAR |
| 106 | WEATHER/ TODAY/<br>OSAKA/SUNNY/ , / KYOTO/ SUNNY/ , / KOBE/ SUNNY/ |
| 107 | WEATHER/ TOMORROW/<br>OSAKA/ SUNNY/ TO/ CLOUDY/ , / KOYTO/ CLOUDY/ , / KOBE/ CLOUDY/ |
| 108 | ASAHI SHIMBUN/ NEWS/<br>CHERRY/ BLOSSOMS/ START/ TO/ BLOOM/ . / FULL/ BLOOM/ EXPECTED/ AROUND/ APRIL/ 7/ . / |
| 109 | YOMIURI SHIMBUN/ NEWS/<br>ANNOUNCEMENT/ FROM/ METEOROLOGICAL AGENCY/ : / CHERRY/ BLOSSOMS/ WILL/ BE/ IN/ FULL/ BLOOM/ AROUND/ APRIL/ 7/ |
| 110 | TRAFFIC/ INFORMATION/<br>TRAFFIC/ JAM/ ON/ ROUTE 1/ : / FROM/ NAKABURI/ TO/ AMANOGAWA/ |

FIG. 54

| | |
|---|---|
| 100 | ASAHI SHIMBUN/NEWS/<br>MATSUSHITA ELECTRIC INDUSTRIAL CO., LTD/LAUNCHES/NEW/TV/WITH HALF/POWER/CONSUMPTION/ |
| 101 | YOMIURI SHIMBUN/NEWS/<br>PT&T/ANNOUNCES/SURVEY/RESULT/./20&/USE/INTERNET/ |
| 102 | NIKKEI/SHIMBUN/NEWS/<br>HALF/POWER/CONSUMPTION/./MATSUSHITA ELECTRIC INDUSTRIAL CO., LTD/LAUNCHES/TV/ |
| 103 | MAINICHI SHIMBUN/NEWS/<br>20%/USE/INTERNET/./PT&T/S/SURVEY/IN/FEBRUARY/ |
| 104 | SANKEI SHIMBUN/NEWS/<br>MATSUSHITA ELECTRIC INDUSTRIAL CO., LTD/LAUNCHES/NEW/TV/:/HALF/POWER/CONSUMPTION/ |
| 105 | NIKKAN KOGYO SHIMBUN/NEWS/<br>750 MILLION/PERSONAL COMPUTERS/EXPECTED/TO/BE/SHIPPED/THIS YEAR |
| 106 | WEATHER/TODAY/<br>OSAKA/SUNNY/,/KYOTO/SUNNY/,/KOBE/SUNNY/ |
| 107 | WEATHER/TOMORROW/<br>OSAKA/SUNNY/TO/CLOUDY/,/KYOTO/CLOUDY/,/KOBE/CLOUDY/ |
| 108 | ASAHI SHIMBUN/NEWS/<br>CHERRY/BLOSSOMS/START/TO/BLOOM/./FULL/BLOOM/EXPECTED/AROUND/APRIL/7/./ |
| 109 | YOMIURI SHIMBUN/NEWS<br>ANNOUNCEMENT/FROM/METEOROLOGICAL AGENCY/:/CHERRY/BLOSSOMS/WILL/BE/IN/FULL/BLOOM/AROUND/APRIL/7/ |
| 110 | TRAFFIC/INFORMATION/<br>TRAFFIC/JAM/ON/ROUTE/1/./FROM/NAKABURI/TO/AMANOGAWA/ |

FIG. 55
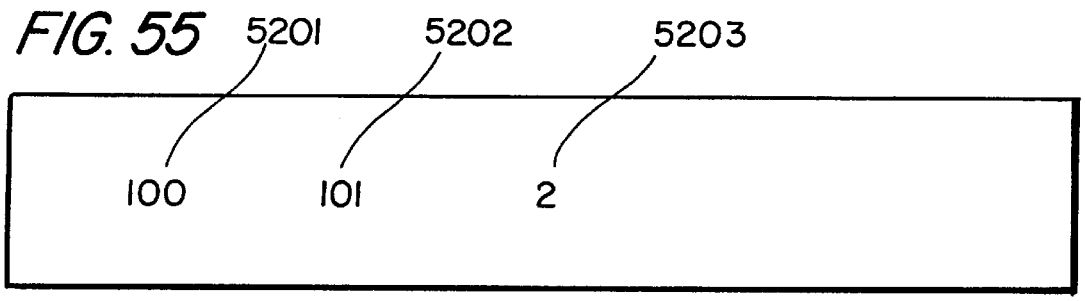
FIG. 56
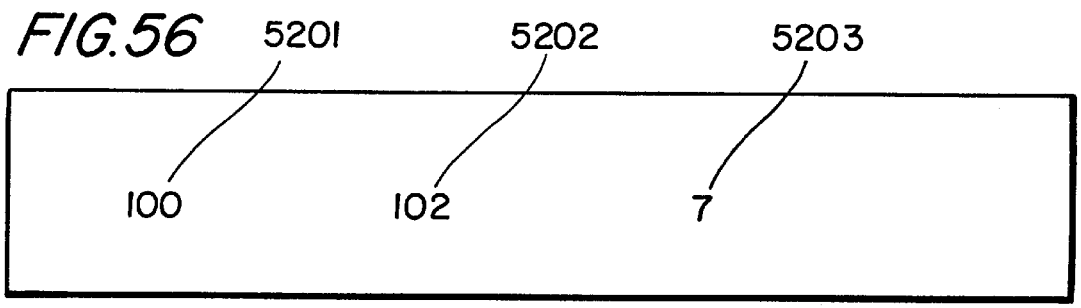
FIG. 57
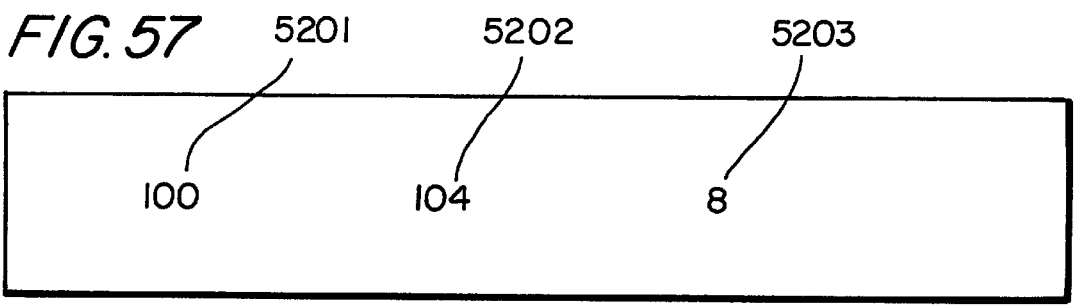
FIG. 58
NEWS MATSUSHITA ELECTRIC INDUSTRIAL CO., LTD COMSUMPTION POWER HALF NEW TV LAUNCHES
FIG. 59
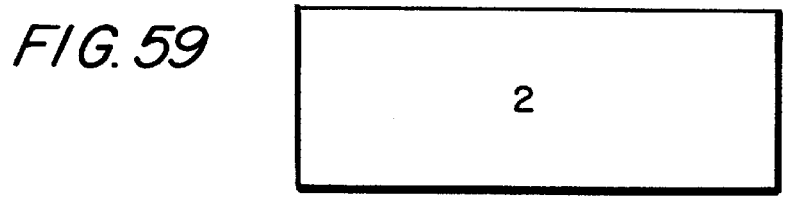

FIG. 60

| NEWS  MATSUSHITA ELECTRIC INDUSTRIAL CO., LTD   CONSUMPTION POWER   HALF   TV   LAUNCHES   3 ITEMS |
|---|
| 100   ASAHI SHIMBUN NEWS<br>    MATSUSHITA ELECTRIC INDUSTRIAL CO., LTD LAUNCHES NEW TV WITH HALF POWER CONSUMPTION<br>102   NIKKEI SHIMBUN NEWS<br>    HALF POWER CONSUMPTION. MATSUSHITA ELECTRIC INDUSTRIAL CO., LTD LAUNCHES TV<br>104   SANKEI SHIMBUN NEWS<br>    MATSUSHITA ELECTRIC INDUSTRIAL CO., LTD LAUNCHES NEW TV: HALF POWER CONSUMPTION |

| NEWS | MATSHUSHITA ELECTRIC INDUSTRIAL CO., LTD CONSUMPTION |
| POWER | HALF TV LAUNCHES 3 ITEMS |
| WEATHER | OSAKA SUNNY KYOTO KOBE 2 ITEMS |
| NEWS | INTERNET USE 20% PT&T 2 ITEMS |
| NEWS | CHERRY FULL BLOOM APRIL 7 APRIL AROUND 2 ITEMS |

FIG. 64

| | | | | | |
|---|---|---|---|---|---|
| NEWS | MATSUSHSITA ELECTRIC INDUSTRIAL CO., LTD | | | | CONSUMPTION |
| POWER | HALF | TV | LAUNCHES | 3 ITEMS | |

APR/1    10:00  ASAHI SHIMBUN/ NEWS/
                         MATSUSHITA ELECTRIC INDUSTRIAL CO., LTD/ LAUNCHES
                         NEW/ TV/ WITH/ HALF/ POWER/ CONSUMPTION/

APR/1    10:20  NIKKEI/ SHIMBUN/ NEWS/
                         HALF/ POWER/ CONSUMPTION/ . / MATSUSHITA ELECTRIC
                         INDUSTRIAL CO., LTD/ LAUNCHES/ TV/

APR/1    10:40  SANKEI SHIMBUN/ NEWS/
                         MATSUSHITA ELECTRIC INDUSTRIAL CO., LTD/ LAUNCHES/
                         NEW/ TV/ : / HALF/ POWER/ CONSUMPTION/

---

| | | | | | |
|---|---|---|---|---|---|
| WEATHER | OSAKA | SUNNY | KYOTO | KOBE | 2 ITEMS |

APR/1    11:40  WEATHER/ TODAY/
                         OSAKA/ SUNNY/ , / KYOTO/ SUNNY/ , / KOBE/ SUNNY/

APR/1    11:00  WEATHER/ TOMORROW/
                         OSAKA/ SUNNY/ TO/ CLOUDY/ , / KYOTO/ CLOUDY/ , / KOBE/
                         CLOUDY/

---

| | | | | | |
|---|---|---|---|---|---|
| NEWS | INTERNET | USE | 20% | PT&T | 2 ITEMS |

APR/1    10:20  MAINICHI SHIMBUN/ NEWS/
                         20%/ USE/ INTERNET/ . / PT&T/' / S / SURVEY/ IN/
                         FEBRUARY/

APR/1    10:00  YOMIURI SHIMBUN/ NEWS/
                         PT&T/ ANNOUNCES/ SURVEY/ RESULT/ : / 20%/ USE/
                         INTERNET/

FIG. 66

```
100    ASAHI SHIMBUN/ NEWS;
       MATSUSHITA ELECTRIC INDUSTRIAL CO., LTD/ LAUNCHES/ NEW/ TV/
       WITH/ HALF/ POWER/ CONSUMPTION/

106    WEATHER/ TODAY/
       OSAKA/ SUNNY/ , / KYOTO/ SUNNY/ , / KOBE/ SUNNY/

103    MAINICHI SHIMBUN/ NEWS/
       20%/ USE/ INTERNET/ . / PT&T/ ' /S/ SURVEY/ IN/ FEBRUARY/
                                  .
                                  .
                                  .
                                  .
                                  .
                                  .
                                  .
                                  .
                                  .
                                  .
```

FIG. 67

| | | | | | |
|---|---|---|---|---|---|
| あ行 (A ROW) | あ (a) | い (i) | う (u) | え (e) | お (o) |
| か行 (KA ROW) | か (ka) | き (ki) | く (ku) | け (ke) | こ (ko) |
| さ行 (SA ROW) | さ (sa) | し (si) | す (su) | せ (se) | そ (so) |
| た行 (TA ROW) | た (ta) | ち (ti) | つ (tu) | て (te) | と (to) |
| な行 (NA ROW) | な (na) | に (ni) | ぬ (nu) | ね (ne) | の (no) |
| は行 (HA ROW) | は (ha) | ひ (hi) | ふ (hu) | へ (he) | ほ (ho) |
| ま行 (MA ROW) | ま (ma) | み (mi) | む (mu) | め (me) | も (mo) |
| や行 (YA ROW) | や (ya) | | ゆ (yu) | | よ (yo) |
| ら行 (RA ROW) | ら (ra) | り (ri) | る (ru) | れ (re) | ろ (ro) |
| わ行 (WA ROW) | わ (wa) | | | | を (wo) |
| | | ん (n) | | | |

DATA RETRIEVAL SUPPORT APPARATUS, DATA RETRIEVAL SUPPORT METHOD AND MEDIUM STORING DATA RETRIEVAL SUPPORT PROGRAM

BACKGROUND OF THE INVENTION (1) Field of the Invention

This invention relates to a data retrieval support apparatus, a data retrieval support method and a medium storing a data retrieval support program which support retrieval of a desired piece of data from a large amount of data.

(2) Description of the Prior Art

Recent developments in CD-ROMs and networks have facilitated the management of a large amounts of data. For example, operators can retrieve a desired piece of data from a large amount of data stored in an Electronic Book (Canon Inc.) using an electronic book player. In case of the Electronic Book "JTB Hotel Information '91" (Japan Travel Bureau), the electronic book player displays a data retrieval screen, as shown in FIG. 1(a). The operator retrieves data on this screen, for example, using a keyword forward matching method for specified keywords, such as region name or budget. Here, if the operator inputs a region name "SAPPORO-CITY" into the input field for the question "REGION", as shown in FIG. 1B, the retrieval results are displayed on the screen, as shown in FIG. 1C. This screen indicates that Sapporo City provides 102 accomodation facilities. Of these, the screen displays the first eight facilities. The operator can check the rest of the information by specifying a next page button (NEXT) or a previous page button (PREV).

However, it is not so easy for the operator to find a desired facility on the above screen. It may take a lot of next page specifications before the operator reaches the desired facility. The desired facility may happen to lie near the end of the information.

SUMMARY OF THE INVENTION

It is therefore the object of the present invention to provide a data retrieval support apparatus, a data retrieval support method and a medium storing a data retrieval support program which support retrieval of a desired piece of data from a large amount of data.

The above object is achieved by a data retrieval support apparatus, including: data storing unit for storing a plurality pieces of retrieval result data; classifying unit for classifying the plurality pieces of retrieval result data into at least one group; group title generating unit for generating a group title for each group classified by the classifying unit; and displaying unit for displaying the group title generated by the group title generating unit for each group classified by the classifying unit.

With such a construction, it is possible for the operator to select a group title and retrieve a desired piece of data from the group indicated by the group title. This supports data retrieval of the operator.

In the data retrieval support apparatus, the classifying unit may include: hierarchical data storing unit for storing hierarchical data which indicates hierarchical relation; and hierarchical data classifying unit for classifying the plurality pieces of retrieval result data into at least one group based on the hierarchical data.

With such a construction, it is easy for the operator to search a desired piece of data since the data has been classified into hierarchical levels in advance.

In the data retrieval support apparatus, the hierarchical data storing unit may store a thesaurus which includes higher level words and lower level words and shows relation between the higher level words and the lower level words, where the hierarchical data classifying unit includes: higher level extracting unit for extracting from the thesaurus at least one higher level word for at least one component word in each of the plurality pieces of retrieval result data in the data storing unit; and thesaurus classifying unit for classifying the plurality pieces of retrieval result data in the data storing unit into at least one group so that each group is composed of at least one piece of retrieval result data including a common higher level word.

With such a construction, it is easy for the operator to search a desired piece of data since data is classified into group based on thesaurus which shows relation between higher level words and lower level words.

In the data retrieval support apparatus, the higher level extracting unit may include: maximum item number storing unit for storing a maximum number of items to be displayed on a screen; maximum item number reading unit for reading the maximum number of items to be displayed from the maximum item number storing unit; re-classification judging unit for judging whether the number of groups exceeds the maximum number of items to be displayed; and re-classification controlling unit for, when the re-classification judging unit judges that the number of groups exceeds the maximum number of items to be displayed, instructing the higher level extracting unit to extract from the thesaurus at least one further higher level word for the higher level word, and instructing the thesaurus classifying means to classify the plurality pieces of retrieval result data into at least one higher group so that each higher group is composed of at least one piece of retrieval result data including a common further higher level word.

With such a construction, it is easy for the operator to search a desired piece of data since data is classified, based on thesaurus, into groups whose information can be displayed on the screen.

In the data retrieval support apparatus, the higher level extracting unit may include: hierarchical level receiving unit for receiving a hierarchical level in the thesaurus when the hierarchical level is specified; and specified higher level extracting unit for extracting from the thesaurus at least one higher level word for the plurality pieces of retrieval result data in the data storing unit based on the hierarchical level received by the hierarchic level receiving unit.

With such a construction, it is possible to classify data into groups with which the operator easily searches a desired piece of data since the same hierarchy levels of the words are used in the classification based on thesaurus.

In the data retrieval support apparatus, the data storing unit stores at least one attribute which indicates a type of data, where each attribute includes an attribute value, where the classifying unit includes: specified attribute receiving unit for receiving at least one attribute when the attribute is specified, where the higher level extracting unit extracts from the thesaurus at least one higher level word for attribute values included in attributes received by the specified attribute receiving unit.

With such a construction, it is easy for the operator to search a desired piece of data since data including attributes and attribute values is classified into groups based on thesaurus.

In the data retrieval support apparatus, the hierarchical data storing unit may store a table of contents which includes a plurality of titles which are arranged based on hierarchical relation, where the data storing unit stores a plurality pieces of data related to the plurality of titles in the table of contents, where the hierarchical data classifying unit includes: data selecting unit for selecting a plurality pieces of data among the plurality pieces of data in the data storing unit; title extracting unit for extracting from the table of contents at least one title which is related to the plurality pieces of data selected by the data selecting unit; table of contents classifying unit for classifying the plurality pieces of data selected by the data selecting unit into at least one group so that each group is composed of at least one piece of data including a common title; higher level title extracting unit for extracting from the table of contents at least one higher level title for the title related to the plurality pieces of data selected by the data selecting unit; maximum item number storing unit for storing a maximum number of items to be displayed on a screen; maximum item number reading unit for reading the maximum number of items to be displayed from the maximum item number storing unit; re-classification judging unit for judging whether the number of groups exceeds the maximum number of items to be displayed; and re-classification controlling unit for, when the re-classification judging unit judges that the number of groups exceeds the maximum number of items to be displayed, instructing the higher level title extracting unit to extract from the table of contents at least one further higher level title for the title extracted by the higher level title extracting unit, and instructing the table of contents classifying unit to classify the plurality pieces of data selected by the data selecting unit into at least one higher group so that each higher group is composed of at least one piece of data including a common further higher level title, where the group title generating unit generates at least one group title by using the common title of the group, the group title respectively corresponding to the group classified by the table of contents classifying unit.

Such a construction improves data retrieval using the table of contents which includes a plurality of titles which are arranged based on hierarchical relation.

In the data retrieval support apparatus, the hierarchical data storing unit stores a geographical dictionary which includes a plurality of geographical names which are arranged based on hierarchical relation, where the data storing unit stores a plurality pieces of data each of which includes at least one geographical name, where the hierarchical data classifying unit may include: data selecting unit for selecting a plurality pieces of data among the plurality pieces of data in the data storing unit; geographical name extracting unit for extracting from the geographical dictionary at least one geographical name which is included in the plurality pieces of data selected by the data selecting unit; geographical name classifying unit for classifying the plurality pieces of data selected by the data selecting unit into at least one group so that each group is composed of at least one piece of data including a common geographical name; higher level geographical name extracting unit for extracting from the geographical dictionary at least one higher level geographical name for the geographical name extracted by the geographical name extracting unit; maximum item number storing unit for storing a maximum number of items to be displayed on a screen; maximum item number reading unit for reading the maximum number of items to be displayed from the maximum item number storing unit; re-classification judging unit for judging whether the number of groups exceeds the maximum number of items to be displayed; and re-classification controlling unit for, when the re-classification judging unit judges that the number of groups exceeds the maximum number of items to be displayed, instructing the higher level geographical name extracting unit to extract from the geographical dictionary at least one further higher level geographical name for the higher level geographical name extracted by the higher level geographical name extracting unit, and instructing the geographical name classifying unit to classify the plurality pieces of data selected by the data selecting unit into at least one higher group so that each higher group is composed of at least one piece of data including a common further higher level geographical name, where the group title generating unit generates at least one group title by using the common geographical name of the group, the group title respectively corresponding to the group classified by the geographical name classifying unit.

Such a construction improves data retrieval using the geographical dictionary which includes a plurality of geographical names which are arranged based on hierarchical relation.

In the data retrieval support apparatus, the data storing unit may store at least one piece of data which includes a plurality of attributes, where each of the plurality of attributes includes at least an attribute value, and a plurality of attribute in each piece of data are arranged based on hierarchical relation, where the classifying unit includes: attribute selecting unit for selecting at least one attribute among the plurality of attributes in the data storing unit as a classification key used to classify the plurality pieces of data in the data storing unit; data classifying unit for extracting from the data storing unit data which includes attribute values included in attributes selected by the attribute selecting unit and classifying the extracted data into at least one group so that each piece of data in the group includes a common attribute value; classification judging unit for judging whether the data classifying unit has classified the data into either of one group and a plurality of groups; and data classification controlling unit for, if the classification judging unit judges that the data classifying unit has classified the data into one group, instructing the data classifying unit to classify the data into a plurality of groups by using, as the classification key, the attribute selected by the attribute selecting unit and a lower attribute.

With such a construction, it is possible to classify data into groups, the data including attributes arranged in hierarchy and the attribute values.

In the data retrieval support apparatus, the data classifying unit may include: maximum item number storing unit for storing a maximum number of items to be displayed on a screen; maximum item number reading unit for reading the maximum number of items to be displayed from the maximum item number storing unit; re-classification judging unit for judging whether there is a group in the plurality of groups classified by the data classifying unit which includes a plurality pieces of data whose number exceeds the maximum number of items to be displayed; and re-classification controlling unit for, when the re-classification judging unit judges that there is the group, instructing the data classifying unit to classify the data into a plurality of groups by using, as the classification key, the attribute selected by the attribute selecting unit, the lower attribute, and a further lower attribute.

With such a construction, it is easy for the operator to search a desired piece of data since the data including attributes arranged in hierarchy and the attribute values is classified into groups whose information can be displayed on the screen.

In the data retrieval support apparatus, the data storing unit stores a geographical dictionary which includes at least one piece of geographical data which includes a plurality of region names as attributes, where each of the plurality of region names includes at least an attribute value, and a plurality of attribute in each piece of geographical data are arranged based on hierarchical relation, where the attribute selecting unit selects at least one attribute among the plurality of attributes in the data storing unit as a classification key used to classify geographical data in the data storing unit, where the data classifying unit classifies the geographical data in the data storing unit into at least one group by using the classification key, where the classification judging unit judges whether the data classifying unit has classified the geographical data into either of one group and a plurality of groups, where the data classification controlling unit, if the classification judging unit judges that the data classifying unit has classified the geographical data into one group, instructs the data classifying unit to classify the geographical data into a plurality of groups by using, as the classification key, the attribute selected by the attribute selecting unit and a lower attribute.

With such a construction, it is possible to classify the data including attributes arranged in hierarchy and the attribute values into groups, such as geographical data stored in a geographical dictionary.

In the data retrieval support apparatus, the data storing unit may store at least one piece of data which includes a plurality of attributes, where each of the plurality of attributes includes at least an attribute value, where the classifying unit includes: attribute classifying unit for classifying data in the data storing unit into at least one group so that each group is composed of at least one piece of data including a common attribute value.

With such a construction, it is possible to classify data including attributes and the attribute values into groups. Also, when the data is numerals or characters, the data is classified into groups using the numerals or characters so that it is easy for the operator to search a desired piece of data.

In the data retrieval support apparatus, the data storing unit may store a plurality of items each of which includes at least one sentence, where the classifying unit includes: item dividing unit for dividing the plurality of items into a plurality of words; word storing unit for storing the plurality of items and the plurality of words; and item classifying unit for classifying the plurality of items into at least one group so that each group is composed of a plurality of items including a common word.

With such a construction, even if data is composed of news texts, it is possible to classify the data into groups using words included in the news text.

In the data retrieval support apparatus, the item classifying unit includes: word selecting unit for selecting at least one word among the plurality of words in the word storing unit; threshold value storing unit for storing a threshold value; and threshold value classification unit for calculating a number of words selected by the word selecting unit in one item for each of the plurality of items and generating a group which includes at least one item including a plurality of the words selected by the word selecting unit whose number is either of equal to and greater than the threshold value.

With such a construction, it is possible, by using the threshold value, to classify news text data into groups so that each group includes similar news.

In the data retrieval support apparatus, the word selecting unit may select at least one word which is included in a plurality of items in common among the plurality of items in the data storing unit.

With such a construction, it is possible to classify news text data into groups based on matched words extracted from two news text data items.

In the data retrieval support apparatus, the classifying unit includes: first classifying unit for classifying retrieval result data in the data storing unit into at least one first group; and second classifying unit for classifying retrieval result data in the data storing unit into at least one second group based on the first group.

With such a construction, it is easy for the operator to search a desired piece of data since data is classified into groups and the groups are further classified into small groups.

In the data retrieval support apparatus of claim 1, where the classifying unit includes: group classifying unit for classifying the plurality pieces of retrieval result data in the data storing unit into at least one group; re-classification determining unit for determining whether to re-classify; and re-classification unit for re-classifying the plurality pieces of retrieval result data in the data storing unit into at least one group when the re-classification determining unit determines to re-classify.

With such a construction, it is easy for the operator to search a desired piece of data since after the data is classified into groups once, it is judged whether the data should be re-classified.

In the data retrieval support apparatus, the re-classification determining unit may include: maximum group number storing unit for storing a maximum number of groups to be displayed on a screen; maximum group number reading unit for reading the maximum number of groups to be displayed from the maximum group number storing unit; and display judging unit for judging whether a number of groups classified by the group classifying unit exceeds the maximum number of groups to be displayed, where the re-classification unit re-classifies the plurality pieces of retrieval result data in the data storing unit into at least one group when the display judging unit judges that the number of groups classified by the group classifying unit exceeds the maximum number of groups to be displayed.

With such a construction, it is easy for the operator to search a desired piece of data since classification is repeated until information on the classified groups can be displayed on the screen.

In the data retrieval support apparatus, the data storing unit may store at least one piece of data which includes a plurality of attributes, where each of the plurality of attributes includes at least an attribute value, where the group title generating unit includes: attribute value group title generating unit for, using a plurality of attribute values in the data storing unit, generating a group title for each group classified by the classifying unit.

With such a construction, it is easy for the operator to search a desired piece of data since displayed group titles include attribute values of the data.

In the data retrieval support apparatus, the group title generating unit includes: number of data calculating unit for calculating a number of pieces of data included each group classified by the classifying unit, where the group title generating unit generates a group title of each group, the group title including the number of pieces of data in each group calculated by the number of data calculating unit.

With such a construction, it is easy for the operator to search a desired piece of data since displayed group titles include attribute values and the number of pieces of data.

In the data retrieval support apparatus, each piece of data stored in the data storing unit may include at least one date attribute, where the date attribute includes at least one of a year attribute, a month attribute, a day attribute, a day of the week attribute, and a time attribute, where the attribute value group title generating unit generates group titles using attribute values of date attributes.

With such a construction, it is easy for the operator to search a desired piece of data since displayed group titles include attribute values of the date attribute.

In the data retrieval support apparatus, the data storing unit may store a plurality of items, where the classifying unit includes: item dividing unit for dividing the plurality of items into a plurality of words; word storing unit for storing the plurality of items and the plurality of words; and item classifying unit for classifying the plurality of items into at least one group so that each group is composed of a plurality of items including a common word, where the group title generating unit generates a group title for each group using the plurality of words stored in the word storing unit.

With such a construction, it is easy for the operator to search a desired piece of news text data since displayed group titles include words extracted from the news text data.

In the data retrieval support apparatus, the data storing unit may store at least one piece of data which includes a plurality of attributes, where each of the plurality of attributes includes at least an attribute value, and a plurality of attribute in each piece of data are arranged based on hierarchical relation, where the classifying unit includes: attribute selecting unit for selecting at least one attribute among the plurality of attributes in the data storing unit as a classification key used to classify data in the data storing unit; data classifying unit for extracting from the data storing unit data which includes attribute values included in attributes selected by the attribute selecting unit and classifying the extracted data into at least one group so that each piece of data in the group includes a common attribute value; classification judging unit for judging whether the data classifying unit has classified the data into either of one group and a plurality of groups; and data classification controlling unit for, if the classification judging unit judges that the data classifying unit has classified the data into one group, instructing the data classifying unit to classify the data into a plurality of groups by using, as the classification key, the attribute selected by the attribute selecting unit and a lower attribute, where the group title generating unit generates a group title for each group using at least one attribute value of at least one higher attribute included in common in each group.

With such a construction, it is easy for the operator to search a desired piece of data since displayed group titles include common attributes of the data.

The above object is also achieved by a data retrieval support method used in a data retrieval support apparatus which includes data storing unit which stores a plurality pieces of retrieval result data, the data retrieval support method including: a classification step of classifying the plurality pieces of retrieval result data stored in the data storing unit into at least one group; a group title generation step of generating a group title which corresponds to each of groups classified in the classification step; and a display step of displaying the group title generated in the group title generation step.

With such a construction, it is easy for the operator to search a desired piece of data since the operator can select a group title representing the desired piece of data to display the data included in the group.

The above object is also achieved by a record medium storing a data retrieval support program which can be read by a computer and is used in the computer which includes data storing unit which stores a plurality pieces of retrieval result data, the data retrieval support program including: a classification step of classifying the plurality pieces of retrieval result data stored in the data storing unit into at least one group; a group title generation step of generating a group title which corresponds to each of groups classified in the classification step; and a display step of displaying the group title generated in the group title generation step.

With such a construction, by allowing a computer to run the program, the program supports the operator to search a desired piece of data since the operator can select a group title representing the desired piece of data to display the data included in the group.

The above object is also achieved by a data retrieval support apparatus, including: data storing unit for storing a plurality pieces of retrieval result data; hierarchical data storing unit for storing a thesaurus which includes higher level words and lower level words and shows relation between the higher level words and the lower level words; higher level extracting unit for extracting from the thesaurus at least one higher level word for at least one component word in each of the plurality pieces of retrieval result data in the data storing unit; thesaurus classifying unit for classifying the plurality pieces of retrieval result data in the data storing unit into at least one group so that each group is composed of at least one piece of retrieval result data including a common higher level word; maximum item number storing unit for storing a maximum number of items to be displayed on a screen; maximum item number reading unit for reading the maximum number of items to be displayed from the maximum item number storing unit; re-classification judging unit for judging whether the number of groups exceeds the maximum number of items to be displayed; re-classification controlling unit for, when the re-classification judging unit judges that the number of groups exceeds the maximum number of items to be displayed, instructing the higher level extracting unit to extract from the thesaurus at least one further higher level word for the higher level word, and instructing the thesaurus classifying unit to classify the plurality pieces of retrieval result data into at least one higher group so that each higher group is composed of at least one piece of retrieval result data including a common further higher level word; group title generating unit for generating a group title for each of groups classified by the thesaurus classifying unit and the re-classification controlling unit; and displaying unit for displaying a list of group titles generated by the group title generating unit.

With such a construction, it is easy for the operator to search a desired piece of data since data is classified into group based on thesaurus which shows relation between higher level words and lower level words.

The above object is also achieved by a data retrieval support apparatus, including: data storing unit for storing a plurality pieces of retrieval result data each of which includes a plurality of attributes, where each of the plurality of attributes includes at least an attribute value, and a plurality of attribute in each piece of retrieval result data are arranged based on hierarchical relation; attribute selecting unit for selecting at least one attribute among the plurality of attributes in the data storing unit as a classification key used to classify the plurality pieces of retrieval result data in the data storing unit; data classifying unit for extracting from the data storing unit retrieval result data which includes attribute values included in attributes selected by the attribute selecting unit and classifying the extracted retrieval result data into at least one group so that each piece of retrieval result data in the group includes a common attribute value; maximum item number storing unit for storing a maximum number of items to be displayed on a screen; maximum item number reading unit for reading the maximum number of items to be displayed from the maximum item number storing unit; first classification judging unit for judging whether the data classifying unit has classified the extracted retrieval result data into either of one group and a plurality of groups; second classification judging unit for judging whether the number of groups classified by the data classifying unit exceeds the maximum number of items to be displayed; data classification controlling unit for, when the first classification judging unit judges that the character file classification unit has classified the data into one group, instructing the data classifying unit to classify the extracted retrieval result data by using, as the classification key, the attribute selected by the attribute selecting unit and a lower attribute, and when the second classification judging unit judges that the number of groups exceeds the maximum number of items to be displayed, instructing the data classifying unit to replace the classification key with a higher attribute and to classify the extracted retrieval result data into groups using the replaced higher attribute; group title generating unit for generating a group title for each of groups classified by the data classifying unit; and displaying unit for displaying a list of group titles generated by the group title generating unit.

With such a construction, it is easy for the operator to search a desired piece of data since the data including attributes arranged in hierarchy and the attribute values is classified into groups until the number of groups reaches a certain value.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 1(a)–1(c) show screens displayed on a conventional electronic book player;

FIG. 7 shows the contents of the group storing unit of the data retrieval support apparatus shown in FIG. 2;

FIG. 8 shows the contents of the group storing unit shown in FIG. 7;

FIG. 9 shows the contents of the group storing unit shown in FIG. 7;

FIG. 10 shows the contents of the group storing unit shown in FIG. 7;

FIG. 11 shows the contents of the group storing unit shown in FIG. 7;

FIG. 12 shows the contents of the group storing unit shown in FIG. 7;

FIG. 13 shows the contents of the group storing unit shown in FIG. 7;

FIG. 14 shows the contents of the group storing unit shown in FIG. 7;

FIG. 15 shows the contents of the group storing unit shown in FIG. 7;

FIG. 16 shows the contents of the group storing unit shown in FIG. 7;

FIG. 17 shows the contents of the group storing unit shown in FIG. 7;

FIG. 18 shows the contents of the group storing unit shown in FIG. 7;

FIG. 19 shows the contents of the group storing unit shown in FIG. 7;

FIG. 20 show a screen displayed on the displaying unit of the data retrieval support apparatus shown in FIG. 2;

FIG. 21 shows a list of group titles generated by the CLASSIFICATION BY THESAURUS which is displayed on the displaying unit of the data retrieval support apparatus shown in FIG. 2;

FIG. 22 shows a list of group titles generated by the CLASSIFICATION BY ALPHABETICAL ORDER which is displayed on the displaying unit of the data retrieval support apparatus shown in FIG. 2;

FIG. 24 shows a list of dish names included in a group specified from the list of group titles displayed on the displaying unit of the data retrieval support apparatus shown in FIG. 2;

FIG. 25 shows the contents of the maximum number storing unit of the data retrieval support apparatus shown in FIG. 2;

FIG. 27 shows a list of group titles generated by the group title generating unit of the data retrieval support apparatus shown in FIG. 2;

FIG. 29 shows a list of group titles generated by the group title generating unit of the data retrieval support apparatus shown in FIG. 2;

FIG. 31 shows a list of group titles generated by the group title generating unit of the data retrieval support apparatus shown in FIG. 2;

FIG. 33 shows a result of classification by the numeral classifying unit of the data retrieval support apparatus shown in FIG. 2;

FIG. 34 shows group titles generated by the group title generating unit of the data retrieval support apparatus shown in FIG. 2;

FIG. 35 shows group titles generated by the group title generating unit of the data retrieval support apparatus shown in FIG. 2;

FIG. 37 shows data stored in the data storing unit of the data retrieval support apparatus shown in FIG. 36;

FIG. 39 shows a classification result output by the classifying unit of the data retrieval support apparatus shown in FIG. 36;

FIG. 40 shows group titles generated by the group title generating unit of the data retrieval support apparatus shown in FIG. 36;

FIG. 41 shows a list of group titles displayed by displaying unit of the data retrieval support apparatus shown in FIG. 36;

FIG. 42 shows geographecal data in a list of group titles displayed by the displaying unit of the data retrieval support apparatus shown in FIG. 36;

FIG. 43 shows the contents of maximum number storing unit of the data retrieval support apparatus shown in FIG. 36;

FIG. 46 shows data stored in schedule storing unit of the data retrieval support apparatus shown in FIG. 45;

FIG. 47 shows the contents of maximum number storing unit of the data retrieval support apparatus shown in FIG. 45;

FIG. 48 shows the contents of the group storing unit of the data retrieval support apparatus shown in FIG. 45;

FIG. 49 shows the contents of the group storing unit of the data retrieval support apparatus shown in FIG. 45;

FIG. 50 shows a list of group titles displayed by displaying unit of the data retrieval support apparatus shown in FIG. 45;

FIG. 52 is a block diagram showing the construction of the data retrieval support apparatus of Embodiment 4;

FIG. 53 shows the contents of the group storing unit of the data retrieval support apparatus shown in FIG. 52;

FIG. 54 shows results of morpheme analysis performed by the morpheme analysis unit of the data retrieval support apparatus shown in FIG. 52;

FIG. 55 shows the contents of selection result storing unit of the data retrieval support apparatus shown in FIG. 52;

FIG. 56 shows the contents of selection result storing unit of the data retrieval support apparatus shown in FIG. 52;

FIG. 57 shows the contents of selection result sftoring unit of the data retrieval support apparatus shown in FIG. 52;

FIG. 58 shows the contents of matched word storing unit of the data retrieval support apparatus shown in FIG. 52;

FIG. 59 shows the contents of threshold value storing unit of the data retrieval support apparatus shown in FIG. 52;

FIG. 60 shows the contents of group storing unit of the data retrieval support apparatus shown in FIG. 52;

FIG. 64 shows the contents of group storing unit of the data retrieval support apparatus shown in FIG. 52;

FIG. 66 shows a list of group titles displayed by group storing unit of the data retrieval support apparatus shown in FIG. 52; and FIG. 67 shows the Japanese syllabary.

DESCRIPTION OF THE PREFERRED EMBODIMENTS

Embodiment 1

The following is a description of an embodiment of the present invention, a data retrieval support apparatus.

Figure 2:
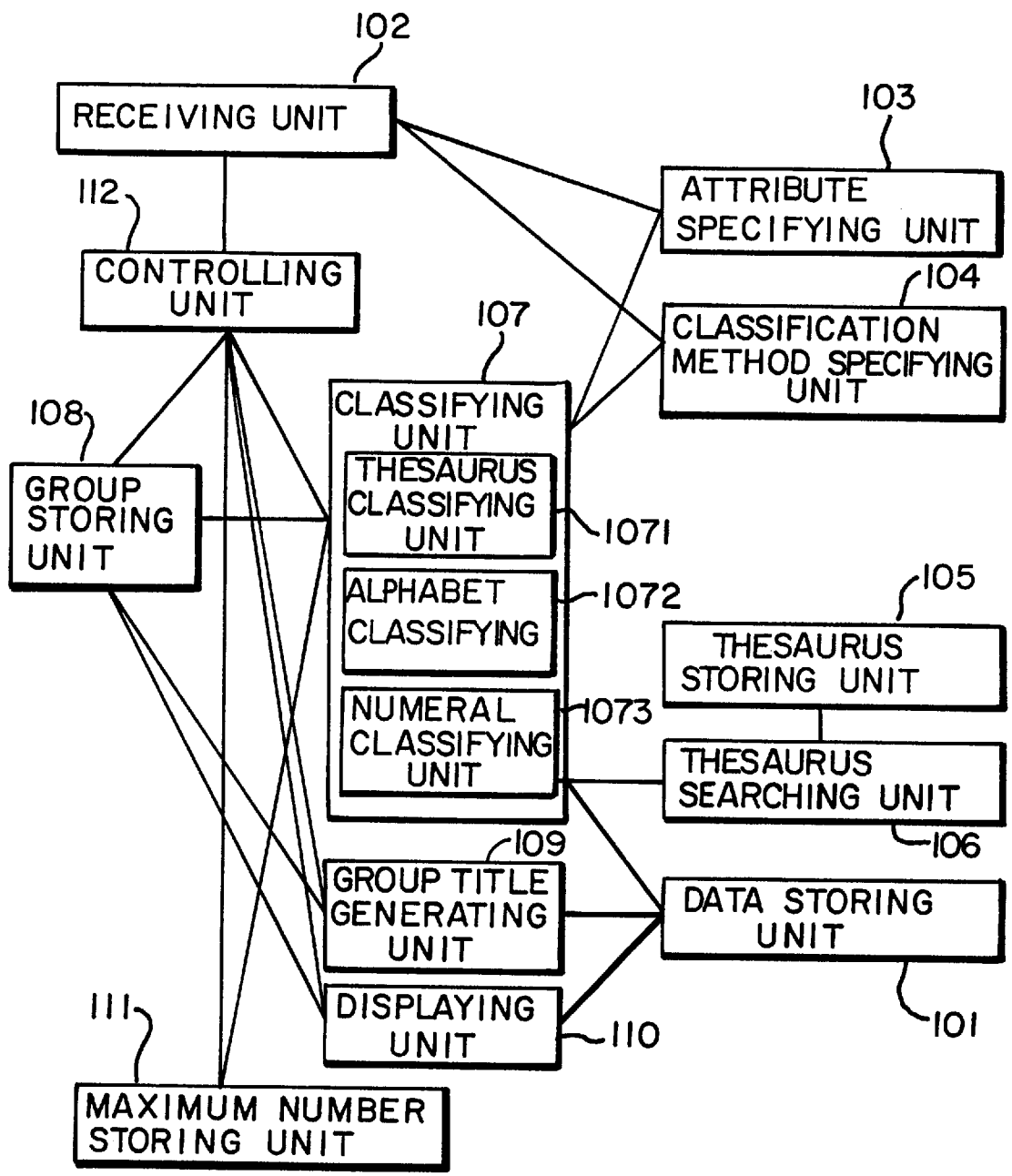
FIG. 2 is a block diagram showing the construction of the data retrieval support apparatus of Embodiment 1.

FIG. 2 is a block diagram showing the construction of the data retrieval support apparatus. The data retrieval support apparatus is composed of data storing unit 101, receiving unit 102, attribute specifying unit 103, classification method specifying unit 104, thesaurus storing unit 105, thesaurus searching unit 106, classifying unit 107, thesaurus classifying unit 1071, alphabet classifying unit 1072, numeral classifying unit 1073, group storing unit 108, group title generating unit 109, displaying unit 110, maximum number storing unit 111, and controlling unit 112.

Figure 3:
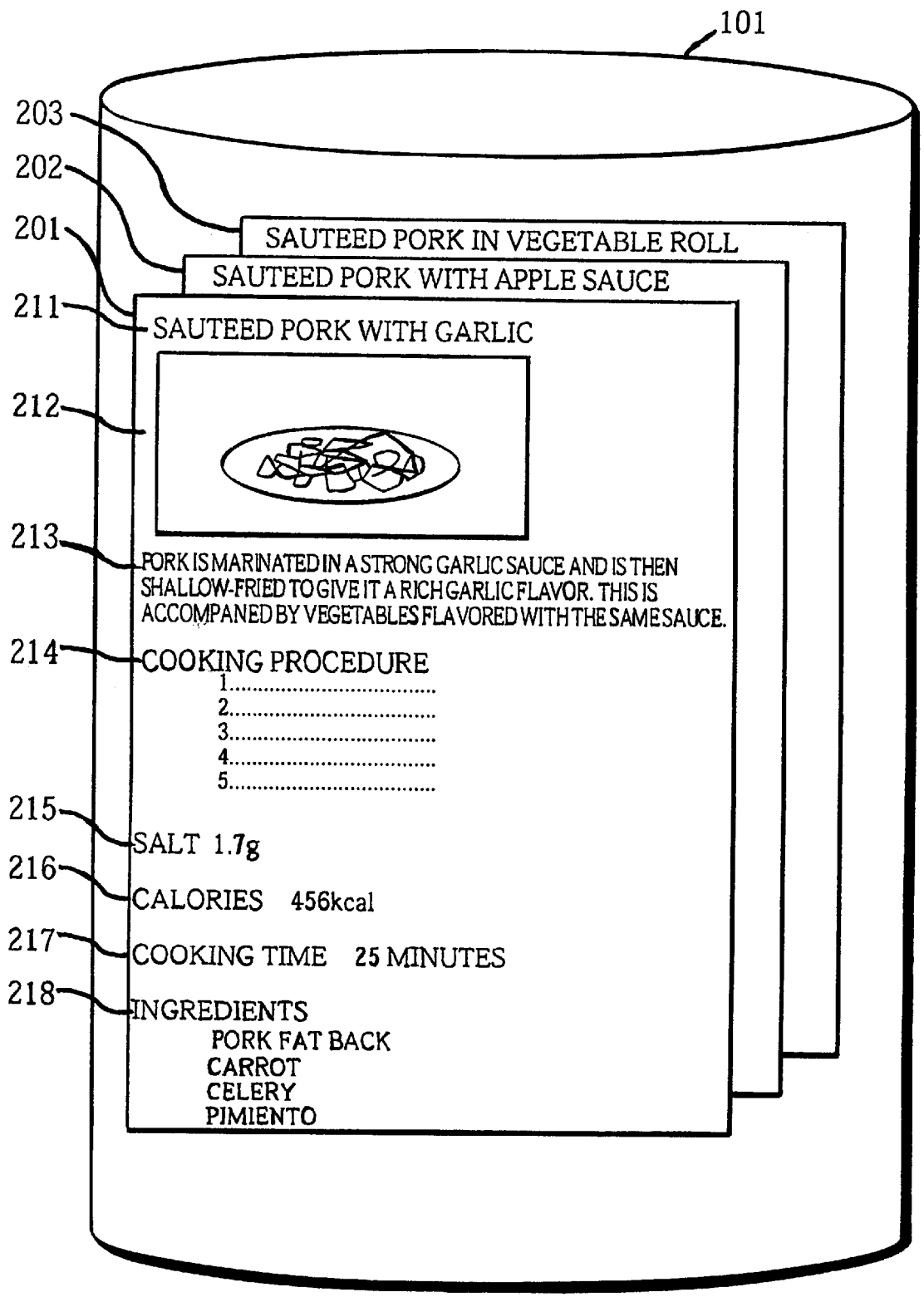
FIG. 3 shows data stored in data storing unit of the data retrieval support apparatus shown in FIG. 2.

Data storing unit 101, achieved by a magnetic disk, a ROM or the like, stores a plurality pieces of data. FIG. 3 shows data stored in data storing unit 101. The data is composed of a plurality pieces of cooking data, such as 201, 202, and 203 as shown in FIG. 3. Each of the plurality pieces of cooking data is composed of a plurality of attributes. The attributes are: "dish name" indicating a dish name, "dish picture" including image data of a picture of the dish, "dish comment" having a comment on the dish, "cooking procedure" having a description of how to cook the dish, "salt" indicating the amount of salt included in the dish, "calories" indicating the calories included in the dish, "cooking time" indicating the time taken for cooking the dish, and "ingredients" showing the ingredients of the dish.

Cooking data 201, as shown in FIG. 3, includes the 9 respective attribute values 211 to 218 for the above attributes. Of these, attribute value 212 is image data of the dish; attribute values 211, 213, 214, and 218 are character data; and attribute values 215 to 217 are numeral data. Note that the ingredient attribute includes as many attribute values as there are ingredients of the dish.

Other pieces of cooking data, such as 202 and 203, includes the same attributes as 201 with different attribute values.

Data storing unit 101 may be achieved by a floppy disk, a CD-ROM, or a magnet optical disk and a dedicated drive for reading data from these media.

Figure 4:
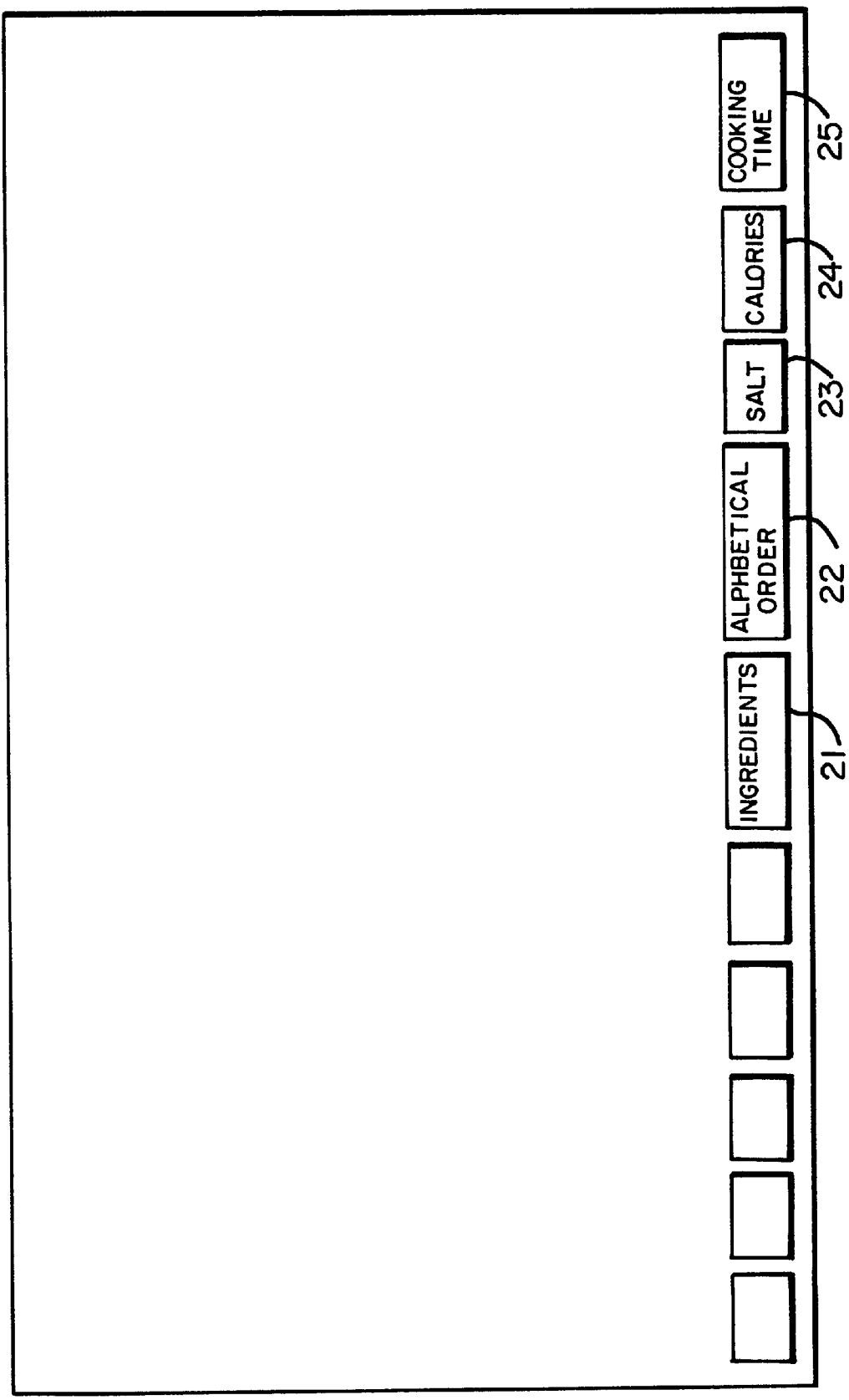
FIG. 4 shows an input receiving screen of the data retrieval support apparatus shown in FIG. 2.

Receiving unit 102 is achieved by a keyboard, a mouse, a pair of a pen and a tablet or the like and receives instructions from the operator. The operator inputs instructions, for example, using buttons 21 to 25, as shown in FIG. 4. INGREDIENTS button 21 is used for classifying the cooking data into groups using attribute values of the cooking data and a thesaurus, which will be described later, stored in thesaurus storing unit 105. ALPHABETICAL ORDER button 22 is used for classifying the cooking data into groups in alphabetical order of the ingredient names.

SALT button 23, CALORIES button 24, and COOKING TIME button 25 are used for classifying the cooking data into groups based on the amount of salt, calories and cooking time of the dish, respectively.

Attribute specifying unit 103 specifies an attribute used as a classification key to classifying unit 107 based on an instruction received by receiving unit 102. When receiving unit 102 receives an instruction which is input by specifying INGREDIENTS button 21 or ALPHABETICAL ORDER button 22, for example, attribute specifying unit 103 specifies the ingredients attribute to classifying unit 107; when receiving unit 102 receives instructions by SALT button 23, CALORIES button 24, or COOKING TIME button 25, attribute specifying unit 103 respectively specifies the salt, calories, or cooking time attribute to classifying unit 107.

Classification method specifying unit 104 specifies a classification method to classifying unit 107 based on an instruction received by receiving unit 102. When receiving unit 102 receives an instruction by INGREDIENTS button 21, for example, classification method specifying unit 104 specifies "classification by thesaurus," which will be later described, to classifying unit 107; when receiving unit 102 receives an instruction by ALPHABETICAL ORDER button 22, classification method specifying unit 104 specifies "classification by alphabetical order" to classifying unit 107; when receiving unit 102 receives instructions by SALT button 23, CALORIES button 24, or COOKING TIME button 25, classification method specifying unit 104 specifies "classification by numerals" to classifying unit 107.

Figure 5:
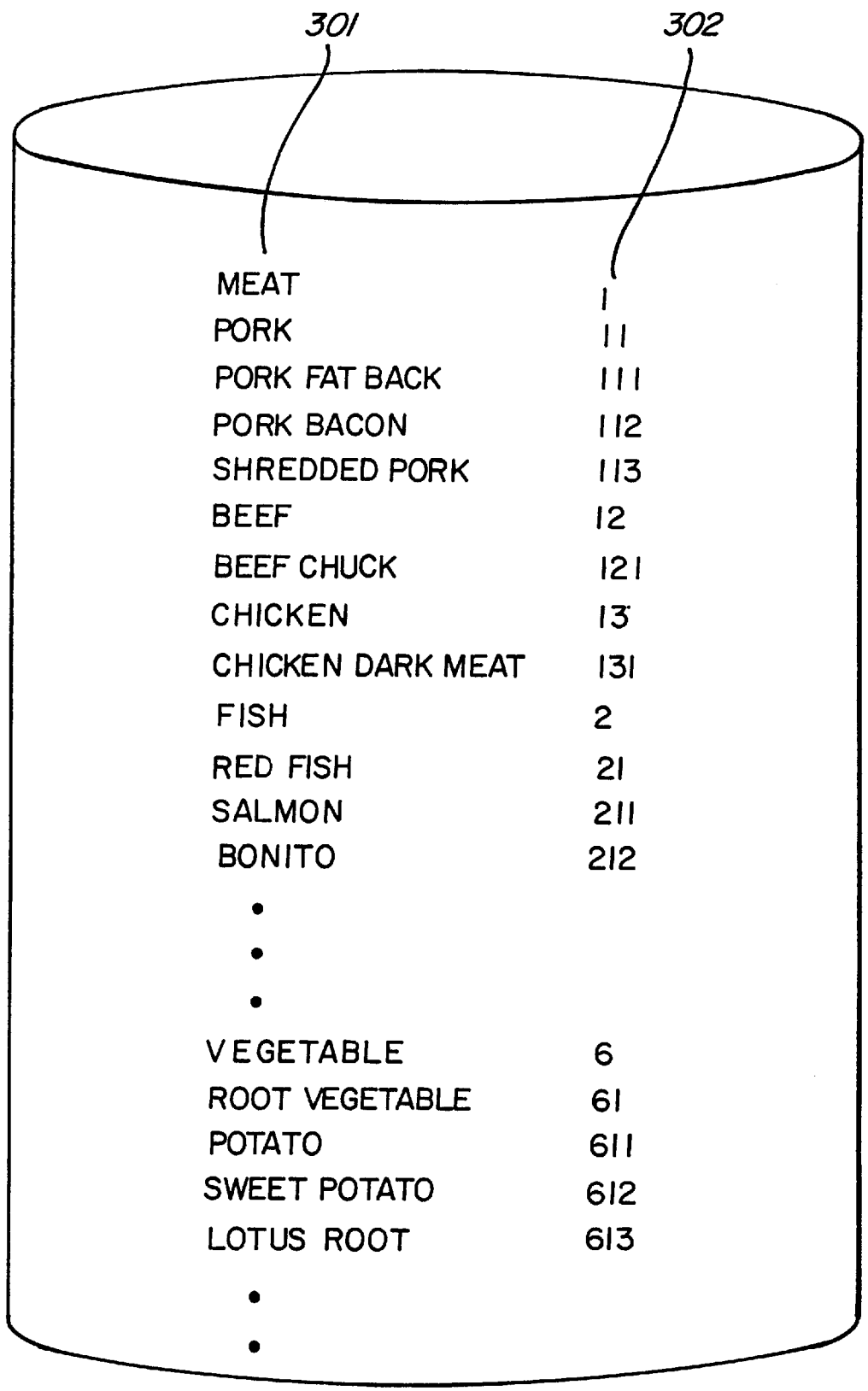
FIG. 5 shows contents of the thesaurus stored in thesaurus storing unit of the data retrieval support apparatus shown in FIG. 2.
Figure 6:
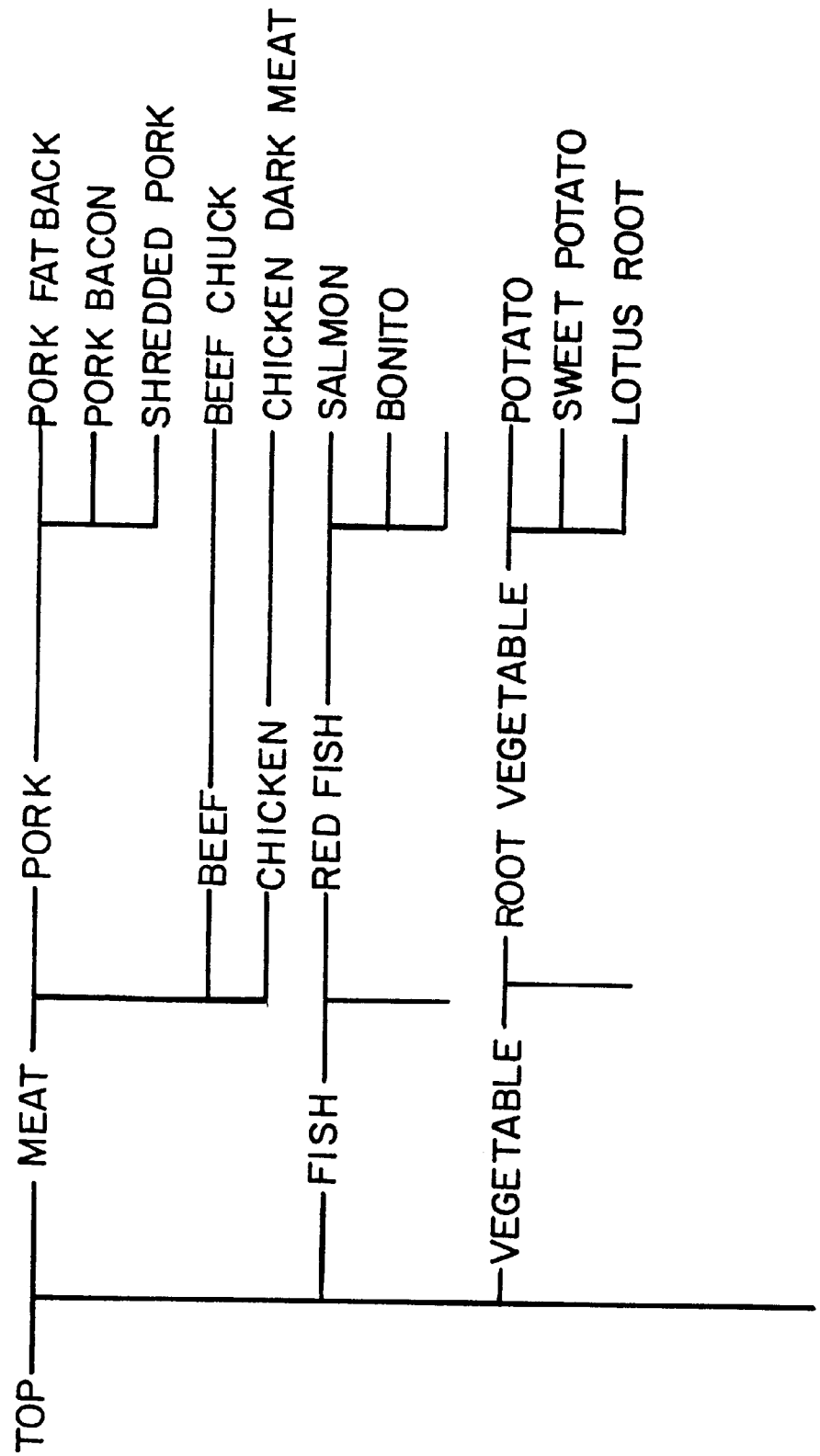
FIG. 6 shows the tree structure of the words stored in the thesaurus of the data retrieval support apparatus shown in FIG. 2.

Thesaurus storing unit 105, achieved by a magnetic disk, a ROM or the like, stores a thesaurus, where the thesaurus is a dictionary including higher level words and lower level words and showing relation between the higher level words and the lower level words. FIG. 5 shows contents of the thesaurus stored in thesaurus storing unit 105. 301 indicates a column of words. 302 indicates a column of codes which are respectively related to the words. FIG. 6 shows the tree structure of the words stored in the thesaurus. The words closer to the top are in higher levels. MEAT in the drawing, for example, is a higher level word, or a higher category, of PORK, BEEF, and CHICKEN. Similarly, PORK is a higher level word of PORK FAT BACK, PORK BACON, and SHREDDED PORK. The codes shown in FIG. 5 identify corresponding words and indicate levels in the relation between the higher level words and the lower level words. The code for PORK FAT BACK, for example, is 111, and PORK, which is a higher level word of PORK FAT BACK, corresponds to code 11 which is composed of higher two digits of code 111. As is understood by this, the number of digits in the codes indicates distance from the top of the tree structure. Note that thesaurus storing unit 105 may also be achieved by a floppy disk, a CD-ROM, or a magnet optical disk and a dedicated drive for reading data from one of the media.

Thesaurus searching unit 106, on receiving a word from classifying unit 107, searches thesaurus storing unit 105 for a higher level word of the word. When thesaurus searching unit 106 receives word PORK FAT BACK from classifying unit 107, for example, thesaurus searching unit 106 first searches thesaurus storing unit 105 and obtains code 111 which corresponds to PORK FAT BACK. Thesaurus searching unit 106 then obtains code 11 by cutting the lowest digit 1, and searches thesaurus storing unit 105, resulting in obtainment of word PORK which corresponds to code 11.

Classifying unit 107 classifies data stored in data storing unit 101 into groups with an attribute specified by attribute specifying unit 103 as a classification key and a classification method specified by classification method specifying unit 104. Classifying unit 107 includes thesaurus classifying unit 1071, alphabet classifying unit 1072, and numeral classifying unit 1073.

Thesaurus classifying unit 1071 is activated when classification method specifying unit 104 specifies the "classification by thesaurus" method and may be re-activated by controlling unit 112 which will be described later. Thesaurus classifying unit 1071 classifies data stored in data storing unit 101 into groups with the ingredients attribute specified by attribute specifying unit 103 as a classification key.

When classification method specifying unit 104 specifies "classification by thesaurus," thesaurus classifying unit 1071 first extract all the attribute values of the ingredients attribute and the attribute values of the dish name attribute related to the attribute values of the ingredients attribute, making pairs of an ingredient attribute value and a dish name attribute value. Thesaurus classifying unit 1071 stores the pairs as sub-data into group storing unit 108 which will be described later. FIG. 7 shows the sub-data stored in group storing unit 108. Thesaurus classifying unit 1071 classifies the sub-data into groups, resulting in a classification of the data in data storing unit 101, where the sub-data is used as identifiers of the data stored in data storing unit 101. This reduces the storage capacity of group storing unit 108. Thesaurus classifying unit 1071 further classifies the sub-data into groups so that each group is composed of pieces of sub-data including a common attribute value. Two pieces of sub-data, "PORK FAT BACK-SAUTEED PORK WITH GARLIC" and "PORK FAT BACK-SAUTEED PORK WITH APPLE SAUCE" are, for example, classified into the same one group since they have a common ingredient attribute value, "PORK FAT BACK." FIG. 8 shows the contents of group storing unit 108 when the classification of the sub-data by thesaurus classifying unit 1071 has been completed. The drawing shows the first part of the data.

When thesaurus classifying unit 1071 is re-activated by controlling unit 112, group storing unit 108 already includes data having been classified into groups. Thesaurus classifying unit 1071 uses thesaurus searching unit 106 to obtain a higher level word of the attribute value of the ingredients attribute of each group, and stores the higher level words in group storing unit 108. Thesaurus searching unit 106, for example, obtains PORK as a higher level word of the first group in group storing unit 108, the group having PORK FAT BACK as a common word as shown in FIG. 9, as described earlier. As a result, thesaurus classifying unit 1071 stores PORK in group storing unit 108 with a form as shown in FIG. 10. Underlined words shown in FIGS. 9 and 10 are group titles which are made by group title generating unit 109. Group title generating unit 109 and group titles will be described later. FIG. 10 shows the contents of group storing unit 108 when all the higher level words for the groups in group storing unit 108 have been retrieved. Thesaurus classifying unit 1071 further classifies the groups into other groups so that each group is composed of groups including a common higher level word. Two groups, the "PORK FAT BACK" group and the "SHREDDED PORK" group are, for example, classified into the same one group since they have a common higher level word, "PORK." FIG. 11 shows the contents of group storing unit 108 when all the groups in group storing unit 108 have been classified into new groups based on the higher level words. Suppose FIG. 11 shows the first three groups of 10 groups. In the classification of the groups into new groups, sub-data with the same dish name is deleted from each new group. As shown in FIG. 11, for example, sub-data "PIMIENTO-SAUTEED PORK WITH GARLIC" has been deleted since it has the same dish name as sub-data "CELERY-SAUTEED PORK WITH GARLIC."

Alphabet classifying unit 1072 is activated when classification method specifying unit 104 specifies the "classification by alphabetical order" method and may be re-activated by controlling unit 112 which will be described later. Alphabet classifying unit 1072 classifies data stored in data storing unit 101 into groups and arranges the groups by alphabetical order with the ingredients attribute specified by attribute specifying unit 103 as a classification key.

When classification method specifying unit 104 specifies "classification by alphabetical order," alphabet classifying unit 1072, as thesaurus classifying unit 1071, first extracts all the attribute values of the ingredients attribute and the attribute values of the dish name attribute related to the attribute values of the ingredients attribute, making pairs of an ingredient attribute value and a dish name attribute value. Alphabet classifying unit 1072 stores the pairs as sub-data into group storing unit 108, as shown in FIG. 8. Alphabet classifying unit 1072 classifies the sub-data into groups, then arranges the groups in alphabetical order of the ingredient attributes. FIG. 12 shows the contents of group storing unit 108 when the arrangement of the groups by alphabetical order has been completed.

When alphabet classifying unit 1072 is re-activated by controlling unit 112, group storing unit 108 already includes data having been classified into groups and arranged in alphabetical order. Alphabet classifying unit 1072 further classifies the groups into new groups so that each new group is composed of a certain number of groups. The certain number of groups is specified by controlling unit 112. When the certain number is 4, for example, alphabet classifying unit 1072 divides the groups into new groups each of which includes four groups. FIG. 13 shows the contents of group storing unit 108 when the classification of the groups into new groups based on the number specified by controlling unit 112 has been completed. The new groups are separated from one another by dotted lines.

Numeral classifying unit 1073 is activated when classification method specifying unit 104 specifies the "classification by numerals" method and may be re-activated by controlling unit 112. Numeral classifying unit 1073 classifies data stored in data storing unit 101 into groups based on one of the salt attribute, the calories attribute, and the cooking time attribute specified by attribute specifying unit 103.

When classification method specifying unit 104 specifies "classification by numerals" and attribute specifying unit 103 specifies "salt," numeral classifying unit 1073 first extract all the attribute values of the salt attribute and the attribute values of the dish name attribute related to the attribute values of the salt attribute, making pairs of a salt attribute value and a dish name attribute value. Numeral classifying unit 1073 stores the pairs as sub-data into group storing unit 108. FIG. 14 shows the sub-data stored in group storing unit 108. Numeral classifying unit 1073 classifies the sub-data into groups so that each group is composed of pieces of sub-data including a common attribute value. Two pieces of sub-data, "1.7 g-SAUTEED PORK WITH GARLIC" and "1.7 g-PORK FAT BACK STEW WITH TOMATO" are, for example, classified into the same one group since they have a common salt attribute value, "1.7 g." FIG. 15 shows the contents of group storing unit 108 when the classification of the sub-data by numeral classifying unit 1073 has been completed. Numeral classifying unit 1073 arranges the groups in ascending order of the numeral values as the attribute values of the salt attribute. FIG. 16 shows the contents of group storing unit 108 when all the groups in group storing unit 108 have been arranged. Suppose FIG. 16 shows the first part of 32 groups.

When numeral classifying unit 1073 is re-activated by controlling unit 112, group storing unit 108 already includes data having been classified into groups and arranged in ascending order. Numeral classifying unit 1073, as alphabet classifying unit 1072, further classifies the groups into new groups so that each new group is composed of a certain number of groups. FIG. 17 shows the contents of group storing unit 108 when the classification of the groups into new groups based on the number specified by controlling unit 112 has been completed.

Numeral classifying unit 1073 performs similar classifications and arrangements when attribute specifying unit 103 specifies "calories" or "cooking time."

Group storing unit, achieved by a magnetic disk, a RAM or the like, stores the sub-data generated and grouped by classifying unit 107.

Group title generating unit 109 is activated by controlling unit 112 and generates group titles of the groups generated by classifying unit 107. Group title generating unit 109 generates each group title so that it consists of the common attribute value and the number of pieces of sub-data in the group. When group storing unit 108 stores pieces of sub-data, a as shown in FIG. 8, each of which is composed of an attribute value and a dish name as a result of the classification by thesaurus, for example, group title generating unit 109 generates group title "PORK FAT BACK 7 ITEMS" for the first group in the drawing. Generated group titles are stored before the respective groups. FIG. 9 shows the contents of group storing unit 108 when group title generating unit 109 has generated the group titles which are underlined in the drawing. When the groups are further classified into other groups with the classification by alphabetical order or the classification by numerals, there is no common attribute value in each new group. FIG. 13 shows one example of such a case. In this case, group title generating unit 109 generates the group title so that it consists of the first and last attribute values and the number of pieces of data in the group. In case of this example shown in FIG. 13, group title generating unit 109 generates group title "ASPARAGUS-CELERY 5 ITEMS" for the first group. The operator can recognize that the group also includes attribute values such as "BROAD BEAN" or "CABBAGE" by the hyphenated two attribute values. FIG. 18 shows the contents of group storing unit 108 when group title generating unit 109 has generated the group titles which are underlined in the drawing. FIG. 19 shows the contents of group storing unit 108 when group title generating unit 109 has generated the group titles with the classification by numerals.

Displaying unit 110, which is a CRT (Cathode Ray Tube), an LCD (Liquid Crystal Display) or the like, displays a list of group titles stored in group storing unit 108. FIG. 20 shows a screen displayed by displaying unit 110 immediately after the data retrieval support apparatus is activated. 501 in the drawing indicates the number of pieces of data stored in data storing unit 101. In this case, the number is 91. 502 in the drawing indicates a list of dish names which are the attribute values of the dish name attribute. The drawing shows the first 10 dish names of 91 dish names. The reversed line, "SAUTEED PORK WITH GARLIC," indicates that the attribute value has been selected by the operator. PRE- VIOUS PAGE button 503 is used to display the previous page. When receiving unit 102 receives an instruction which is sent when this button is specified, controlling unit 112 instructs displaying unit 110 to display the previous page. Similarly, NEXT PAGE button 504 is used for displaying the next page. DETERMINE button 505 is used to display the detailed data of the selected (reversed) item. Buttons 506 and 507 are used to change the selected item. Button 506 is used to select an upper item; button 507 is used to select a lower item.

Figure 23:
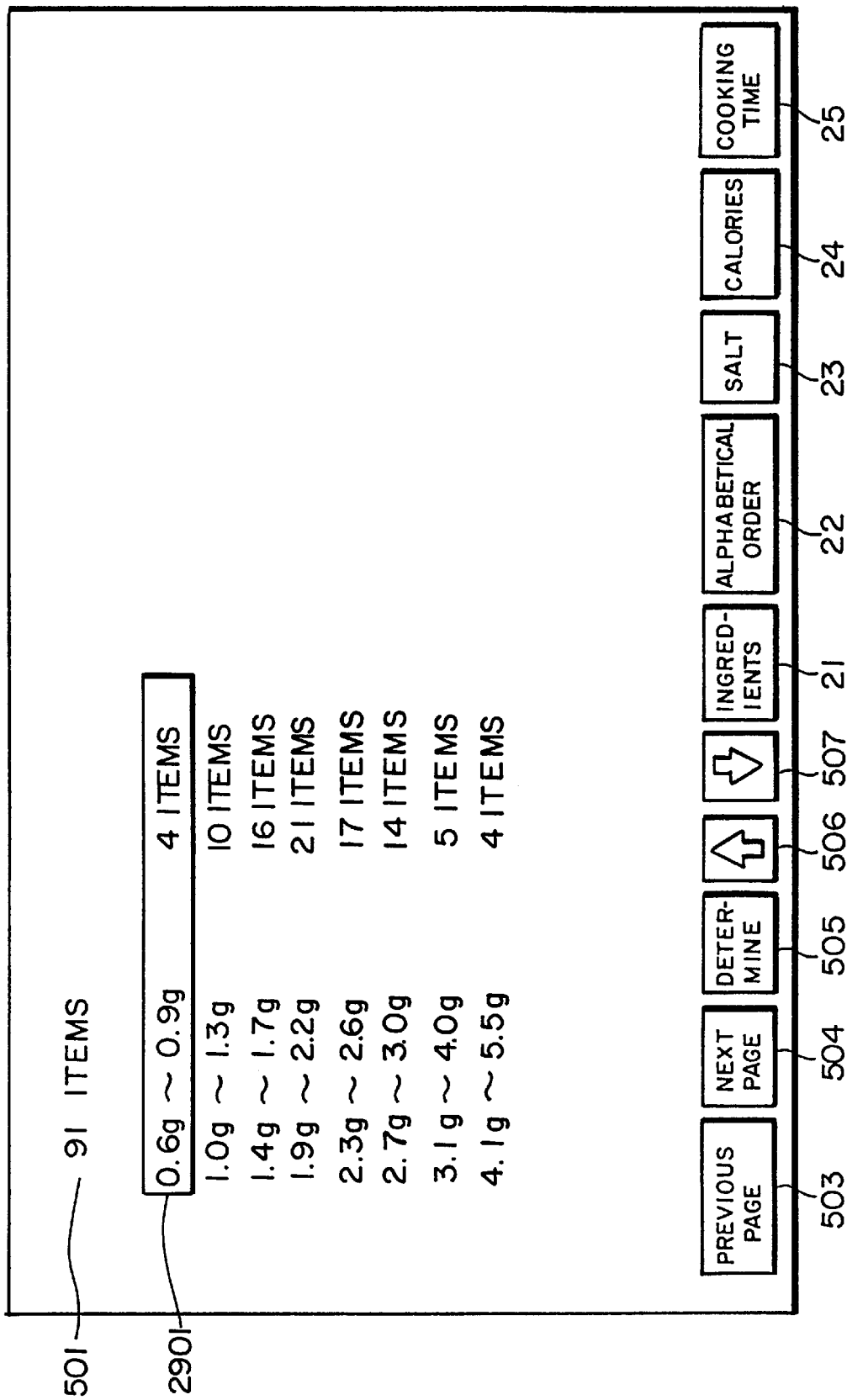
FIG. 23 shows a list of group titles generated by the CLASSIFICATION BY NUMERALS which is displayed on the displaying unit of the data retrieval support apparatus shown in FIG. 2.

FIGS. 21, 22, and 23 show examples of lists of group titles, respectively for classification methods,. "classification by thesaurus," "classification by alphabetical order," and "classification by numerals." When the operator selects one group title and specifies DETERMINE button 505, displaying unit 110 displays a list of dish names included in the specified group read from group storing unit 108. When the operator, for example, selects "PORK 9 ITEMs" and specifies DETERMINE button 505 on the screen shown in FIG. 21, displaying unit 110 displays a list of dish names included in this group, as shown in FIG. 24.

Figure 25:
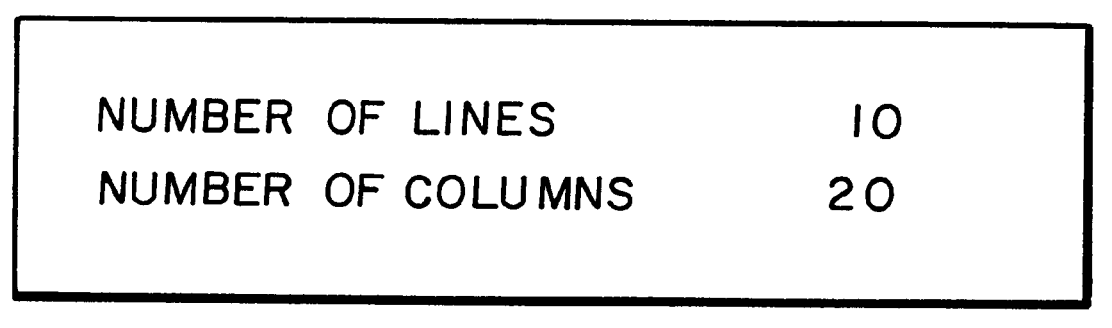

Maximum number storing unit 111, which is achieved by a ROM or the like, stores maximum numbers of data units that can be displayed. FIG. 25 shows the contents of maximum number storing unit 111. The contents indicate that displaying unit 110 can display 10 character lines and 20 character columns at the most at a time.

When controlling unit 112 controls classifying unit 107, group title generating unit 109, and displaying unit 110 by referring to group storing unit 108 and maximum number storing unit 111. After group title generating unit 109 has completed the generation of group titles, controlling unit 112 compares the number of group titles stored in group storing unit 108 with the maximum numbers stored in maximum number storing unit 111. Here, it is defined that when each group title is fed with the return key, the number of group titles is equal to the number of character lines. When controlling unit 112 judges that the number of characters in a group title is greater than the maximum numbers stored in maximum number storing unit 111, controlling unit 112 re-activates classifying unit 107. When the number of characters in a group title is, for example, greater than 10, namely, the maximum number of character lines stored in maximum number storing unit 111, controlling unit 112 re-activates classifying unit 107. When it happens, if the data has been classified with the classification by thesaurus, controlling unit 112 re-activates thesaurus classifying unit 1071; if the data has been classified with the classification by alphabetical order, controlling unit 112 re-activates alphabet classifying unit 1072; and if the data has been classified with the classification by numerals, controlling unit 112 re-activates numeral classifying unit 1073. Before re-activating alphabet classifying unit 1072, controlling unit 112 specifies a certain number required for a re-classification to alphabet classifying unit 1072. Controlling unit 112 determines the certain number as follows. Controlling unit 112 refers to maximum number storing unit 111 and divides the number of group titles by the maximum number of character lines, then adds 1 to the quotient if there is any remainder. When, for example, the number of groups is 32 and the maximum number of character lines is 10, controlling unit 112 finally obtains 4 as the certain number after dividing 32 by 10 and adding 1 to the quotient 3 since there is a remainder, 2. Before re-activating numeral classifying unit 1073, controlling unit 112 similarly specifies a certain number required for a re-classification to numeral classifying unit 1073. In case controlling unit 112 judges that the number of characters in a group title is smaller than the maximum numbers stored in maximum number storing unit 111, controlling unit 112 re-activates displaying unit 110. Displaying unit 110 then displays a list of group titles. Controlling unit 112 activates group title generating unit 109 when classifying unit 107 completes a classification of groups, and activates displaying unit 110 when group title generating unit 109 completes a generation of group titles.

Figure 26:
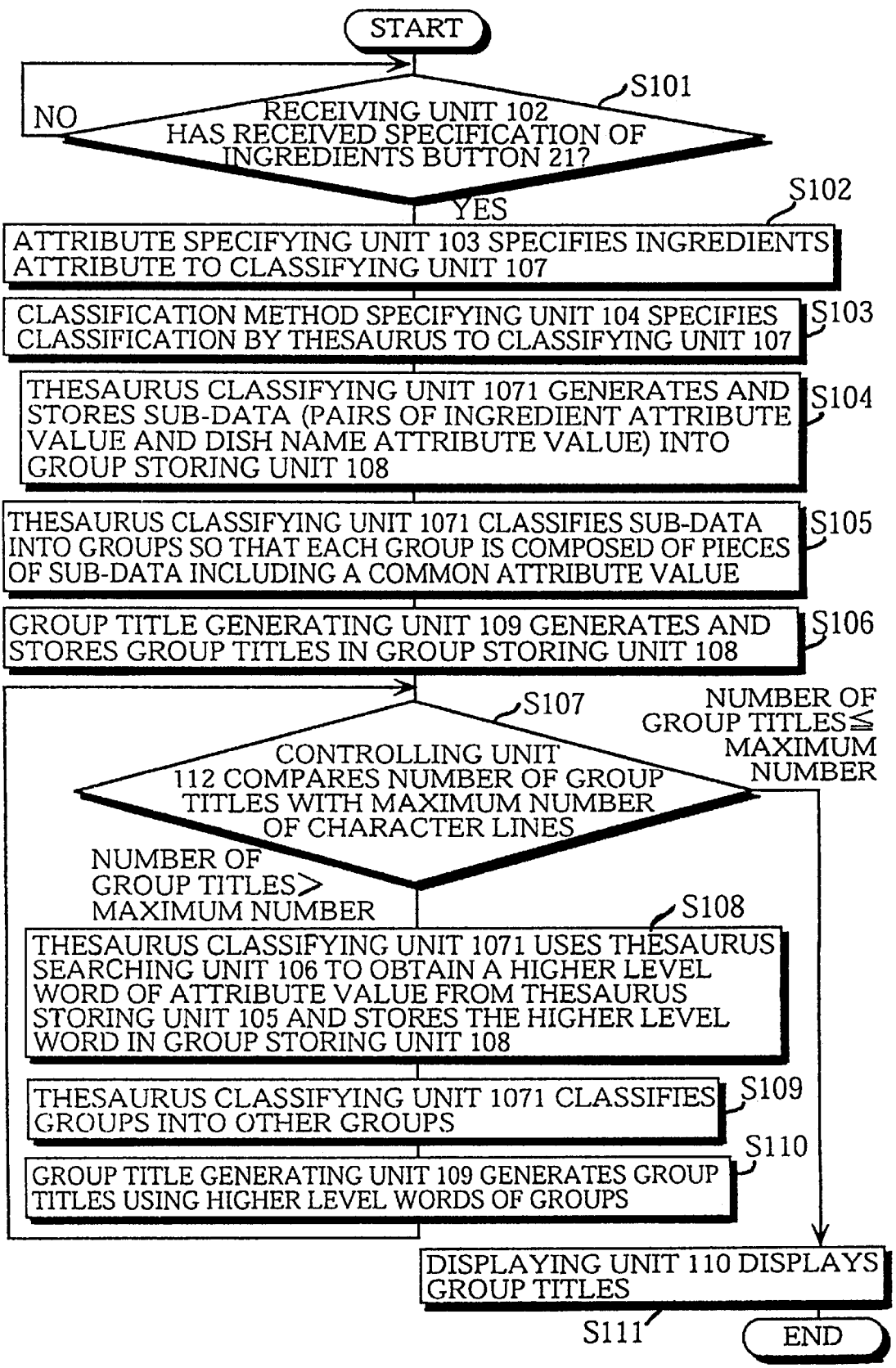
FIG. 26 is a flowchart of the operation when the data retrieval support apparatus shown in FIG. 2 uses the classification by thesaurus.

Now, the operation of the data retrieval support apparatus in classifying data with the classification by thesaurus is described, with reference to the flowchart of FIG. 26.

When the data retrieval support apparatus is activated, displaying unit 110 displays the data read from data storing unit 101 on the screen and also displays various function buttons at the bottom of the screen, as shown in FIG. 20.

It is judged in step S101 whether receiving unit 102 has received an instruction specifying INGREDIENTS button 21 from the operator. If judged as received, attribute specifying unit 103 specifies the ingredients attribute to classifying unit 107 (step S102), and classification method specifying unit 104 specifies the classification by thesaurus to classifying unit 107 (step S103). Thesaurus classifying unit 1071, activated when the classification by thesaurus is specified, extract all the attribute values of the ingredients attribute and the attribute values of the dish name attribute related to the attribute values of the ingredients attribute, making pairs of an ingredient attribute value and a dish name attribute value. Thesaurus classifying unit 1071 stores the pairs as sub-data into group storing unit 108, as shown in FIG. 7 (step S104). Thesaurus classifying unit 1071 classifies the sub-data into groups, as shown in FIG. 8 (step S105). Group title generating unit 109 is activated by controlling unit 112 after the above classification is complete. Group title generating unit 109 generates group titles of the classified groups and stores the group titles in group storing unit 108, as shown in FIG. 9 (step S106). Controlling unit 112 compares the number of group titles stored in group storing unit 108 with the maximum number of character lines stored in maximum number storing unit 111 (step S107). In this case, since the number of group titles is greater than the maximum number of character lines, thesaurus classifying unit 1071 uses thesaurus searching unit 106 to obtain a higher level word of the attribute value of the ingredients attribute of each group, and stores the higher level words in group storing unit 108, as shown in FIG. 9 (step S108). Thesaurus classifying unit 1071 further classifies the groups into other groups, as shown in FIG. 11 (step S109). Group title generating unit 109 generates the group titles of the re-classified groups, as shown in FIG. 27 (step S110). Control returns to step S107 and controlling unit 112 compares the number of group titles with the maximum number of character lines. After a re-classification in step S109, the number of groups becomes 9 and the number of group titles is smaller than the maximum number of character lines. Accordingly, displaying unit 110 displays a list of group titles, as shown in FIG. 21 (step S111).

Figure 28:
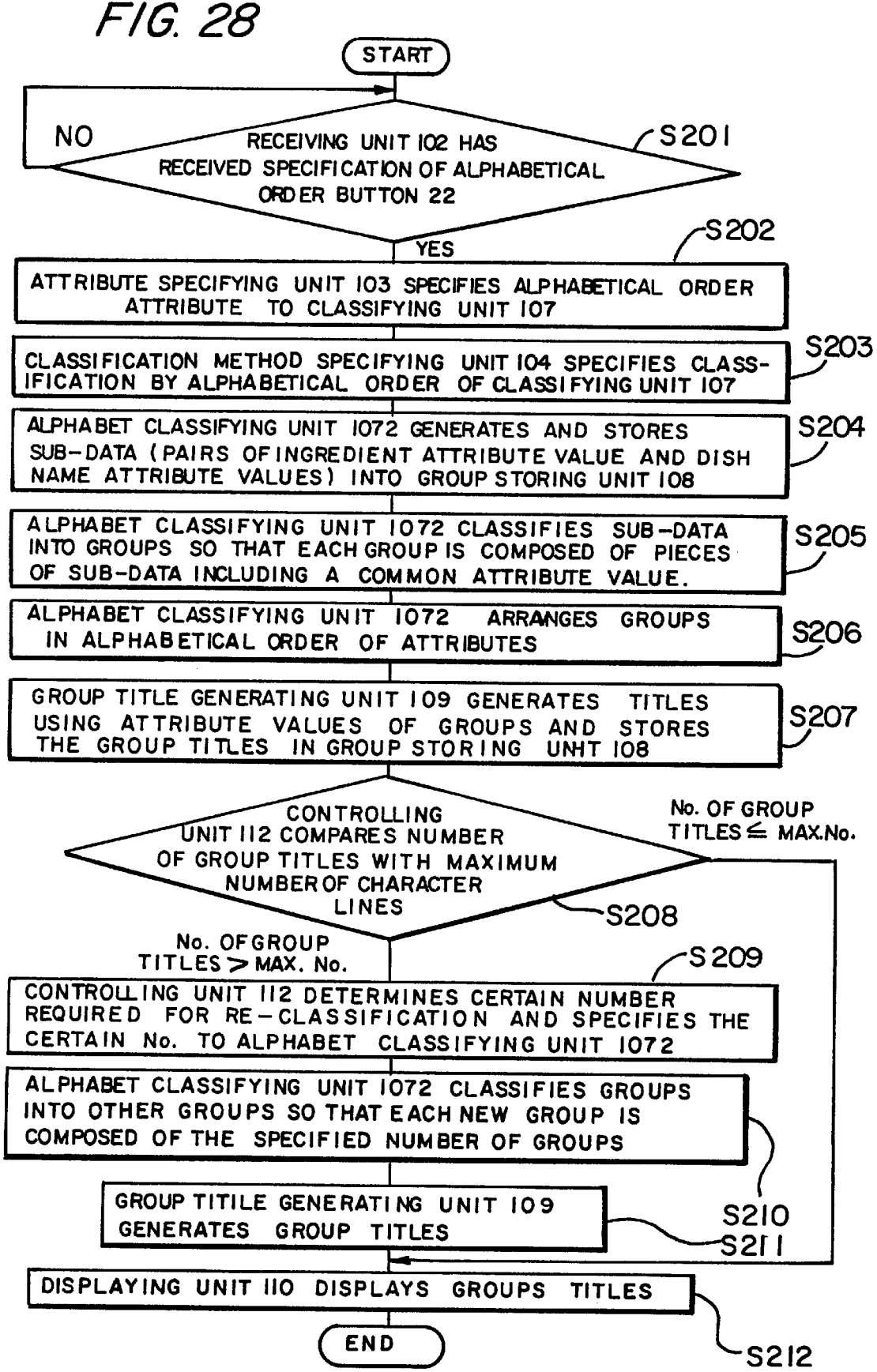
FIG. 28 is a flowchart of the operation when the data retrieval support apparatus shown in FIG. 2 uses the classification by alphabetical order.

Now, the operation of the data retrieval support apparatus in classifying data with the classification by alphabetical order is described, with reference to the flowchart of FIG. 28.

It is judged in step S201 whether receiving unit 102 has received an instruction specifying ALPHABETICAL ORDER button 22 from the operator. If judged as received, attribute specifying unit 103 specifies the ingredients attribute to classifying unit 107 (step S202), and classification method specifying unit 104 specifies the classification by alphabetical order to classifying unit 107 (step S203). Alphabet classifying unit 1072, activated when the classification by alphabetical order is specified, extract all the attribute values of the ingredients attribute and the attribute values of the dish name attribute related to the attribute values of the ingredients attribute, making pairs of an ingredient attribute value and a dish name attribute value. Alphabet classifying unit 1072 stores the pairs as sub-data into group storing unit 108, as shown in FIG. 8 (step S204). Alphabet classifying unit 1072 classifies the sub-data into groups (step S205). Alphabet classifying unit 1072 then arranges the groups in alphabetical order of the ingredient attributes (step S206). Group title generating unit 109 is activated by controlling unit 112 after the above arrangement is complete. Group title generating unit 109 generates group titles of the classified groups and stores the group titles in group storing unit 108, as shown in FIG. 29 (step S207). Controlling unit 112 compares the number of group titles stored in group storing unit 108 with the maximum number of character lines stored in maximum number storing unit 111 (step S208). In this case, since the number of group titles is greater than the maximum number of character lines, controlling unit 112 determines a certain number required for a re-classification and specifies the certain number to alphabet classifying unit 1072 (step S209). In this case, the certain number is 4. Alphabet classifying unit 1072 further classifies the groups into other groups so that each new group is composed of four groups, as shown in FIG. 13 (step S210). Group title generating unit 109 generates the group titles of the re-classified groups, as shown in FIG. 18 (step S211). Displaying unit 110 displays a list of group titles, as shown in FIG. 22 (step S212).

Figure 30:
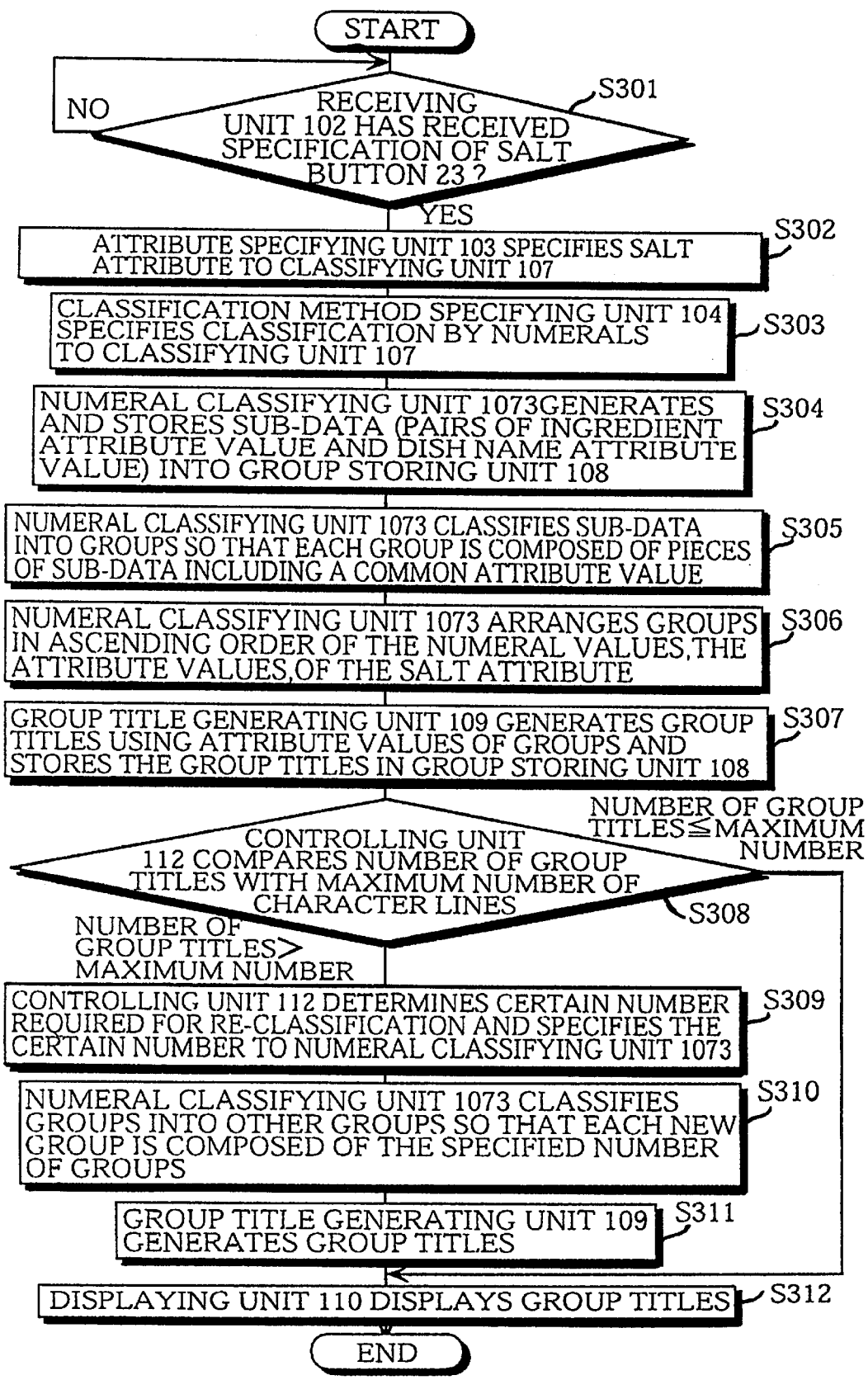
FIG. 30 is a flowchart of the operation when the data retrieval support apparatus shown in FIG. 2 uses the classification by numerals.

Now, the operation of the data retrieval support apparatus in classifying data is described with SALT button and the classification by numerals specified, with reference to the flowchart of FIG. 30.

It is judged in step S301 whether receiving unit 102 has received an instruction specifying SALT button 23 from the operator. If judged as received, attribute specifying unit 103 specifies the salt attribute to classifying unit 107 (step S302), and classification method specifying unit 104 specifies the classification by numerals to classifying unit 107 (step S303). Numeral classifying unit 1073, activated when the classification by numerals is specified, extract all the attribute values of the salt attribute and the attribute values of the dish name attribute related to the attribute values of the salt attribute, making pairs of a salt attribute value and a dish name attribute value. Numeral classifying unit 1073 stores the pairs as sub-data into group storing unit 108. FIG. 14 shows the sub-data stored in group storing unit 108 (step S304). Numeral classifying unit 1073 classifies the sub-data into groups so that each group is composed of pieces of sub-data including a common attribute value (step S305). Numeral classifying unit 1073 arranges the groups in ascending order of the numeral values, the attribute values, of the salt attribute (step S306). Group title generating unit 109 is activated by controlling unit 112 after the above arrangement is complete. Group title generating unit 109 generates group titles of the classified groups and stores the group titles in group storing unit 108, as shown in FIG. 31 (step S307). The subsequent processes (steps S308–312) are the same as those for the classification by alphabetical order.

Similar processes are performed for a specification of CALORIES button or COOKING TIME button. In such a case, the flowchart of FIG. 30 may be used by replacing SALT button 23 in step S301 by CALORIES button 24 or COOKING TIME button 25, and by replacing the salt attribute in step S302 by the calories attribute or the cooking time attribute.

As is described above, even if the amount of data or retrieval result data is very large, the data retrieval support apparatus of the present invention classifies the data into groups until the number of groups is reduced to such a value as whole groups titles are displayed on the screen, with classification methods such as the classification by thesaurus, classification by alphabetical order, and classification by numerals. This enables the operator to easily retrieve data operating on the screen which displays a list of the group titles.

In the present embodiment, the data pre-stored in data storing unit 101 is classified into groups. However, the data retrieval support apparatus may also classify data obtained as a result of data retrieval with key word retrieval or the like, with reduced amount, into groups. For achieving this, the data retrieval support apparatus includes a retrieving unit for performing keyword retrieval or the like.

There may be a case, depending on the specified attribute or classification method, in which the data cannot be classified into groups whose number is such a value as whole groups titles are displayed on the screen. In such a case, controlling unit 112 may instruct classifying unit 107 to further classify the groups into other groups by specifying another attribute or classification method. In doing so, the apparatus may include a specifying unit for specifying an attribute or classification method, or another existent unit may be used.

In the present embodiment, classifying unit 107 classifies data into groups based on one attribute. However, two or more attributes may be used for the classification. Classifying unit 107 may classify data into groups, for example, based on the salt attribute and the cooking time attribute so that each group is composed groups including common attribute values, such as 1.3 g of salt and 20 minutes of cooking time. In this case, receiving unit 102 receives a plurality of attributes specified by the operator. Attribute specifying unit 103 specifies the plurality of attributes. Classifying unit 107 classifies data into groups based on the specified plurality of attributes. Such a specification of a plurality of attributes is effective when target attributes include a small number of kinds of attribute values.

In the present embodiment, receiving unit 102 receives specifications of an attribute and a classification method through buttons 21 to 25. However, receiving unit 102 may receive an attribute and a classification method independently and specify an attribute and a classification method independently.

In the present embodiment, classifying unit 107 classifies data using the attribute values of the dish name attribute. However, any attribute, such as the address of data, may be used instead of the dish name attribute as far as each piece of data is identified.

In the present embodiment, classifying unit 107 stores data in group storing unit 108 in the form of sub-data. However, if group storing unit 108 includes enough storage capacity, classifying unit 107 may store data in the form of cooking data instead of sub-data.

In the present embodiment, alphabet classifying unit 1072 arranges data in ascending alphabetical order. However, alphabet classifying unit 1072 may arrange data in descending alphabetical order.

In the present embodiment, alphabet classifying unit 1072 arranges data in alphabetical order. However, in case data is written in Japanese, alphabet classifying unit 1072 may arrange the data in the order of Japanese syllabary. FIG. 67 shows the Japanese syllabary. The Japanese syllabary is composed of 46 elements, including 45 combinations of five vowels (a, i, u, e, o) and nine consonants (k, s, t, n, h, m, y, r, w) and one independent character (n). Of these, 45 elements are divided into 10 groups, or rows, such as "a row" and "ka row."

Alphabet classifying unit 1072 may arrange data based on the rows of the Japanese syllabary.

Classifying unit 107 may classify data into groups so that each group is composed of a plurality pieces of data whose number is equal to the maximum number of character lines that can be displayed on the screen.

In the present embodiment, the thesaurus stores words and corresponding codes, and there may be a case in which the attribute values of two groups belong to different levels with different number of digits. In such a case, the two groups cannot be included in the same group of a higher level. Suppose, for example, one group has attribute value "PORK" and another group has attribute value "SHREDDED PORK." The higher level words for these attribute values are respectively "MEAT" and "PORK." Accordingly, these groups are not classified into the same group. To solve such a problem, the apparatus may include a hierarchical level specifying unit. The hierarchical level specifying unit specifies a hierarchical level (number of digits in a code) for all higher level words. The hierarchical level may be specified by the operator. Thesaurus searching unit 106 retrieves a higher level word whose code has the specified number of digits. This enables the data retrieval support apparatus to classify groups with attribute values in different levels of the thesaurus into the same group since the apparatus retrieves a higher level word whose code has the same number of digits. It is also possible to reduce the number of groups to be generated by instructing the hierarchical level specifying unit to reduce the number of digits in code gradually. Controlling unit 112 may instruct the hierarchical level specifying unit to reduce the number of digits in code gradually when displaying unit 110 cannot display all the generated group titles and may re-activate thesaurus classifying unit 1071 to reduce the number of group titles until displaying unit 110 can display all the generated group titles.

Figure 32:
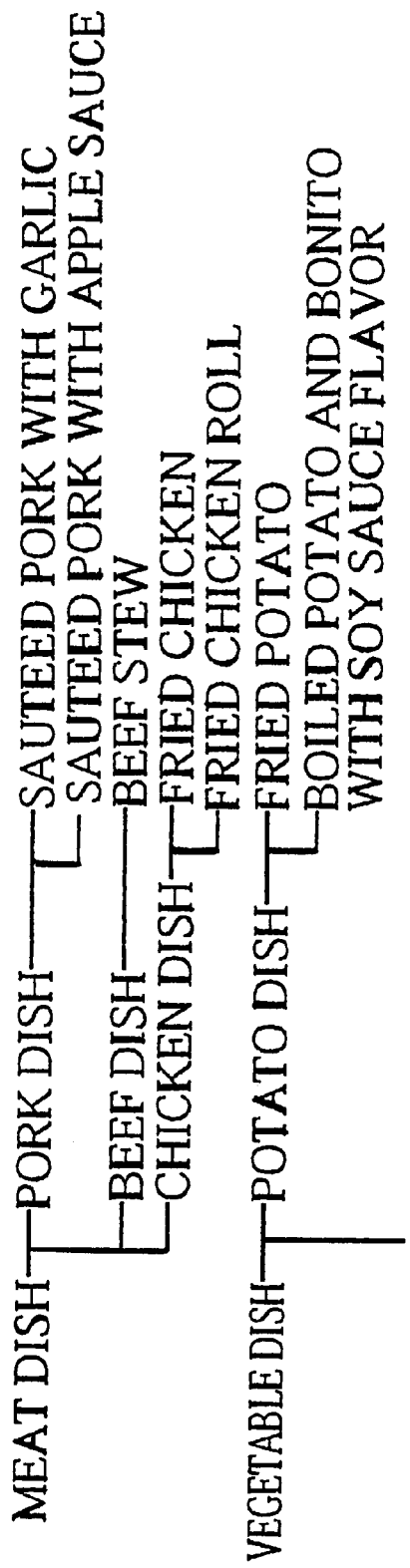
FIG. 32 shows an example of classification information stored in the classification information storing unit of the data retrieval support apparatus shown in FIG. 2.

Thesaurus classifying unit 1071 may classify data with a hierarchical structure, such as a book whose contents are divided into chapters, paragraphs and the like, by regarding the contents as a thesaurus. In such a case, the data retrieval support apparatus includes a classification information storing unit. FIG. 32 shows an example of classification information in which cooking data as shown in FIG. 3 is divided into three hierarchical levels. The broadest level includes MEAT DISH and VEGETABLE DISH. When thesaurus classifying unit 1071 classifies such data by regarding the structure as the thesaurus, receiving unit 102 receives an instruction through a button dedicated for cooking classification. When receiving unit 102 receives the instruction through the button, attribute specifying unit 103 specifies the cooking classification to classifying unit 107 and classification method specifying unit 104 specifies the classification by thesaurus to classifying unit 107. Thesaurus classifying unit 1071 classifies data into groups by regarding the classification information storing unit as a thesaurus. This classification method applied to the whole data requires almost the same operations as the menu search in conventional electronic books. However, the present classification method differs from the menu search in that the present apparatus can classifies data into groups using the classification information and display the group titles even if the data has been a result of executions by other methods such as the keyword search.

When the hierarchical level specifying unit specifies the number of digits in code which is greater than that of an attribute value, thesaurus searching unit 106 may search all the lower level words, enabling a classification based on a word in the same level.

Numeral classifying unit 1073 may classify data into groups based on a constant certain number such as "1 g" and "2 g."

In the present embodiment, numeral classifying unit 1073 classifies data into groups in ascending order. However, numeral classifying unit 1073 may classify data into groups in descending order.

Numeral classifying unit 1073 may classify data into groups so that each pair of groups overlap. FIG. 33 shows a result of such a classification. As is understood from this drawing, a piece of data including attribute value "1.0" is included both in the first and second groups. To achieve such a classification, the data retrieval support apparatus includes an overlap width specifying unit. The overlap width specifying unit specifies a certain overlap width. The overlap width may be specified by the operator. The overlap width is the number of pieces of data which is a common part of two overlapping groups. Numeral classifying unit 1073 determines the number of pieces of data in one group by adding the overlap width to the certain number which is specified by controlling unit 112. When the certain number is 4 and the overlap width is 1, for example, numeral classifying unit 1073 determines the number of pieces of data in one group as 5, by adding 4 to 1. As a result of determining the number as 5, numeral classifying unit 1073 first classifies the first five pieces of data in group storing unit 108 as one group; numeral classifying unit 1073 classifies five pieces of data starting from the fifth piece of data as the next group. Such an arrangement increases the possibility that a selected group includes a desired piece of data even if the group includes a small number of pieces of data.

In the present embodiment, group title generating unit 109 generates group titles including the number of pieces of data in each group. However, group title generating unit 109 may generate group titles excluding the number of pieces of data in each group.

Group title generating unit 109 may generate a group title including an attribute value instead of the number of pieces of data when the group includes only one piece of data. The sixth group in FIG. 9, for example, has group title "APPLE 1 ITEM." Here, group title generating unit 109 may generate group title "APPLE SAUTEED PORK WITH APPLE SAUCE" which includes the dish name instead of the number of pieces of data. With such an arrangement, the operator easily recognizes the name of the dish that includes apple as an ingredient.

Group title generating unit 109 may generate group title names including an attribute value specified by the operator. In such a case, the data retrieval support apparatus includes a group title attribute specifying unit. The group title attribute specifying unit receives an attribute specified by the operator which is used for generating a group title. Group title generating unit 109 fetches attribute values of the attribute specified by the group title attribute specifying unit from data storing unit 101, which is achieved by using the dish names obtained via the sub-data of the group. Group title generating unit 109 then generates a group title using the common attribute value of the group, attribute values of the attribute specified by the group title attribute specifying unit, and the number of pieces of data in the group. Group title generating unit 109 generates, for example, group title "pork fat back 20 minutes 3 items 30 minutes 4 items" when the group title attribute specifying unit receives the cooking time attribute specified by the operator, when the common attribute value of the group is PORK FAT BACK, when the group includes seven pieces of data, and when, of these, three pieces of data have attribute value "20 minutes" and four pieces of data have attribute value "30 minutes" for the cooking time attribute.

In the present embodiment, group title generating unit 109 generates group titles using the first and last attribute values of each group. However, group title generating unit 109 may use either of the first and last attribute values. FIG. 34 shows group titles using the first attribute value. With such an arrangement, the operator easily recognizes the group starting from ASPARAGUS also includes CABBAGE, CELERY, and the like watching the group titles of this and the next groups which respectively include ASPARAGUS and DUCK. FIG. 35 shows group titles using the last attribute value of the numeral attribute.

Group title generating unit 109 may generate group titles further including the number of kinds of the attribute values of the ingredients attribute, such as "PORK 2 INGREDIENTS 9 ITEMS."

Group title generating unit 109 may generate group titles consisting of a mean value of the attribute values of the numeral attribute. With such an arrangement, the operator recognizes, for example, that the group is composed of pieces of data with around the indicated amount of salt. Group title generating unit 109 may, for example, calculate the mean value.

In the present embodiment, displaying unit 110 displays detailed data, namely pieces of data, which belong to the group selected by the operator. However, there may be a case in which all the pieces of data of the group are displayed. When the user selects, for example, "WHITE FISH 21 ITEMS" on the list as shown in FIG. 21, the first 10 pieces of data are displayed. The operator uses NEXT PAGE button 504 for displaying the other pieces of data. However, the 21 pieces of data may further be classified into groups. For achieving this, controlling unit 112 includes a judging unit. The judging unit refers to maximum number storing unit 111 and judges whether the number of pieces of data of the selected group exceeds the maximum number of lines for display: if not, the judging unit allows displaying unit 110 to display the data of the selected group; if exceeds, the judging unit instructs classifying unit 107 to classify the selected group into other groups and allows group title generating unit 109 to generate a group title for each of the newly classified groups.

When the display unit displays a plurality of windows on the screen, and when the operator can change the number of display lines and display columns of each window, the maximum number of lines and columns stored in the maximum number storing unit may be changed according to the number of display lines and display columns of each window currently displayed.

The data retrieval support apparatus may include a reading unit instead of data storing unit 101. In such a case, the reading unit reads data from a storage medium storing a plurality pieces of data, and classifying unit 107 classifies the read data into groups.

Embodiment 2

The following is a description of another embodiment of the present invention, a data retrieval support apparatus.

Figure 36:
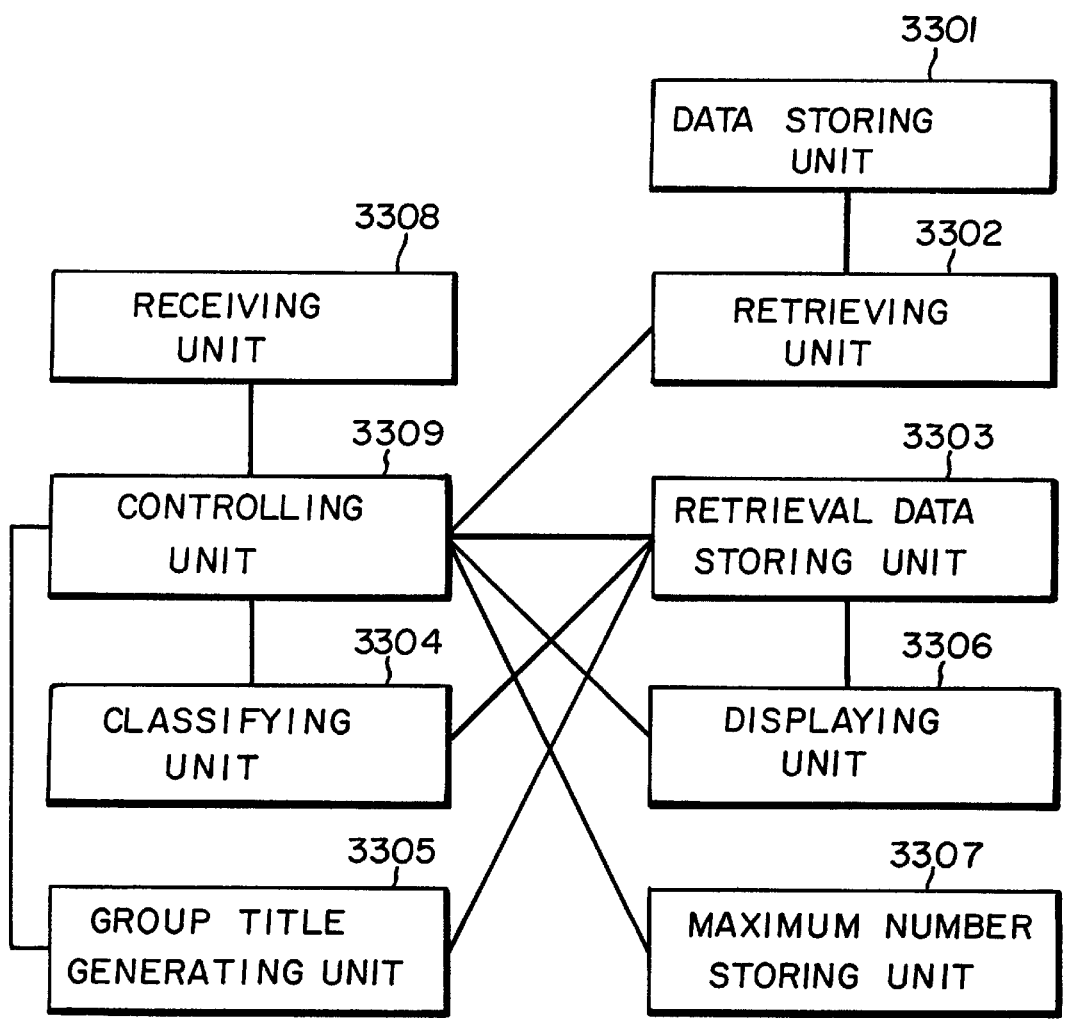
FIG. 36 is a block diagram showing the construction of the data retrieval support apparatus of Embodiment 2.

FIG. 36 is a block diagram showing the construction of the data retrieval support apparatus. The data retrieval support apparatus is composed of data storing unit 3301, retrieving unit 3302, retrieval data storing unit 3303, classifying unit 3304, group title generating unit 3305, displaying unit 3306, maximum number storing unit 3307, receiving unit 3308, and controlling unit 3309.

Data storing unit 3301, achieved by a magnetic disk, a ROM or the like, stores a plurality pieces of data. FIG. 37 shows data stored in data storing unit 3301. The data is composed of a plurality pieces of geographical data. Each of the plurality pieces of geographical data is composed of a plurality of attributes. The attributes are: "to-do-fu-ken" attribute 3401, "shi-ku-gun" attribute 3402, "ku-cho-son" attribute 3403, area attribute 3404, and zip code attribute 3405. The attribute values of zip code attribute 3405 are numerals. The attribute values of the other attributes are represented by characters in Japanese including Chinese characters. Data storing unit 3301 may be achieved by a floppy disk, a CD-ROM, or a magnet optical disk and a dedicated drive for reading data from these media.

Figure 38:
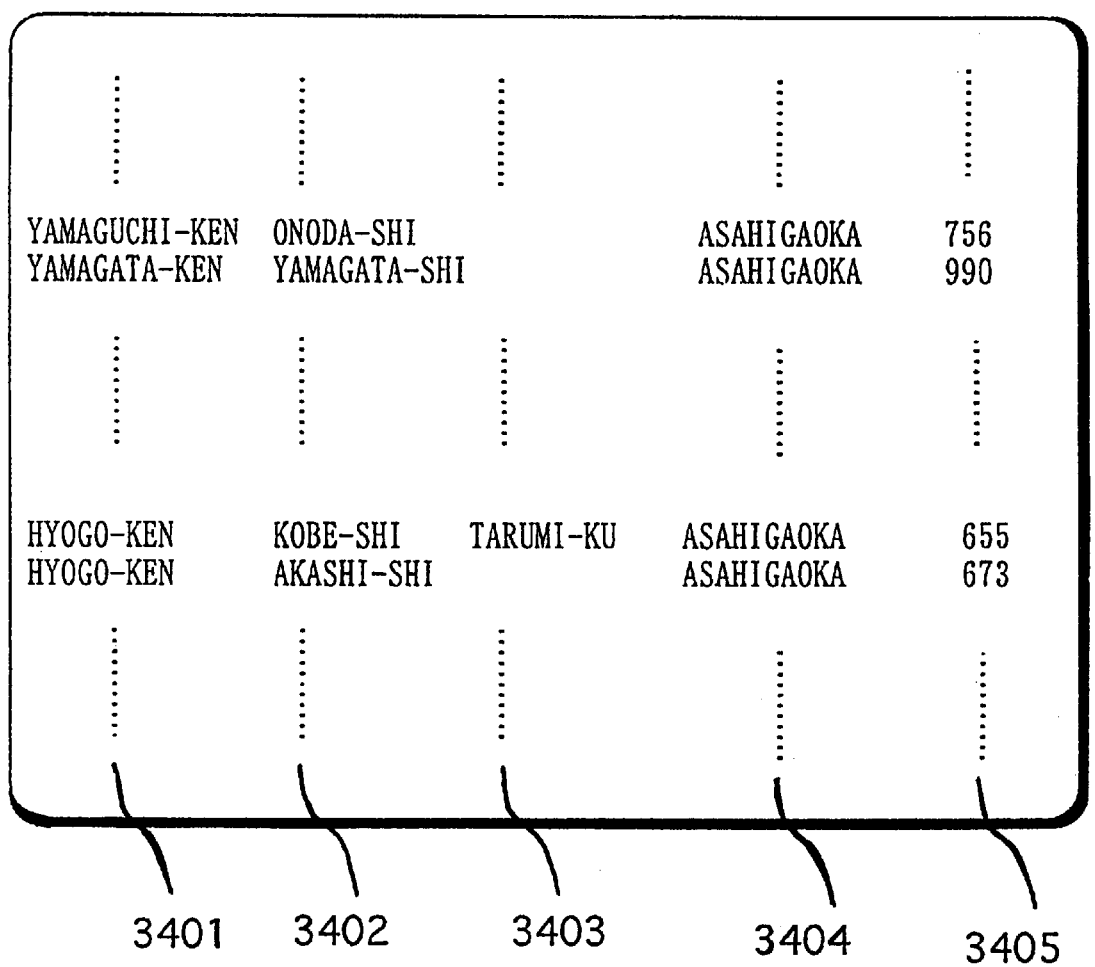
FIG. 38 shows a retrieval result output by the retrieving unit of the data retrieval support apparatus shown in FIG. 36.

Retrieving unit 3302 searches geographical data in data storing unit 3301 for a character string specified by controlling unit 3309 which is later described. FIG. 38 shows a retrieval result by retrieving unit 3302 when character string "asahigaoka" is specified by controlling unit 3309. The retrieval result data is composed of a plurality pieces of geographical data including character string "asahigaoka."

Retrieval data storing unit 3303, achieved by a RAM, a magnetic disk or the like, stores retrieval result data output by retrieving unit 3302.

Classifying unit 3304, activated by controlling unit 3309, classifies geographical data stored in retrieval data storing unit 3303 into groups. Classifying unit 3304 classifies geographical data into groups so that each group is composed of a plurality pieces of geographical data including a common attribute value of "to-do-fu-ken" attribute 3401. To, Do, Fu, and Ken are unit regions in Japan having their own local governments. More specifically, Japan is divided into one To (capital), one Do, two Fus, and 43 Kens, namely, 47 regions in total. Accordingly, classifying unit 3304 classifies the geographical data into groups which respectively correspond to the 47 regions at most. FIG. 39 shows the contents of retrieval data storing unit 3303 after classifying unit 3304 have classified geographical data into groups so that each group is composed of a plurality pieces of geographical data including a common attribute value of "to-do-fu-ken" attribute 3401. The horizontal dotted lines indicate divisions of groups. The first group in FIG. 39 includes pieces of geographical data which have common attribute value of "to-do-fu-ken" attribute 3401, "HOKKAIDO."

In case all the pieces of geographical data in retrieval data storing unit 3303 have the same attribute value of "to-do-fu-ken" attribute 3401, the geographical data is not classified since the data constructs only one group. In such a case, classifying unit 3304 re-classifies the group into other groups so that each group is composed of a plurality pieces of geographical data including a common attribute value of "shi-ku-gun" attribute 3402 as well as a common attribute value of "to-do-fu-ken" attribute 3401. Similarly, when all the pieces of geographical data in retrieval data storing unit 3303 have the same attribute value of "to-do-fu-ken" attribute 3401 and the same attribute value of "shi-ku-gun" attribute 3402, classifying unit 3304 re-classifies the group into other groups so that each group is composed of a plurality pieces of geographical data including common attribute values of "ku-cho-son" attribute 3403, "shi-ku-gun" attribute 3402, and "to-do-fu-ken" attribute 3401. Also, when all the pieces of geographical data in retrieval data storing unit 3303 have the same attribute values of "to-do-fu-ken" attribute 3401, "shi-ku-gun" attribute 3402, and "ku-cho-son" attribute 3403, classifying unit 3304 re-classifies the group into other groups so that each group is composed of a plurality pieces of geographical data including common attribute values of "ku-cho-son" attribute 3403, "shi-ku-gun" attribute 3402, and "to-do-fu-ken" attribute 3401 and a common first character of the attribute value of area attribute 3404. If this is not effective in classifying the data into a plurality of groups, classifying unit 3304 executes re-classifications by adding the second character, the third character, and so on of the attribute value of area attribute 3404 until classifying unit 3304 succeeds to classify the data into a plurality of groups.

Group title generating unit 3305 is activated by controlling unit 3309 and generates group titles of the groups stored in retrieval data storing unit 3303. Group title generating unit 3305 generates each group title so that it consists of the common attribute value and the number of pieces of geographical data in the group. When retrieval data storing unit 3303 stores groups each of which is composed of a plurality pieces of geographical data including a common attribute value of "to-do-fu-ken" attribute 3401, as shown in FIG. 39, group title generating unit 3305 generates group titles which consist of the common attribute value "to-do-fu-ken" attribute 3401 and the number of pieces of geographical data in the group. In case of the groups in FIG. 39, the group title of the first group, for example, will be "HOKKAIDO 3 ITEMS" since the first group has common attribute value "HOKKAIDO" and the number of pieces of data is "3." The generated group titles are stored in retrieval data storing unit 3303 together with geographical data. FIG. 40 shows the contents of retrieval data storing unit 3303 after group title generating unit 3305 has generated and stored group titles. In the drawing, the underlined character strings are the group titles.

Displaying unit 3306 displays the geographical data and group titles stored in retrieval data storing unit 3303. Displaying unit 3306 extracts all the group titles from retrieval data storing unit 3303 to make a list of group titles, and displays the list. FIG. 41 shows a list of group titles displayed by displaying unit 3306. As will be recognized in the drawing, each group title of the list is assigned a serial number by displaying unit 3306. When the operator selects a group title from the list, displaying unit 3306 extracts geographical data included in the group of the selected group title from retrieval data storing unit 3303 and displays the extracted data. When the operator selects "HYOGO-KEN 3 ITEMS" from the list of FIG. 41, displaying unit 3306 displays the geographical data included in the group, as shown in FIG. 42.

Maximum number storing unit 3307, which is achieved by a ROM or the like, stores maximum numbers of data units that can be displayed. FIG. 43 shows the contents of maximum number storing unit 3307. The contents indicate that displaying unit 3306 can display 50 character lines, namely, 50 pieces of geographical data or group titles at the most at a time.

Receiving unit 3308 is achieved by a keyboard or the like and receives instructions from the operator specifying a character string or group title. In case of group titles displayed by displaying unit 3306, receiving unit 3308 receives serial numbers attached to the group titles.

Controlling unit 3309 controls retrieving unit 3302, classifying unit 3304, group title generating unit 3305, and displaying unit 3306. More specifically, controlling unit 3309 instructs receiving unit 3308 to transfer a character string received from the operator to retrieving unit 3302. Controlling unit 3309 instructs retrieving unit 3302 to store retrieval result data into retrieval data storing unit 3303. Controlling unit 3309 compares the number of pieces of geographical data with the maximum number stored in maximum number storing unit 3307. If the number of pieces of geographical data does not exceed the maximum number, controlling unit 3309 allows displaying unit 3306 to display the pieces of geographical data; if exceeds, controlling unit 3309 activates classifying unit 3304. After classifying unit 3304 completes a classification, controlling unit 3309 activates group title generating unit 3305 so that group title generating unit 3305 generates the group titles of the classified groups. Controlling unit 3309 then allows displaying unit 3306 to display the generated group titles. Here, if controlling unit 3309 receives via receiving unit 3308 a group title selected by the operator, controlling unit 3309 transfers the received group title to displaying unit 3306.

Figure 44:
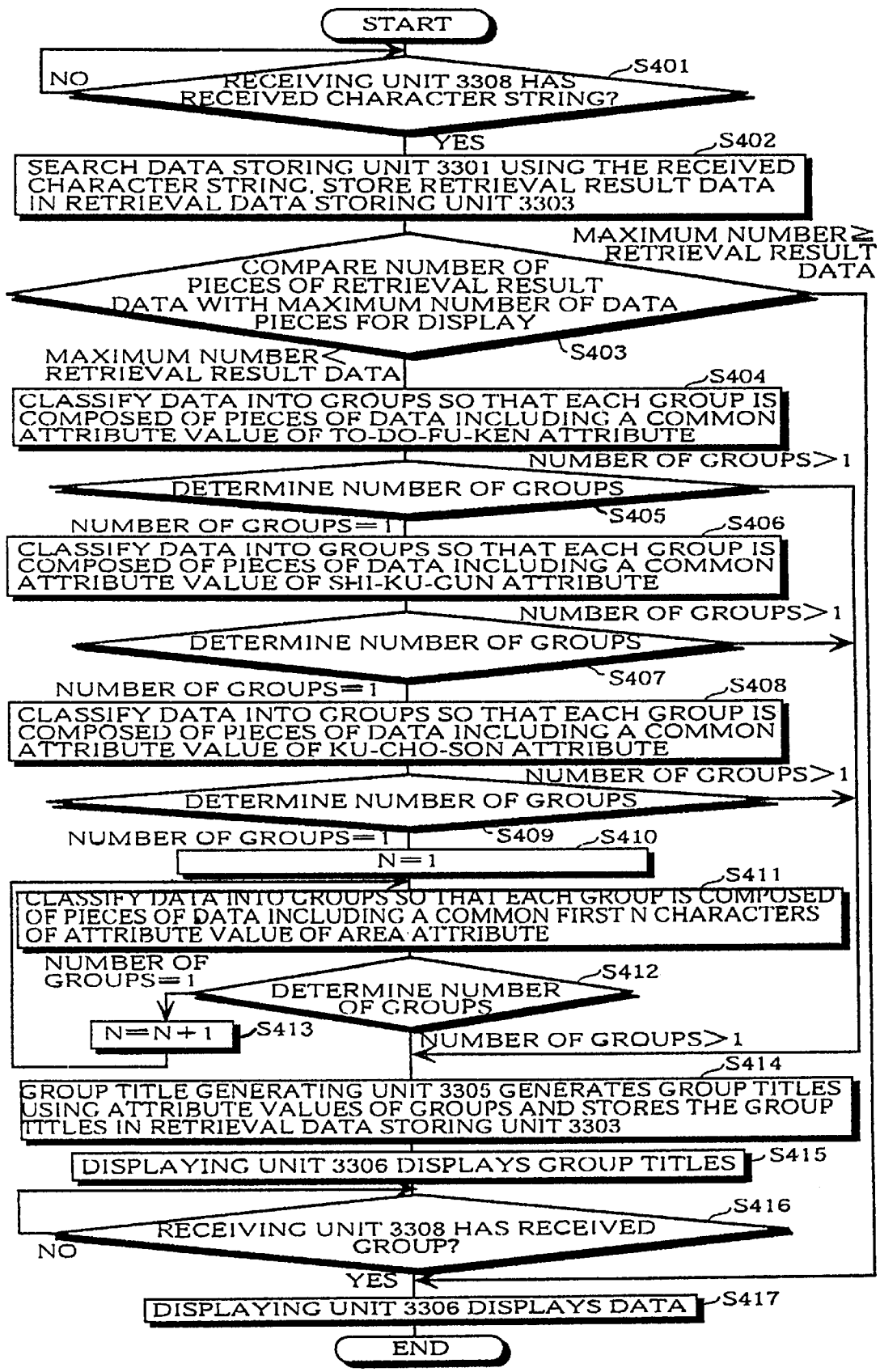
FIG. 44 is a flowchart of the operation of the data retrieval support apparatus shown in FIG. 36.

Now, with reference to the flowchart of FIG. 44, a case operation of the present data retrieval support apparatus is considered in which the operator attempts to retrieve the zip code for "hyogo-ken akashi-shi asahigaoka," where data storing unit 3301 currently stores geographical data as shown in FIG. 37.

The operator inputs character string "ASAHIGAOKA." This reduces the operation of the operator, compared with inputting the full characters "HYOGO-KEN AKASHI-SHI ASAHIGAOKA."

It is judged in step S401 whether receiving unit 3308 has received a character string. If judged as received (in this case, character string "ASAHIGAOKA"), the geographical data as shown in FIG. 38 is retrieved and stored in retrieval data storing unit 3303 (step S402). Suppose 110 pieces of geographical data including "ASAHIGAOKA" are retrieved here.

Controlling unit 3309 compares the number of pieces of geographical data with the maximum number of lines (step S403). In this case, since the number of pieces of geographical data, 110, is greater than the maximum number of lines, 50, controlling unit 3309 activates classifying unit 3304. Classifying unit 3304 classifies the geographical data into groups so that each group is composed of a plurality pieces of geographical data including a common attribute value of "to-do-fu-ken" attribute 3401 (step S404). The number of classified groups is determined in step S405. In this case, the number of groups is greater than 1, group title generating unit 3305 generates group titles as shown in FIG. 40 (step S414). Displaying unit 3306 displays the group titles as shown in FIG. 41 (step S415). Here, when the operator selects, for example, group title "HYOGO-KEN 3 ITEMS" (step S416), displaying unit 3306 displays the geographical data included in the group, as shown in FIG. 42 (step S417). This enables the operator to recognize that the desired zip code is "673" which is displayed aside "HYOGO-KEN AKASHI-SHI ASAHIGAOKA," as shown in FIG. 42.

When the number of classified groups is determined as "1" in step S405, controlling unit 3309 activates classifying unit 3304. Classifying unit 3304 classifies the geographical data into groups so that each group is composed of a plurality pieces of geographical data including common attribute values of "to-do-fu-ken" attribute 3401 and "shi-ku-gun" attribute 3402 (step S406). When the number of classified groups is determined as greater than "1" in step S407, control goes to step S414. When the number of classified groups is determined as "1" in step S407, controlling unit 3309 activates classifying unit 3304. Classifying unit 3304 classifies the geographical data into groups so that each group is composed of a plurality pieces of geographical data including common attribute values of "to-do-fu-ken" attribute 3401, "shi-ku-gun" attribute 3402, and "ku-cho-son" attribute 3403 (step S408). When the number of classified groups is determined as greater than "1" in step S409, control goes to step S414. When the number of classified groups is determined as "1" in step S409, variable N is set to "1" (step S410) . Controlling unit 3309 activates classifying unit 3304. Classifying unit 3304 classifies the geographical data into groups so that each group is composed of a plurality pieces of geographical data including common attribute values of "to-do-fu-ken" attribute 3401, "shi-ku-gun" attribute 3402, "ku-cho-son" attribute 3403, and the first N characters of the attribute value of area attribute 3404 (step S411). When the number of classified groups is determined as greater than "1" in step S412, control goes to step S414. When the number of classified groups is determined as "1" in step S412, "1" is added to variable N (step S413), and control goes to step S411.

As has been described above, if a large number of pieces of geographical data is retrieved, the present data retrieval support apparatus classifies the large number of pieces of geographical data into groups based on the attribute values of the data and displays only the group titles of the classified groups. This enables the operator to retrieve a desired piece of geographical data using the displayed group titles.

In the present embodiment, attributes "TO-DO-FU-KEN," "SHI-KU-GUN," "KU-CHO-SON," and "AREA" are used. However, these four attributes may be united into one "GEOGRAPHICAL" attribute. To achieve this, the apparatus includes a geographical dictionary storing unit. The geographical dictionary storing unit stores hierarchical relation between "TO-DO-FU-KEN," "SHI-KU-GUN," "KU-CHO-SON," and "AREA" are used. Classifying unit 3304 divides geographical data into hierarchical levels of "TO-DO-FU-KEN," "SHI-KU-GUN," "KU-CHO-SON," and "AREA" by referring to the geographical dictionary storing unit and classifies the data into groups.

The above classification may be achieved by another method even if the apparatus does not include the geographical dictionary storing unit. Classifying unit 3304 classifies data into groups using the first N characters of the attribute values of the "GEOGRAPHICAL" attribute. It is possible for classifying unit 3304 to classify geographical data into "TO-DO-FU-KEN" groups using the first two characters of the attribute values. Group title generating unit 3305 generates group titles by using common characters in the attribute values in the group starting from the first character. This method is also applicable to such data as consists of arbitrary character strings, other than geographical data.

In the present embodiment, the geographical data and the classification method is based on the regional system in Japan. However, the present embodiment is also applicable to other countries by taking their regional systems into account. For USA, for example, "STATE," "COUNTY," and the like will be used; for UK, "COUNTY," "BOROUGH," and the like will be used.

Embodiment 3

The following is a description of another embodiment of the present invention, a data retrieval support apparatus.

Figure 45:
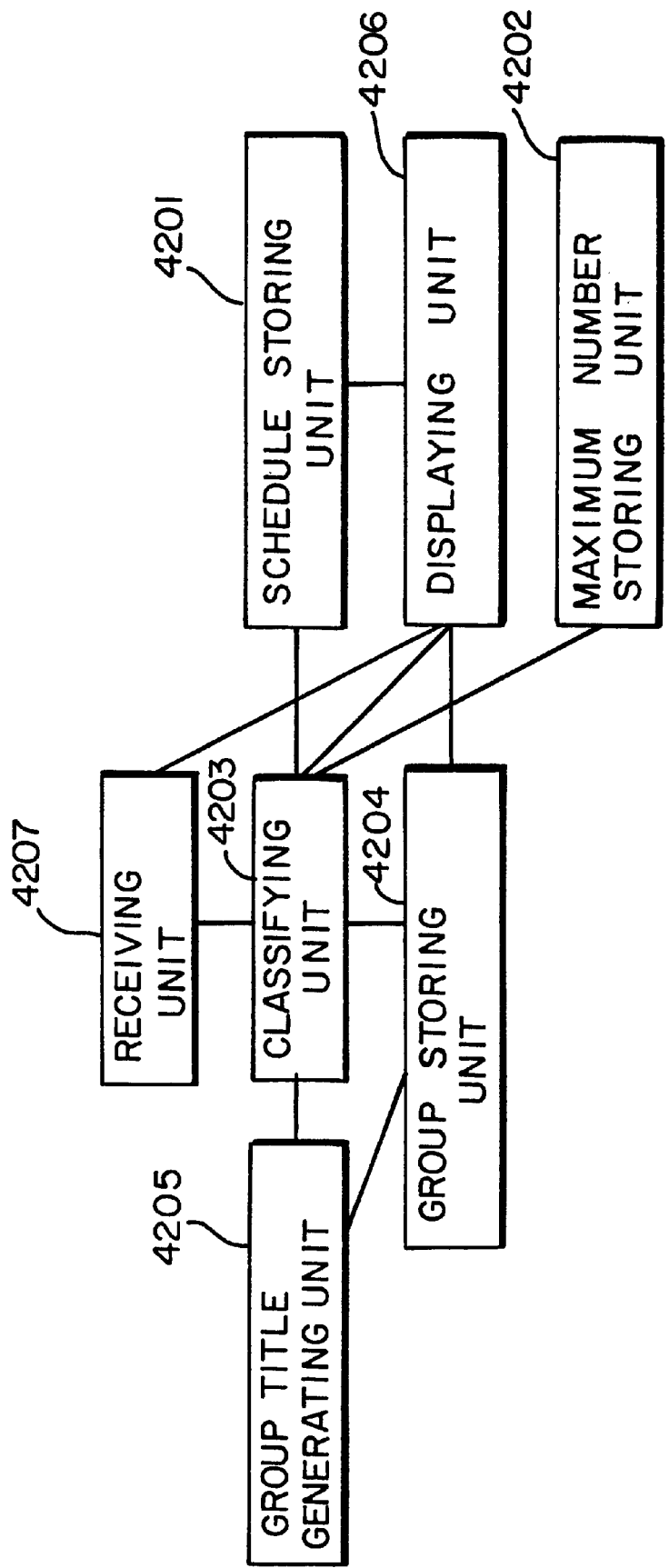
FIG. 45 is a block diagram showing the construction of the data retrieval support apparatus of Embodiment 3.

FIG. 45 is a block diagram showing the construction of the data retrieval support apparatus. The data retrieval support apparatus is composed of schedule storing unit 4201, maximum number storing unit 4202, classifying unit 4203, group storing unit 4204, group title generating unit 4205, displaying unit 4206, and receiving unit 4207.

Schedule storing unit 4201, achieved by a magnetic disk, a RAM or the like, stores a plurality pieces of data. FIG. 46 shows data stored in schedule storing unit 4201. The data is composed of a plurality pieces of schedule data. Each of the plurality pieces of schedule data is composed of date attribute 4301 and contents attribute 4302. The date attribute 4301 includes month attribute, day attribute, day of the week attribute, and time attribute. The time attribute may be omitted. The attribute values of the contents attribute 4302 are represented by characters. The schedule data is stored in schedule storing unit 4201 arranged in the order of the attribute values of date attribute 4301. The schedule data in which the time attribute is omitted is arranged before the schedule data in which the time attribute is not omitted.

Maximum number storing unit 4202, which is achieved by a ROM or the like, stores maximum numbers of data units that can be displayed. FIG. 47 shows the contents of maximum number storing unit 4202. The contents indicate that displaying unit 4206 can display 5 items, namely, 5 pieces of schedule data at the most at a time.

Classifying unit 4203 classifies the schedule data stored in schedule storing unit 4201 into groups using the attribute values of date attribute 4301 when receiving unit 4207 receives a classification instruction. More specifically, classifying unit 4203 compares the number of pieces of schedule data of the group with the maximum number stored in maximum number storing unit 4202. If the number of pieces of schedule data of the group does not exceed the maximum number, classifying unit 4203 allows displaying unit 4206 to display the schedule data. Suppose schedule storing unit 4201 stores 14 pieces of schedule data, as shown in FIG. 46. That unit the number of pieces of schedule data of the group, 14, exceeds the maximum number, 5, and all pieces of schedule data cannot be displayed on the screen at a time. Classifying unit 4203 classifies the schedule data into groups so that each group is composed of pieces of schedule data including common attribute values of the month attribute, day attribute, and day of the week attribute of the date attribute 4301, and stores the classified groups into group storing unit 4204. If the number of the classified groups exceeds maximum number, classifying unit 4203 re-classifies the schedule data into groups using the attribute values of the month attribute and day attribute so that each group corresponds to a week in the month. In doing so, the first seven days are, for example, included in the first week; the eighth day to the $14^{th}$ day are included in the second week, and so on. If the number of the re-classified groups still exceeds the maximum number, classifying unit 4203 re-classifies the schedule data into groups using the attribute values of the month attribute so that each group has a common attribute value of the month attribute. When the number of the classified groups becomes equal to or smaller than the maximum number, classifying unit 4203 instructs group title generating unit 4205 to generate group titles of the classified groups and instructs displaying unit 4206 to display the group titles. If the number of the re-classified groups still exceeds the maximum number after classifying data using the attribute values of the month attribute, classifying unit 4203 instructs displaying unit 4206 to display a message indicating that the classification is impossible.

Group storing unit 4204, achieved by a RAM, a magnetic disk or the like, stores schedule data classified by classifying unit 4203. Group storing unit 4204 also stores group titles generated by group title generating unit 4205 with the corresponding groups.

Group title generating unit 4205 is activated by classifying unit 4203 and generates group titles of the groups stored in group storing unit 4204 and stores the generated group titles also in group storing unit 4204. Group title generating unit 4205 generates each group title so that it consists of the common attribute values of the month attribute, day attribute, and day of the week attribute and the number of pieces of schedule data in the group if it has such common values. When group storing unit 4204 stores groups each of which has common attribute values of the month attribute, day attribute, and day of the week attribute, as shown in FIG. 48, group title generating unit 4205 generates, for example, group title "APRIL FIRST 2" for the group of April first since the group includes 2 pieces of data. Similarly, when group storing unit 4204 stores a plurality pieces of schedule data which are divided into week groups, as shown in FIG. 49, group title generating unit 4205 generates, for example, group title "FIRST WEEK OF APRIL 10" for the group of April first to sixth since the group includes 10 pieces of data. Also, when group storing unit 4204 stores a plurality pieces of schedule data which are divided into month groups, group title generating unit 4205 generates, for example, group title "APRIL 14" in case the group includes 14 pieces of data.

Displaying unit 4206 displays the schedule data stored in schedule storing unit 4201 or group titles stored in group storing unit 4204, according to instructions sent from classifying unit 4203. FIG. 50 shows a list of group titles, displayed by displaying unit 4206, of the schedule data whose data pieces are divided into week groups. When displaying unit 4206 receives a selected group title from receiving unit 4207, displaying unit 4206 extracts schedule data included in the group of the selected group title from group storing unit 4204 and displays the extracted data.

Receiving unit 4207 is achieved by a keyboard, a mouse or the like and receives classification instructions from the operator. Receiving unit 4207 also receives a group title selected by the operator from the list displayed.

Figure 51:
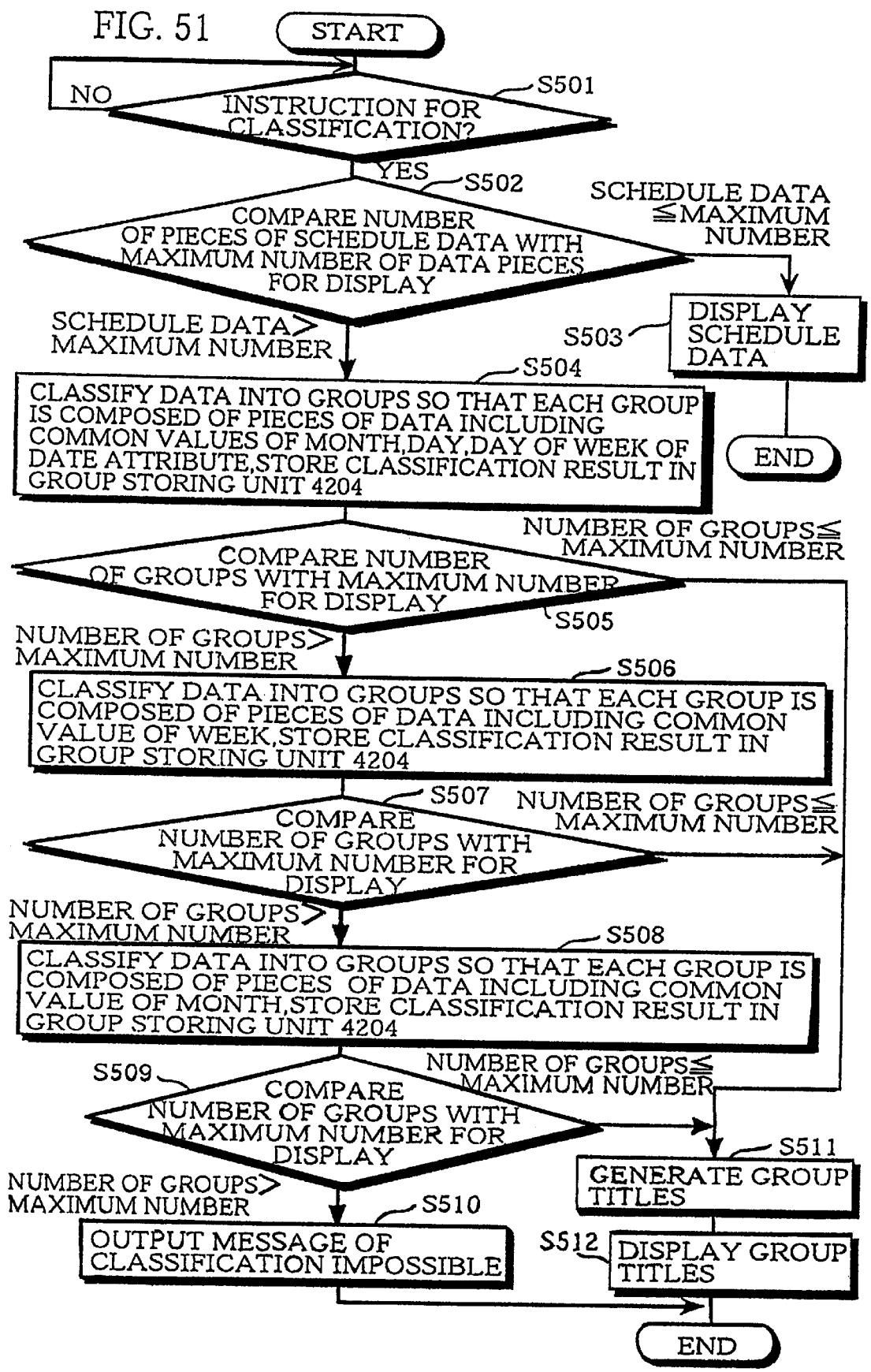
FIG. 51 is a flowchart of the operation of the data retrieval support apparatus shown in FIG. 45.

Now, with reference to the flowchart of FIG. 51, a case operation of the present data retrieval support apparatus is considered in which schedule storing unit 4201 stores schedule data as shown in FIG. 46.

It is judged in step S501 whether receiving unit 4207 has received a classification instruction. If judged as received, classifying unit 4203 compares the number of pieces of schedule data with the maximum number of lines (step S502). In this case, since the number of pieces of schedule data, 14, is greater than the maximum number of lines, 5, classifying unit 4203 classifies the data into groups. Classifying unit 4203 classifies the data into groups .(step S504). Classifying unit 4203 classifies the schedule data into groups so that each group is composed of pieces of schedule data including common attribute values of the month attribute, day attribute, and day of the week attribute of the date attribute 4301, and stores the classified groups into group storing unit 4204, as shown in FIG. 48 (step S504). After this classification, the number of groups is 9, as shown in FIG. 48. That is, the number of the groups still exceeds the maximum number (step S505). Classifying unit 4203 re-classifies the schedule data into groups using the attribute values of the month attribute and day attribute so that each group corresponds to a week in the month, as shown in FIG. 49 (step S506) . After this classification, the number of groups is 4, as shown in FIG. 49. That is, the number of the groups is smaller than the maximum number. Accordingly, classifying unit 4203 judges that all the group titles can be displayed on the screen at a time (step S507), instructs group title generating unit 4205 to generate group titles of the classified groups (step S511), and instructs displaying unit 4206 to display the group titles, as shown in FIG. 50 (step S512).

When classifying unit 4203 judges that the number of pieces of schedule data is equal to or greater than the maximum number of lines in step S502, a list of schedule data is displayed (step S503), and the process is complete.

When it is judged that the number of groups is greater than the maximum number in step S507, data is classified into groups so that each group is composed of pieces of data including a common value of month, and the classification result is stored in group storing unit 4204 (step S508). When it is judged that the number of groups is equal to or smaller than the maximum number in step S509, control goes to step S511. When it is judged that the number of groups is greater than the maximum number in step S509, a message indicating that classification is impossible is output (step S510), and the process ends.

As has been described above, if so large a number of pieces of schedule data is retrieved as cannot be displayed on the screen at a time, the present data retrieval support apparatus classifies the schedule data into groups using the attribute values of the date attribute until the number of the groups is equal to or smaller than the maximum number of lines for display, generates the group titles of the groups, and displays the group titles. This enables the operator to retrieve a desired piece of schedule data using the displayed group titles.

In the present embodiment, classifying unit 4203 classifies the schedule data into groups using the attribute values of the month attribute and day attribute of the date attribute 4301 so that each group corresponds to a week in the month. However, in the classification, the day of the week attribute may be used as well as the above attributes. More specifically, classifying unit 4203 includes a calendar inside it. Classifying unit 4203 classifies the schedule data into week groups using the calendar. For example, if it is defined that one week starts at Sunday and ends at Saturday, the days starting from the first day of the month to the day on the first Saturday are included in the first week. The days starting from the next day of the first Saturday to the second Saturday are included in the second week, . . . With this method, the first and last weeks may not contain seven days.

Classifying unit 4203 may classify the schedule data into one-third-of-the-month groups instead of the week groups. In this case, for example, one month is divided into the first period including the first day to the $10^{th}$ day of the month, the second period $11^{th}$ day to $20^{th}$ day, and the third period $21^{st}$ day to the last day.

In the present embodiment, group title generating unit 4205 generates, for example, group title "FIRST WEEK OF APRIL." However, group title generating unit 4205 may generate group titles using the first and last attribute values of the date attribute. Group title generating unit 4205 may generate, for example, group title "APR/1–APR/6. " Also, group title generating unit 4205 may generate group titles using either of the first and last attribute values of the date attribute, such as "APR/1-" or "-APR/6."

Embodiment 4

The following is a description of another embodiment of the present invention, a data retrieval support apparatus.

FIG. 52 is a block diagram showing the construction of the data retrieval support apparatus. The data retrieval support apparatus is composed of textual broadcasting receiving unit 4901, data storing unit 4902, morpheme analysis unit 4903, data comparing unit 4904, data selecting unit 4905, selection result storing unit 4906, matched word extracting unit 4907, matched word storing unit 4908, threshold value storing unit 4909, group generating unit 4910, group title generating unit 4911, group storing unit 4912, displaying unit 4913, maximum number storing unit 4914, receiving unit 4915, and controlling unit 4916.

Textual broadcasting receiving unit 4901 is composed of an antenna, a tuner, a decoder, and the like. Textual broadcasting receiving unit 4901 receives character data for textual broadcasting in units of data items via wireless communications lines such as radios and TVs, or wired communication lines such as CATV and computer networks.

Data storing unit 4902, achieved by a magnetic disk or the like, stores the data items received by textual broadcasting receiving unit 4901 with the item numbers and reception times. The item numbers, which are used for identifying the data items, are assigned to the data items when they are received by textual broadcasting receiving unit 4901. FIG. 53 shows data items stored in data storing unit 4902. Each data item is composed of item number 5001, news data 5002 which is character strings, and a reception time (not shown in the drawing). Data storing unit 4902 stores a lot of data items in the order of reception. However, it is supposed in the present embodiment that data storing unit 4902 stores 11 data items (item number 100 to 110), for the sake of conveniences.

Morpheme analysis unit 4903 is activated by controlling unit 4916 and performs morpheme analysis on news data 5002 to divide news data 5002 into words. Signs "/" in the drawing shows divisions of words.

Data comparing unit 4904 is activated by controlling unit 4916 when the morpheme analysis on news data 5002 is complete. Data comparing unit 4904 extracts two data items from data storing unit 4902 and calculates the number of matched words between the two data items. It is supposed here that the words dealt with are independent words. Data comparing unit 4904 calculates the number of matched words for each combination of two data items in sequence. In the present case, for example, the calculation is performed for each combination in the following order: item number 100 and 101, 100 and 102, 100 and 103, . . . 101 and 102, 101 and 103, . . . 109 and 110. Data comparing unit 4904 sends the number of matched words with the item numbers of the pair to data selecting unit 4905 each time data comparing unit 4904 completes the calculation for the pair. In case of item number 100 and 101, for example, word "NEWS" is the only matched word, and the number of matched words is 1. Therefore, data comparing unit 4904 sends item numbers "100" and "101" and number of matched words "1" to data selecting unit 4905. Similarly, in case of the combination of item number 100 and 102, matched words are "NEWS," "MATSUSHITA ELECTRIC INDUSTRIAL CO.,LTD," "LAUNCHES," "TV," "HALF," "POWER," and "CONSUMPTION," and the number of matched words is 7. Therefore, data comparing unit 4904 sends item numbers "100" and "102" and number of matched words "7" to data selecting unit 4905.

Data selecting unit 4905 determines a pair of data items which has the greatest number of matched words in those calculated by data comparing unit 4904. Data selecting unit 4905 stores the item numbers of the two data items and the number of matched words into selection result storing unit 4906 (will be described later). More specifically, data selecting unit 4905 first receives a pair of two item numbers and the number of matched words from data comparing unit 4904. Data selecting unit 4905 stores the first pair of item numbers and the number of matched words into selection result storing unit 4906. After receiving the second pair of item numbers and the number of matched words, data selecting unit 4905 compares the number of matched words of the first pair of item numbers with that of the second pair of item numbers. When the number of matched words of the second piece of information is greater than that of the first pair of item numbers, data selecting unit 4905 updates the contents of selection result storing unit 4906 with the second pair of two item numbers and the number of matched words. Data selecting unit 4905 repeats this process for each pair of data items received from data comparing unit 4904.

Data selecting unit 4905, for example, first receives item numbers "100" and "101" and the number of matched words "1" from data comparing unit 4904, and stores these values into selection result storing unit 4906. FIG. 55 shows the contents of selection result storing unit 4906 at this stage. 5201 and 5202 in the drawing show item numbers, 5203 the number of matched words. Data selecting unit 4905 then receives item numbers "100" and "102" and the number of matched words "7" from data comparing unit 4904, and compares the number of matched words of this pair with that of the earlier pair. Data selecting unit 4905 judges that the number of matched words of this pair, "7," is greater than that of the earlier pair, "1." Accordingly, data selecting unit 4905 updates the contents of selection result storing unit 4906 with these item numbers "100" and "102" and the number of matched words "7," as shown in FIG. 56. Data selecting unit 4905 repeats this process for each pair of data items received from data comparing unit 4904. In the case of the present embodiment, after completing the process for all pairs of data items, data comparing unit 4904 stores item numbers "100" and "104" and the number of matched words "8," as shown in FIG. 57.

Selection result storing unit 4906, achieved by a RAM, a magnetic disk or the like, stores two item numbers and the number of matched words which output from data selecting unit 4905.

Matched word extracting unit 4907 is activated by controlling unit 4916 when data selecting unit 4905 completes determining of a pair of data items which has the greatest number of matched words. Matched word extracting unit 4907, by referring to selection result storing unit 4906 for data item numbers, extracts matched words between the two data items from data storing unit 4902 and stores the extracted words in matched word storing unit 4908. For example, when selection result storing unit 4906 stores data item numbers "100" and "104," matched word extracting unit 4907 extracts the eight matched words, "NEWS," "MATSUSHITA ELECTRIC INDUSTRIAL CO.,LTD," "LAUNCHES," "NEW," "TV," "HALF," "POWER," and "CONSUMPTION, " and stores these words into matched word storing unit 4908.

Matched word extracting unit 4907 also sets a threshold value (will be described later) in threshold value storing unit 4909 using the number of matched words stored in selection result storing unit 4906. More specifically, matched word extracting unit 4907 sets a threshold value to a smaller value of "2" and the number of matched words stored in selection result storing unit 4906. In the present case selection result storing unit 4906 stores the number of matched words, "8." Accordingly, matched word extracting unit 4907 sets the threshold value to "2."

Matched word storing unit 4908, achieved by a RAM, a magnetic disk or the like, stores matched words extracted by matched word extracting unit 4907. FIG. 58 shows the contents of matched word storing unit 4908 when matched word extracting unit 4907 extracts the eight words as described earlier.

Threshold value storing unit 4909, achieved by a RAM, a magnetic disk or the like, stores a threshold value which is set by matched word extracting unit 4907. The threshold value is used by group generating unit 4910 (will be described later) when to classify data into groups. FIG. 59 shows the contents of threshold value storing unit 4909.

Group generating unit 4910, activated by controlling unit 4916, classifies the data items stored in data storing unit 4902 into groups. More specifically, group generating unit 4910 compares each data item stored in data storing unit 4902 with the matched words stored in matched word storing unit 4908, and calculates the number of matched words between them for each data item. When the number of matched words exceeds the threshold value stored in threshold value storing unit 4909, group generating unit 4910 stores the data item in group storing unit 4912. The data items stored in group generating unit 4910 make up a group. When matched word storing unit 4908 stores eight words as shown in FIG. 58 and the threshold value is "2," for example, group generating unit 4910 stores data items "100 ," "102," and "104" in group storing unit 4912. These three data items are included in a group. Group generating unit 4910 also deletes the same data items as those stored in group storing unit 4912 from data storing unit 4902.

Group title generating unit 4911 is activated by controlling unit 4916 and generates group titles of the groups. More specifically, group title generating unit 4911 generates each group title so that it consists of the matched words in the group and the number of data items in the group. When the group includes data items "100 ," "102," and "104" as described earlier, for example, group title generating unit 4911 generates group title "NEWS MATSUSHITA ELECTRIC INDUSTRIAL CO.,LTD, LAUNCHES TV HALF POWER CONSUMPTION 3 ITEMS."

Group storing unit 4912, achieved by a RAM, a magnetic disk or the like, stores the data items classified into a group by group generating unit 4910 and the group title. FIG. 60 shows the contents of group storing unit 4912. In the drawing the group title is underlined.

Displaying unit 4913, achieved by a display unit or the like, displays data items stored in data storing unit 4902 or a list of group titles according to instructions from controlling unit 4916, where the list of group titles includes all the group titles stored in group storing unit 4912.

Figures 61, 65:
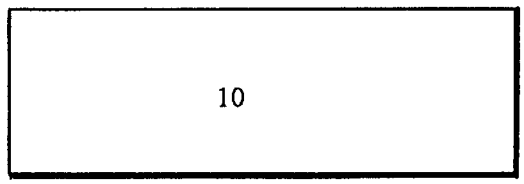
FIG. 61 shows the contents of maximum number storing unit of the data retrieval support apparatus shown in FIG. 52.
FIG. 65 shows a list of group titles displayed by group storing unit of the data retrieval support apparatus shown in FIG. 52.

Maximum number storing unit 4914, achieved by a ROM or the like, stores maximum number of character lines that can be displayed. FIG. 61 shows the contents of maximum number storing unit 4914. The contents indicate that displaying unit 4913 can display 10 character lines at the most at a time.

Receiving unit 4915 is achieved by a keyboard, a mouse or the like and receives instructions from the operator for classifying data into groups and displaying classification results, displaying data items of one group, displaying data items, and the like.

Controlling unit 4916 controls each unit in the data retrieval support apparatus. More specifically, when receiving unit 4915 receives an instruction for classifying data into groups from the operator, controlling unit 4916 activates morpheme analysis unit 4903 and allows morpheme analysis unit 4903 to perform morpheme analysis. When the morpheme analysis is complete, controlling unit 4916 activates data comparing unit 4904. After data selecting unit 4905 completes determining of a pair of data items which has the greatest number of matched words, controlling unit 4916 activates matched word extracting unit 4907. After matched word extracting unit 4907 completes extracting of matched words between the two data items, controlling unit 4916 activates group generating unit 4910 then activates group title generating unit 4911. Controlling unit 4916 repeats the above process as far as there is yet any data items in data storing unit 4902 to be classified into groups and the number of groups is smaller than the maximum number of character lines stored in maximum number storing unit 4914. Either of when there is no data items in data storing unit 4902 to be classified or when the number of groups exceeds the maximum number of character lines stored in maximum number storing unit 4914, controlling unit 4916 instructs displaying unit 4913 to display a list of group titles. When the operator inputs an instruction for displaying data items of one group with a group title in the list specified, controlling unit 4916 instructs displaying unit 4913 to display the data items of the specified group. When the operator inputs an instruction for displaying data items, controlling unit 4916 instructs displaying unit 4913 to display the all the data items.

Figure 62:
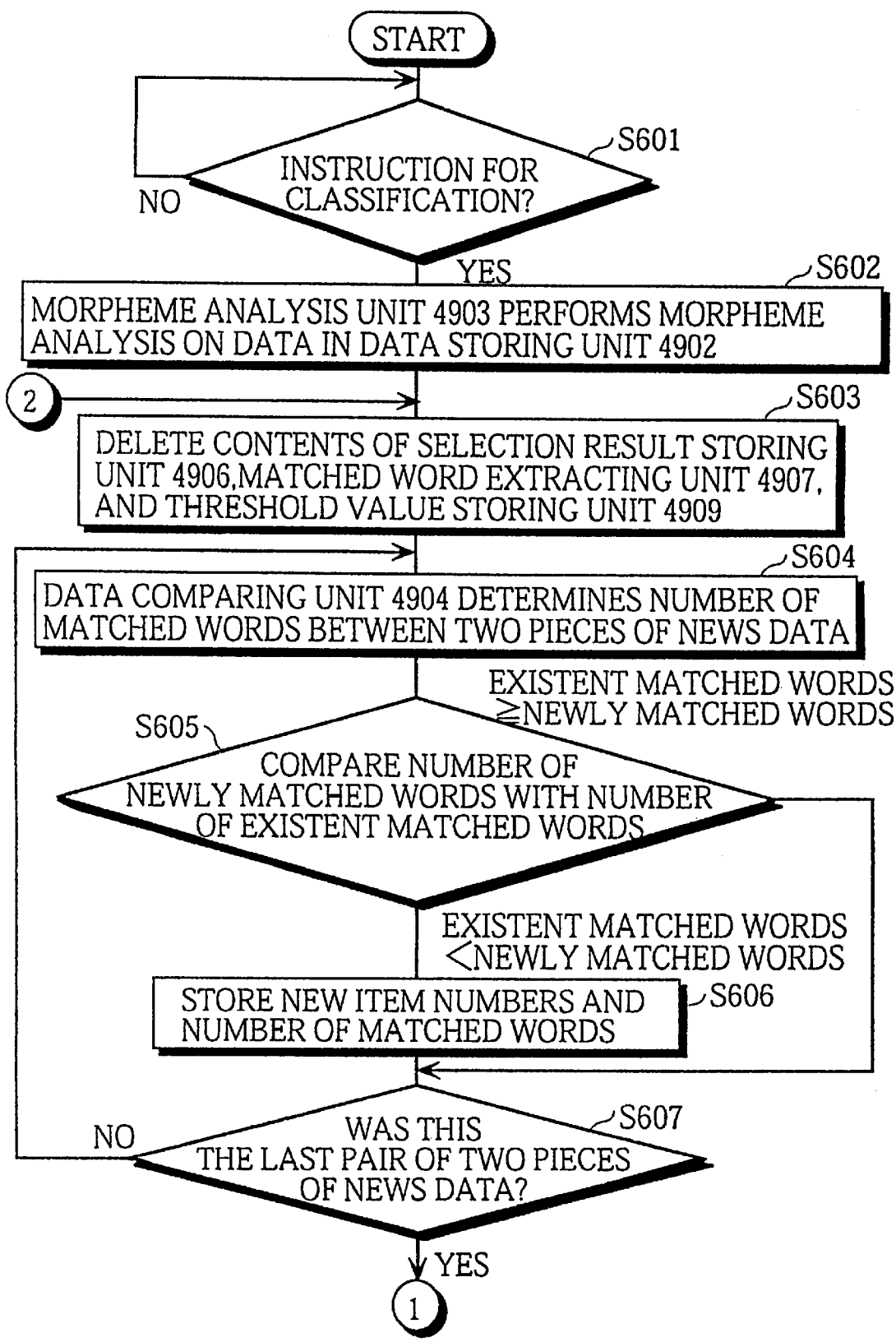
FIG. 62 is a flowchart of the operation of the data retrieval support apparatus shown in FIG. 52.
Figure 63:
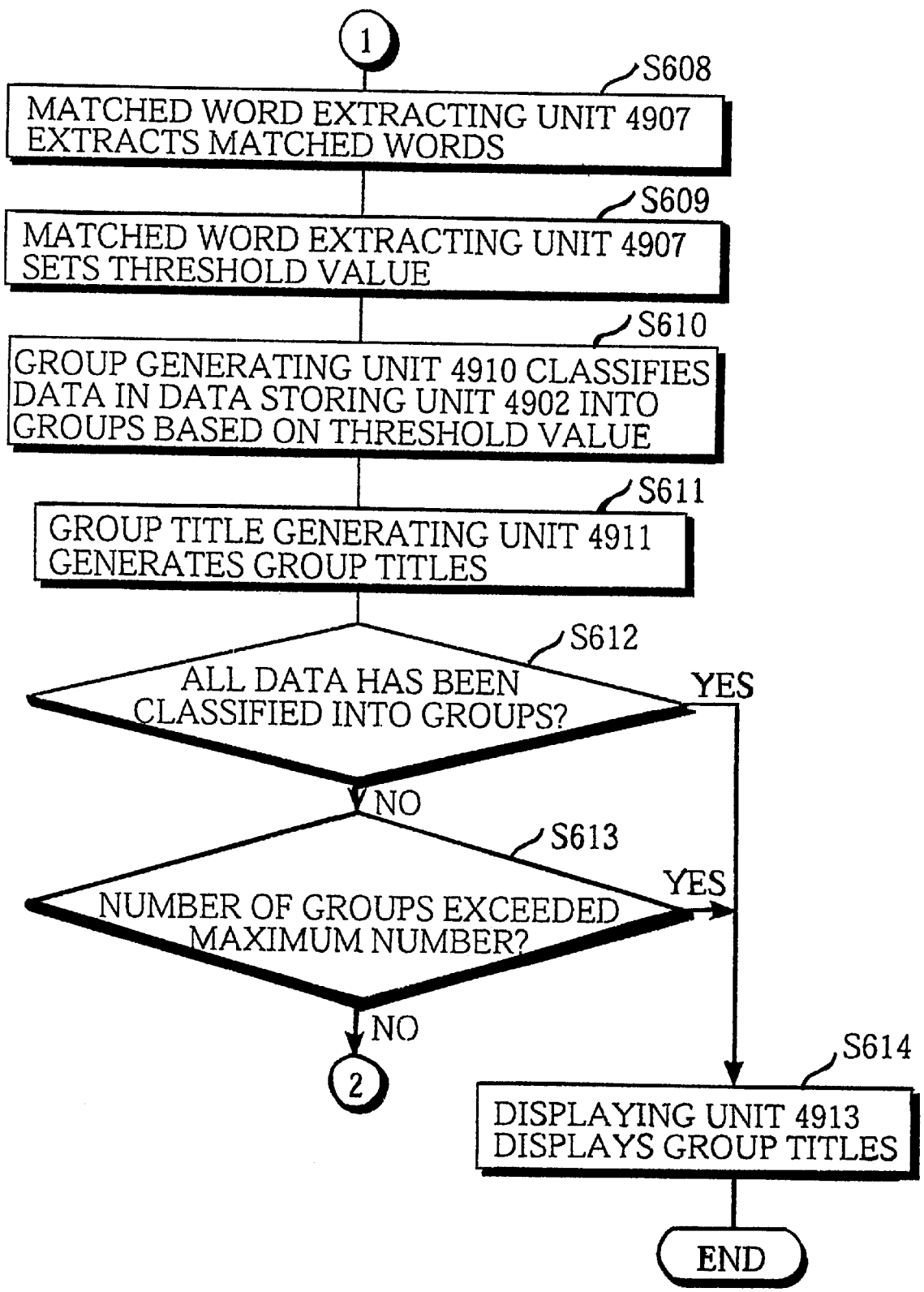
FIG. 63 is a flowchart continued from the flowchart of FIG. 62.

Now, with reference to the flowcharts of FIGS. 62 and 63, a case operation of the present data retrieval support apparatus is considered in which data is classified into groups.

It is judged in step S601 whether receiving unit 4915 has received a classification instruction. If judged as received, morpheme analysis unit 4903 performs morpheme analysis on data in data storing unit data storing unit 4902 (step S602). Controlling unit 4916 deletes contents of selection result storing unit 4906, matched word extracting unit 4907, and threshold value storing unit 4909 (step S603). Data comparing unit 4904 determines number of matched words between two data items in sequence (step S604) . The number of newly matched words is compared with number of existent matched words (step S605). When the number of existent matched words is smaller than newly matched words, data selecting unit 4905 updates the contents of selection result storing unit 4906 (step S606). Steps S604 to S606 are repeated for each pair of data items (step S607). Matched word extracting unit 4907 extracts matched words (step S608). Matched word extracting unit 4907 sets a threshold value (step S609). Group generating unit 4910 classifies data in data storing unit 4902 into groups based on the threshold value (step S610). Group title generating unit 4911 generates the group titles (step S611).

In step S612, it is judged whether all data has been classified into groups. When it is judged as not, it is further judged whether the number of the groups has exceeded the maximum number of character lines (step S613). When it is judged as not, steps S603 to S614 are repeated to classify the rest of data into groups. FIG. 64 shows the contents of group storing unit 4912 when three groups have been generated. In this case as shown in the drawing, the number of the groups has not exceeded the maximum number of character lines. Accordingly, steps S603 to S614 are repeated again. Either of when it is judged that all data has been classified into groups in step S612, and when it is judged that the number of the groups has exceeded the maximum number of character lines (in the example of the present embodiment, it is "10") in step S613, displaying unit 4913 reads group titles from group storing unit 4912, generates a list of group titles, and displays the list of group titles (step S614). FIG. 65 shows a list of group titles displayed by displaying unit 4913. Note that the drawing only shows the first four data items. Also note that when it is judged that the number of the groups has exceeded the maximum number of character lines in step S613, the data items which have not been classified into groups are classified into the last group (in the example of the present embodiment, it is the 10$^{th}$ group).

As has been described above, if so large a number of pieces of character data is retrieved as cannot be displayed on the screen at a time, the present data retrieval support apparatus classifies the character data into groups using matched words between data items of the character data, generates the group titles of the groups, and displays the group titles. This enables the operator to retrieve a desired piece of data using the displayed group titles. Also, it is possible for the operator to recognize the contents of data items from the group titles since the group titles include matched words between the data items of the groups.

In the present embodiment, data selecting unit 4905 extracts matched words from each pair of data items. However, words included in an arbitrary data item may be used as the matched words which are used for classifying data into groups. For achieving this, data comparing unit 4904 is not required. Data selecting unit 4905 selects an arbitrary data item from data storing unit 4902. Matched word extracting unit 4907 determines the words included in the selected data item as the matched words. This method reduces the classification accuracy, though it reduces the amount of calculation.

In the present embodiment, when receiving unit 4915 receives an instruction for classifying data into groups from the operator, controlling unit 4916 activates morpheme analysis unit 4903 and allows morpheme analysis unit 4903 to perform morpheme analysis. However, the morpheme analysis may be performed immediately after textual broadcasting receiving unit 4901 receives character data.

In the present embodiment, matched word extracting unit 4907 sets a threshold value to a smaller value of "2" and the number of matched words stored in selection result storing unit 4906. However, "3" or "4" may be used instead of "2" for setting the threshold value. Greater threshold values reduces the number of data items included in one group.

Group title generating unit 4911 generates each group title so that it consists of the matched words in the group and the number of data items in the group. However, group title generating unit 4911 may generate each group title so that it consists of the matched words of the pair of data items having the greatest number of matched words in the group, namely, the matched words included in either of the data items stored in data selecting unit 4905. FIG. 66 shows group titles generated with the above method.

In the present embodiment, when it is judged that the number of the groups has exceeded the maximum number of character lines in step S613, the data items which have not been classified into groups are classified into the last group (in the example of the present embodiment, it is the 10$^{th}$ group). However, group title generating unit 4911 may generate group title "OTHERS" or the like for the last group (10$^{th}$ group).

The data retrieval support apparatus described the above Embodiments 1–4 may be achieved by a program. The program may be run in another computer system by transferring the program to the computer system by means of floppy disks or other record mediums or via communications lines.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data retrieval support apparatus, comprising:
   data storing means for storing a plurality of pieces of retrieval result data;
   classifying means for classifying the plurality of pieces of retrieval result data into at least one group, the classifying means including:
      hierarchical data storing means for storing hierarchical data which indicates hierarchical relation and is used as a classification standard wherein
         the hierarchical data storing means stores a table of contents which includes a plurality of titles which are arranged based on hierarchical relation, wherein
         the data storing means stores a plurality of pieces of data related to the plurality of titles in the table of contents; and
      hierarchical data classifying means for classifying the plurality of pieces of retrieval result data into at least one group based on the hierarchical data wherein the hierarchical data classifying means includes:
         data selecting means for selecting a plurality of pieces of data among the plurality of pieces of data in the data storing means;
         title extracting means for extracting from the table of contents at least one title which is related to the plurality of pieces of data selected by the data selecting means;
         table of contents classifying means for classifying the plurality of pieces of data selected by the data selecting means into at least one group so that each group is composed of at least one piece of data including a common title;
         higher level title extracting means for extracting from the table of contents at least one higher level title for the title related to the plurality of pieces of data selected by the data selecting means;
         maximum item number storing means for storing a maximum number of items to be displayed on a screen;
         maximum item number reading means for reading the maximum number of items to be displayed from the maximum item number storing means;
         re-classification judging means for judging whether the number of groups exceeds the maximum number of items to be displayed; and
         re-classification controlling means for, when the re-classification judging means judges that the number of groups exceeds the maximum number of items to be displayed, instructing the higher level title extracting means to extract from the table of contents at least one further higher level title for the title extracted by the higher level title extracting means, and instructing the table of contents classifying means to classify the plurality of pieces of data selected by the data selecting means into at least one higher group so that each higher group is composed of at least one piece of data including a common further higher level title, wherein
            the group title generating means generates at least one group title by using the common title of the group, the group title respectively corresponding to the group classified by the table of contents classifying means;

group title generating means for generating a group title for each group classified by the classifying means; and displaying means for displaying the group title generated by the group title generating means for each group classified by the classifying means.

2. A data retrieval support apparatus comprising:

data storing means for storing a plurality of pieces of retrieval result data;

classifying means for classifying the plurality of pieces of retrieval result data into at least one group, the classifying means including:

hierarchical data storing means for storing hierarchical data which indicates hierarchical relation and is used as a classification standard wherein the hierarchical data storing means stores a geographical dictionary which includes a plurality of geographical names which are arranged based on hierarchical relation, wherein the data storing means stores a plurality of pieces of data each of which includes at least one geographical name;

hierarchical data classifying means for classifying the plurality of pieces of retrieval result data into at least one group based on the hierarchical data wherein the hierarchical data classifying means includes:

data selecting means for selecting a plurality of pieces of data among the plurality of pieces of data in the data storing means;

geographical name extracting means for extracting from the geographical dictionary at least one geographical name which is included in the plurality of pieces of data selected by the data selecting means;

geographical data classifying means for classifying the plurality of pieces of data selected by the data selecting means into at least one group so that each group is composed of at least one piece of data including a common geographical name;

higher level geographical name extracting means for extracting from the geographical dictionary at least one higher level geographical name for the geographical name extracted by the geographical name extracting means;

maximum item number storing means for storing a maximum number of items to be displayed on a screen;

maximum item number reading means for reading the maximum number of items to be displayed from the maximum item number storing means;

re-classification judging means for judging whether the number of groups exceeds the maximum number of items to be displayed; and re-classification controlling means for, when the re-classification judging means judges that the number of groups exceeds the maximum number of items to be displayed, instructing the higher level geographical name extracting means to extract from the geographical dictionary at least one further higher level geographical name for the higher level geographical name extracted by the higher level geographical name extracting means, and instructing the geographical name classifying means to classify the plurality of pieces of data selected by the data selecting means into at least one higher group so that each higher group is composed of at least one piece of data including a common further higher level geographical name, wherein the group title generating means generates at least one group title by using the common geographical name of the group, the group title respectively corresponding to the group classified by the geographical name classifying means;

group title generating means for generating a group title for each group classified by the classifying means; and displaying means for displaying the group title generated by the group title generating means for each group classified by the classifying means.

3. A data retrieval support apparatus, comprising:

data storing means for storing a plurality of pieces of retrieval result data;

classifying means for classifying the plurality of pieces of retrieval result data into at least one group, the classifying means including:

hierarchical data storing means for storing hierarchical data which indicates hierarchical relation and is used as a classification standard, the hierarchical data storing means storing a thesaurus which includes higher level words and lower level words and shows a relation between the higher level words and the lower level words; and hierarchical data classifying means for classifying the plurality pieces of retrieval result data into at least one group based on the hierarchical data, the hierarchical data classifying means including:

higher level extracting means for extracting from the thesaurus at least one higher level word for at least one component word in each of the plurality pieces of retrieval result data in the data storing means, and thesaurus classifying means for classifying the plurality of pieces of retrieval result data in the data storing means into at least one group so that each group is composed of at least one piece of retrieval result data including a common higher level word;

group title generating means for generating a group title for each group classified by the classifying means; and displaying means for displaying the group title generated by the group title generating means for each group classified by the classifying means.

4. The data retrieval support apparatus of claim 3, wherein the higher level extracting means includes:

maximum item number storing means for storing a maximum number of items to be displayed on a screen;

maximum item number reading means for reading the maximum number of items to be displayed from the maximum item number storing means;

re-classification judging means for judging whether the number of groups exceeds the maximum number of items to be displayed; and re-classification controlling means for, when the re-classification judging means judges that the number of groups exceeds the maximum number of items to be displayed, instructing the higher level extracting means to extract from the thesaurus at least one further higher level word for the higher level word, and instructing the thesaurus classifying means to classify the plurality pieces of retrieval result data into at least one higher group so that each higher group is composed of at least one piece of retrieval result data including a common further higher level word.

5. The data retrieval support apparatus of claim 3, wherein the higher level extracting means includes:
   hierarchical level receiving means for receiving a hierarchical level in the thesaurus when the hierarchical level is specified; and
   specified higher level extracting means for extracting from the thesaurus at least one higher level word for the plurality pieces of retrieval result data in the data storing means based on the hierarchical level received by the hierarchic level receiving means.

6. The data retrieval support apparatus of claim 5, wherein the specified higher level extracting means extracts from the thesaurus at least one higher level word which is included in the hierarchical level received by the hierarchical level receiving means.

7. The data retrieval support apparatus of claim 5, wherein the hierarchical data classifying means includes:
   lower level extracting means for, when the hierarchic level receiving means receives a hierarchical level which is lower than the plurality pieces of retrieval result data in the data storing means, extracting from the thesaurus at least one lower level word for the plurality pieces of retrieval result data, the lower level word being included in the hierarchical level received by the hierarchic level receiving means, wherein
   the thesaurus classifying means classifies the plurality pieces of retrieval result data in the data storing means into at least one group so that each group is composed of at least one piece of retrieval result data with one of a common higher level word and a common lower level word.

8. The data retrieval support apparatus of claim 7, wherein the hierarchical data classifying means includes:
   maximum item number storing means for storing a maximum number of items to be displayed on a screen;
   maximum item number reading means for reading the maximum number of items to be displayed from the maximum item number storing means;
   first re-classification judging means for judging whether the number of groups exceeds the maximum number of items to be displayed; and
   second re-classification judging means for judging whether the number of groups is either of equal to and smaller than a certain value;
   specified level changing means for changing the hierarchical level received by the hierarchic level receiving means either to a higher level and to a lower level by one level; and
   re-classification controlling means for, when the first re-classification judging means judges that the number of groups exceeds the maximum number of items to be displayed, instructing the specified level changing means to change the hierarchical level received by the hierarchic level receiving means to a higher level by one level, instructing the higher level extracting means to extract from the thesaurus at least one higher level word which is included in the higher level changed by the specified level changing means for the plurality pieces of retrieval result data in the data storing means, and instructing the thesaurus classifying means to classify the plurality pieces of retrieval result data into at least one group so that each group is composed of at least one piece of retrieval result data including a common higher level word which is included in the higher level changed by the specified level changing means, and for,
   when the second re-classification judging means judges that the number of groups is either of equal to and smaller than the certain value, instructing the lower level extracting means to extract from the thesaurus at least one lower level word which is included in the lower level changed by the specified level changing means for the plurality pieces of retrieval result data in the data storing means, and instructing the thesaurus classifying means to classify the plurality pieces of retrieval result data into at least one group so that each group is composed of at least one piece of retrieval result data including a common lower level word which is included in the lower level changed by the specified level changing means.

9. The data retrieval support apparatus of claim 3, wherein the data storing means stores at least one attribute which indicates a type of data, wherein each attribute includes an attribute value, wherein
   the classifying means includes:
      specified attribute receiving means for receiving at least one attribute when the attribute is specified, wherein
      the higher level extracting means extracts from the thesaurus at least one higher level word for attribute values included in attributes received by the specified attribute receiving means.

10. The data retrieval support apparatus of claim 3, wherein
    the group title generating means generates at least one group title which respectively corresponds to groups classified by the thesaurus classifying means.

* * * * *